US010110942B2

(12) United States Patent
Lyons et al.

(10) Patent No.: US 10,110,942 B2
(45) Date of Patent: Oct. 23, 2018

(54) USER RELATIONSHIP ENHANCEMENT FOR SOCIAL MEDIA PLATFORM

(71) Applicant: Mora Global, Inc., Minnetonka, MN (US)

(72) Inventors: Jessica Barbara Lyons, Rogers, MN (US); Jonathan Charles Beck, Minneapolis, MN (US); Roger Edward Dumas, Wayzata, MN (US); Craig Lawrence Rice, Minneapolis, MN (US); Paul Joseph Moe, Minnetonka, MN (US)

(73) Assignee: Mora Global, Inc., Minnetonka, MN (US)

( * ) Notice: Subject to any disclaimer, the term of this patent is extended or adjusted under 35 U.S.C. 154(b) by 0 days.

(21) Appl. No.: 15/860,568

(22) Filed: Jan. 2, 2018

(65) Prior Publication Data

US 2018/0188916 A1  Jul. 5, 2018

Related U.S. Application Data

(60) Provisional application No. 62/441,081, filed on Dec. 30, 2016.

(51) Int. Cl.
*H04N 21/2668* (2011.01)
*G06F 17/30* (2006.01)
(Continued)

(52) U.S. Cl.
CPC ....... *H04N 21/2668* (2013.01); *G06F 3/0482* (2013.01); *G06F 3/0484* (2013.01);
(Continued)

(58) Field of Classification Search
CPC ................. G06F 3/0484; G06F 3/0482; G06F 17/30029; H04N 21/2668
See application file for complete search history.

(56) References Cited

U.S. PATENT DOCUMENTS 8,397,253 B2   3/2013 McDonough et al.
2003/0014272 A1*  1/2003 Goulet .............. G06F 17/30017
                                         705/7.32
(Continued)

OTHER PUBLICATIONS jibjab.com[online], "jibjab", Jan. 7, 2015, [retrieved on Jun. 15, 2018]. Retreived from the Internet: URL https://web.archive.org/web/20150107015649/http:/www.jibjab.com/, 11 pages.
(Continued)

*Primary Examiner* — Li P Sun
(74) *Attorney, Agent, or Firm* — Fish & Richardson P.C.

(57) ABSTRACT

A system for providing a social media platform to enhance the quality of online social interactions among users. The system includes first and second client computing devices that are running social media applications for the social media platform. Each social media application is programmed to provide a GUI that presents digital content retrieved over the internet from the social media platform and receive user inputs. The first client computing device is associated with a first user and the second client computing device is associated with a second user. A digital profile repository stores user profiles for the first and second users and a relationship profile for a relationship between the first and second users. A relationship history database stores historical interactions among the first and second users on the social media platform. A relationship concierge facilitate meaningful social interactions among the first and second client computing devices.

20 Claims, 44 Drawing Sheets

(51) Int. Cl.
  G11B 27/031    (2006.01)
  H04N 21/2743   (2011.01)
  H04N 21/472    (2011.01)
  H04N 21/8547   (2011.01)
  G06F 3/0482    (2013.01)
  G06F 3/0484    (2013.01)
(52) U.S. Cl.
  CPC .. *G06F 17/30029* (2013.01); *G06F 17/30309* (2013.01); *G06F 17/30604* (2013.01); *G06F 17/30828* (2013.01); *G06F 17/30858* (2013.01); *G06F 17/30867* (2013.01); *G11B 27/031* (2013.01); *H04N 21/2743* (2013.01); *H04N 21/47205* (2013.01); *H04N 21/8547* (2013.01)

(56) References Cited

U.S. PATENT DOCUMENTS

| | | | |
|---|---|---|---|
| 2004/0133342 | A1 | 7/2004 | Banker |
| 2009/0089184 | A1 | 4/2009 | Boush |
| 2009/0144392 | A1* | 6/2009 | Wang ............... G06Q 10/10 709/217 |
| 2010/0077017 | A1 | 3/2010 | Martinez et al. |
| 2010/0223128 | A1 | 9/2010 | Dukellis et al. |
| 2010/0223314 | A1 | 9/2010 | Gadel et al. |
| 2011/0066940 | A1* | 3/2011 | Asghari Kamrani .. G06Q 10/10 715/716 |
| 2011/0176555 | A1 | 7/2011 | Poder et al. |
| 2011/0314098 | A1* | 12/2011 | Farrell ............... G06Q 10/10 709/204 |
| 2012/0236005 | A1 | 9/2012 | Clifton et al. |
| 2012/0290511 | A1 | 11/2012 | Frank et al. |
| 2013/0024516 | A1* | 1/2013 | Blinder ............... G06Q 30/02 709/204 |
| 2013/0173723 | A1* | 7/2013 | Herold ............... G06Q 10/10 709/206 |
| 2014/0164507 | A1 | 6/2014 | Tesch et al. |
| 2015/0004591 | A1* | 1/2015 | Lidey ............... G07F 17/3225 434/351 |
| 2015/0220634 | A1 | 8/2015 | Apple |
| 2015/0237418 | A1 | 8/2015 | Schindler et al. |
| 2015/0244657 | A1* | 8/2015 | Ghafourifar ........ G06F 21/6227 709/206 |
| 2015/0269488 | A1 | 9/2015 | Galai et al. |
| 2016/0292648 | A1* | 10/2016 | Cowan ............... G06Q 10/1095 |
| 2017/0250930 | A1 | 8/2017 | Ben-Itzhak et al. |
| 2017/0289597 | A1 | 10/2017 | Riedel et al. |

OTHER PUBLICATIONS alwaysloveyou.com [online], "alwaysloveyou", May 13, 2018 [retrieved on Jun. 15, 2018]. Retrieved from the Internet: URL https://web.archive.org/web/20180513224846/https:/www.alwaysloveyou.com/, 5 pages.
bluemountain.com [online] "bluemountain", Jan. 1, 2015, [retrieved on Jun. 15, 2018]. Retrieved , from the Internet: URL https://web.archive.org/web/20150101192646/https:/www.bluemountain.com/, 2 pages.
Anthony, et al., "fMRI Reveals Reciprocal Inhibition between Social and Physical Cognitive Domains." NeuroImage, 2012, Retrieved Oct. 28, 2012, Abstract, https://www.sciencedirect.com/science/article/pii/S1053811912010646?via%3Dihub.
Aron et al., "The Experimental Generation of Interpersonal Closeness: A Procedure and Some Preliminary Findings.", PSPB, 23(4), 363-377, 2017, Abstract, Retrieved from (https://www.researchgate.net/publication/240303233_The_Experimental_Generation_of_Interpersonal_Closeness_A_Procedure_and_Some_Preliminary_Findings).
Aron et al., "The Experimental Generation of Interpersonal Closeness: A Procedure and Some Preliminary Findings." PSPB 23(4): 363-77, 1997, Abstract, (https://www.researchgate.net/publication/240303233_The_Experimental_Generation_of_Interpersonal_Closeness_A_Procedure_and_Some_Preliminary_Findings).
Bayer et al., "Sharing the Small Moments: Ephemeral Social Interaction on Snapchat." *Information, Communication & Society* 4462(January): 1-22, 2015, Abstract, (https://www.tandfonline.com/doi/full/10.1080/1369118X.2015.1084349).
Bredesen et al., "Reversal of cognitive decline in Alzheimer's disease.", Aging, 8(6), 1-9, 2016, Abstract, (www.aging-us.com/article/100981).
Cavalcanti et al., "Media Meaning and Context Loss in Ephemeral Communication Platforms : A Qualitative Investigation of Snapchat.", Proceedings of the 2017 ACM Conference on Computer Supported Cooperative Work and Social Computing—CSCW '17, 1934-1945, 2017, Abstract, (https://dl.acm.org/citation.cfm?doid=2998181.2998266).
Cramer, H., "Effects of Ad Quality & Content-Relevance on Perceived Content Quality", Proceedings of the ACM CHI'15 Conference on Human Factors in Computing Systems, 1, 2231-2234, 2015, Abstract, https://dl.acm.org/citation.cfm?doid=2702123.2702360.
De Vries et al., "Subtle persuasion: the unobtrusive effect of website-banner congruence on trust.", Proceedings of the 4th International Conference on Persuasive Technology, 1-6, 2009, Abstract, https://dl.acm.org/citation.cfm?doid=1541948.1541971.
dourish.com [online], "Where the Action Is: The Foundations of Embodied Interaction", Nov. 2, 2016, [retrieved on Jul. 25, 2018]. Retrieved from the Internet: URL web.archive.org/web/20161102041526/http:/www.dourish.com/embodied/.
Dresp-Langley, "Why the Brain Knows More than We Do: Non-Conscious Representations and Their Role in the Construction of Conscious Experience.", Brain Sci, 2(Dec. 2011), 1-21, 2012, Abstract, (www.mdpi.com/2076-3425/2/1/1).
Duggan et al., "Social Media Update 2016.", Pew Research Center, 1(November), 2016, Retrieved from (http://assets.pewresearch.org/wp-content/uploads/sites/14/2016/11/10132827/PI_2016.11.11_Social-Media-Update_FINAL.pdf).
Eldar et al., "Mood as Representation of Momentum.", Trends in Cognitive Sciences, 20(1), 15-24, 2016, (https://www.cell.com/trends/cognitive-science s/fulltext/S1364-6613(15)00174-6?_returnURL=https%3A%2F%2Flinkinghub.elsevier.com%2Fretrieve%2Fpii%2FS1364661315001746%3Fshowall%3Dtrue).
facebook.com [online], "facebook", [retrieved on Jul. 25, 2018]. Retrieved from the Internet: URL https://www.facebook.com/.
Fischer et al., "Effects of Content and Time of Delivery on Receptivity to Mobile Interruptions." Proceedings of the 12th international conference on Human computer interaction with mobile devices and services—MobileHCI '10 103, 2010, Abstract, (https://dl.acm.org/citation.cfm?doid=1851600.1851620.
Fitzpatrick et al., "Delivering Cognitive Behavior Therapy to Young Adults With Symptoms of Depression and Anxiety Using a Fully Automated Conversational Agent (Woebot): A Randomized Controlled Trial.", JMIR Mental Health, 4(2), e19, 2017, Abstract, (http://mentaljmir.org/2017/2/e19/).
Garner, W. R., Uncertainty and structure as psychological concepts, 1962, Abstract, (http://psycnet.apa.org/record/1963-00502-000).
Gerstein, Intimacy and Privacy Author ( s ): Robert S Gerstein Published by : The University of Chicago Press Stable, 2017, Abstract, URL : (https://www.jstor.org/stable/2380133?seq=1#page_scan_tab_contents).
Goffman, E., the Presentation of Self in Everyday Live. Garden City, NY: Doubleday Anchor, 1959, Retrieved from (http://www.public.iastate.edu/~carlos/607/readings/goffman.pdf).
Goodyear, Kimberly et al., "Advice Taking from Humans and Machines: An fMRI and Effective Connectivity Study." Frontiers in Human Neuroscience 10(November): 1-15, 2016, (https://www.frontiersin.org/articles/10.3389/fnhum.2016.00542/full).
gosling.psy.utexas.edu [online], "Ten Item Personality Measure (TIPI)", Jun. 22, 2016, [retrieved on Jul. 25, 2018]. Retrieved from the Internet: URL http://web.archive.org/web/20160622202352/https:/gosling.psy.utexas.edu/scales-weve-developed/ten-item-personality-measure-tipi/.
Harvard Medical School,"The Health Benefits of Strong Relationships—Harvard Health." Harvard Health Publications, 2016 Retrieved Jan.

(56) References Cited

OTHER PUBLICATIONS 10, 2017, https://www.health.harvard.edu/newsletter_article/the-health-benefits-of-strong-relationships.

Hegde, S., "Music-based cognitive remediation therapy for patients with traumatic brain injury.", Frontiers in Neurology, 5, 34, 2014, https://www.frontiersin.org/articles/10.3389/fneur.2014.00034/full.

helpguide.org [online], "Relationship Help Building Satisfying Relationships that Last", Jan. 10, 2017, [retrieved on Jul. 25, 2018]. Retrieved from the Internet: URL https://www.helpguide.org/articles/relationships-communication/relationship-help.htm.

itunes.apple.com [online] "Marco Polo Video Walkie Talkie", 2012, [retrieved on Jul. 25, 2018]. Retrieved from the Internet: URL https://itunes.apple.com/us/app/marco-polo-video-walkie-talkie/id912561374?mt=8.

itunes.apple.com [online] "Pinterest: Inspiration & Tips", 2016, [retrieved on Jul. 25, 2018]. Retrieved from the Internet: URL https://itunes.apple.com/us/app/pinterest/id429047995?mt=8.

itunes.apple.com [online] "WeChat", 2011, [retrieved on Jul. 25, 2018]. Retrieved from the Internet: URL https://itunes.apple.com/us/app/wechat/id414478124?mt=8.

itunes.apple.com [online], "PixGram—Photo Editor", 2016, [retrieved on Jul. 25, 2018]. Retrieved from the Internet: URL https://itunes.apple.com/us/app/pixgram-photo-editor/id1067592199?mt=8.

itunes.apple.com [online], "Snapchat", [retrieved on Jul. 25, 2018]. Retrieved from the Internet: URL https://itunes.apple.com/us/app/snapchat/id447188370?mt=8.

itunes.apple.com [online], "Vigo Video—Tell your story", [retrieved on Jul. 25, 2018]. Retrieved from the Internet: URL https://itunes.apple.com/us/app/flipagram/id512727332?mt=8.

Kaplan, S., "The restorative benefits of nature: Toward an integrative framework.", Journal of Environmental Psychology, 15(3), 169-182, 1995, Abstract, (https://www.sciencedirect.com/science/article/pii/0272494495900012?via%3Dihub).

Kauer et al., "Self-monitoring using mobile phones in the early stages of adolescent depression: Randomized controlled trial.", Journal of Medical Internet Research, 14(3), 1-17, 2012, Abstract, (www.jmir.org/2012/3/e67/).

Kelly et al., "Demanding by Design : Supporting Effortful Communication Practices in Close Personal Relationships.", CSCW '17 Proceedings of the 2017 ACM Conference on Computer Supported Cooperative Work and Social Computing, 70-83, 2017, (https://dl.acm.org/citation.cfm?id=2998184).

Kurtz et al., "Snapchat: The Jekyll & Hyde of Social Media: What research has to say about millennials' favorite app", 2016, Retrieved Mar. 8, 2017, from (https://www.psychologytoday.com/us/blog/happy-trails/201612/snapchat-the-jekyll-hyde-social-media).

Lemieux et al., "Affinity-seeking, Social Loneliness and Social Avoidance among Facebook Users." *Psychological Reports* 112(2):545-52, 2013, Abstract, Retrieved Jan. 16, 2017, (http://journals.sagepub.com/doi/abs/10.2466/07.PR0.112.2.545-552).

liwc.wpengine.com [online], "Linguistic Inquiry and Word Count", [retrieved on Jul. 25, 2018]. Retrieved from the Internet: URL https://liwc.wpengine.com/.

Lup et al., "Instagram #Instasad?: Exploring Associations Among Instagram Use, Depressive Symptoms, Negative Social Comparison, and Strangers Followed.", Cyberpsychology, Behavior, and Social Networking, 18(5), 247-252, 2015, Abstract, https://www.liebertpub.com/doi/10.1089/cyber.2014.0560.

Malkin et al., "Multimodal estimation of user interruptibility for smart mobile telephones.", Proceedings of the 8th International Conference on Multimodal Interfaces—ICMI '06, 118, 2006, (https://dl.acm.org/citation.cfm?doid=1180995.1181018).

Mallik et al., "Anhedonia to music and mu-opioids: Evidence from the administration of naltrexone.", Scientific Reports, 7, 41952, 2017, www.nature.com/articles/srep41952.

nytimes.com [online], "The Internal Invasion", Jan. 20, 2017, [retrieved on Jul. 25, 2018]. Retrieved from the Internet: URL https://www.nytimes.com/2017/01/20/opinion/the-internal-invasion.html?action=click&pgtype=Homepage&clickSource=story-heading&module=span-abc-region&region=span-abc-region&WT.nav=span-abc-region.

nytimes.com [online], "The Internet of Things Is Coming for Us", Jan. 22, 2017, [retrieved on Jul. 25, 2018]. Retrieved from the Internet: URL https://www.nytimes.com/2017/01/21/sunday-review/the-internet-of-things-is-coming-for-us.html.

okcupid.com [online], "Dating Deserves Better", [retrieved on Jul. 25, 2018]. Retrieved from the Internet: URL https://www.okcupid.com/.

outofservice.com [online], "The Big Five Project—Personality Test", Feb. 25, 2018, [retrieved on Jul. 25, 2018]. Retrieved from the Internet: URL web.archive.org/web/20180225082012/%20http://www.outofservice.com/bigfive/.

Plutchik, R., The Nature of Emotions Human emotions have deep evolutionary roots, a fact that may explain their complexity and provide tools for clinical practice., American Scientist, 89(4), 344-350, 2001, Abstract, Retrieved from (https://www.jstor.org/stable/27857503?seq=1#page_scan_tab_contents).

Rentfrow et al., "The Do Re Mi's of Everyday Life: The Structure and Personality Correlates of Music Preferences", Journal of Personality and Social Psychology, vol. 84(6), 1236-1256, 2003, Abstract, (http://psycnet.apa.org/doiLanding?doi=10.1037%2F0022-3514.84.6.1236).

Rooksby et al., "Internet-assisted delivery of cognitive behavioural therapy (CBT) for childhood anxiety: Systematic review and meta-analysis.", Journal of Anxiety Disorders, 29, 83-92, 2015, Abstract, (https://www.sciencedirect.com/science/article/abs/pii/S0887618514001728).

Schueller et al., "Online Treatment and Virtual Therapists in Child and Adolescent Psychiatry.", Child and Adolescent Psychiatric Clinics of North America, 26(1), 1-12, 2017, Abstract, (https://www.sciencedirect.com/science/article/pii/S1056499316300827?via%3Dihub).

Seeman et al., "Social Relationships, Social Support, and Patterns of Cognitive Aging in Healthy, High-Functioning Older Adults: MacArthur Studies of Successful Aging." Health psychology : official journal of the Division of Health Psychology, American Psychological Association 20(4):243-55, 2001, Absrtact, (http://psycnet.apa.org/record/2001-11106-001).

sigmaassessmentsystems.com [online], "NEO Five-Factor Inventory—3", Jun. 1, 2016, [retrieved on Jul. 25, 2018]. Retrieved from the Internet: URL http://web.archive.org/web/20160601131357/http://www.sigmaassessmentsystems.com/assessments/neo-five-factor-inventory-3/.

sigmaassessmentsystems.com [online], "Personality Tests", Jun. 3, 2016, [retrieved on Jul. 25, 2018]. Retrieved from the Internet: URL web.archive.org/web/20160603112356/http://www.sigmaassessmentsystems.com/assessment-types/personality-tests/.

simple.wikipedia.org [online], "List of emotions", Aug. 7, 2016, [retrieved on Jul. 25, 2018]. Retrieved from the Internet: URL http://web.archive.org/web/20160807114047/https:/simple.wikipedia.org/wiki/List_of_emotions.

socialnetworking.lovetoknow.com [online], "Negative Impact of Social Networking Sites", Jun. 23, 2016, [retrieved on Jul. 25, 2018]. Retrieved from the Internet: URL http://web.archive.org/web/20160623022327/http:/socialnetworking.lovetoknow.com/Negative_Impact_of_Social_Networking_Sites.

South et al., "Marital Satisfaction and Physical Health: Evidence for an Orchid Effect." Psychological science Jan. 2013, Retrieved Feb. 12, 2013, Abstract, (https://www.ncbi.nlm.nih.gov/pubmed/23359109).

Spek et al., "Internet-based cognitive behaviour therapy for symptoms of depression and anxiety: a meta-analysis.", Psychological Medicine, 37(3), 319, 2007, Abstract, https://www.cambridge.org/core/journals/psychological-medicine/article/internetbased-cognitive-behaviour-therapy-for-symptoms-of-depression-and-anxiety-a-metaanalysis/251608942E066BB9F3F0335341B65CDF.

statista.com [online], "Instagram Stories Blows Past Snapchat", Apr. 24, 2017, [retrieved on Jul. 25, 2018]. Retrieved from the Internet: URL web.archive.org/web/20170511042746/https:/www.statista.com/chart/9086/daily-active-users-instagram-stories-snapchat/.

(56) References Cited

OTHER PUBLICATIONS statista.com [online], "Investing in Love", Apr. 28, 2017, [retrieved on Jul. 25, 2018]. Retrieved from the Internet: URL web.archive.org/web/20170506113950/https:/www.statista.com/chart/9173/investing-in-love/.

Vangelisti, A., & Perlman, D. (Eds.) "The Cambridge Handbook of Personal Relationships.", Vancouver, BC., 2006 Retrieved from (http://assets.cambridge.org/97805218/26174/frontmatter/9780521826174_frontmatter.pdf).

Vetere et al., Mediating intimacy Proceedings of the 2005 ACM Conference on Human Factors in Computing Systems, 471-480, 2005, Abstract, (https://dl.acm.org/citation.cfm?doid=1054972.1055038).

Weis et al., "Feedback That Confirms Reward Expectation Triggers Auditory Cortex Activity." Journal of neurophysiology 110(8):1860-68, 2013, Retrieved Jun. 8, 2016, Abstract, (http://www.ncbi.nlm.nih.gov/pubmed/23904492).

wikipedia.org [online], "Human-computer interaction", Jun. 10, 2016, [retrieved on Jul. 25, 2018]. Retrieved from the Internet: URL http://web.archive.org/web/20160610055207/https:/en.wikipedia.org/wiki/Human-computer_interaction.

wikipedia.org [online], "Minnesota Multiphasic Personality Inventory", Nov. 14, 2016, [retrieved on Jul. 25, 2018]. Retrieved from the Internet: URL http://web.archive.org/web/20161114232100/https:/en.wikipedia.org/wiki/Minnesota_Multiphasic_Personality_Inventory.

wikipedia.org [online], "Social computing", Oct. 11, 2016, [retrieved on Jul. 25, 2018]. Retrieved from the Internet: URL http://web.archive.org/web/20161011131759/https:/en.wikipedia.org/wiki/Social_computing.

wikipedia.org [online], "Thematic Apperception Test", May 5, 2016, [retrieved on Jul. 25, 2018]. Retrieved from the Internet: URL http://web.archive.org/web/20160505104309/https:/en.wikipedia.org/wiki/Thematic_apperception_test.

Wohn et al.,"The "S" in Social Network Games: Initiating, Maintaining, and Enhancing Relationships.", 2011 44th Hawaii International Conference on System Sciences, 1-10, 2011, Abstract, (https://ieeexplore.ieee.org/document/5718722/).

Yang, Chia-Chen., "Instagram Use, Loneliness, and Social Comparison Orientation: Interact and Browse on Social Media, But Don't Compare." Cyberpsychology, behavior and social networking 19(12):703-8, 2016, Abstract, Retrieved Jan. 16, 2017 (http://online.liebertpub.com/doi/10.1089/cyber.2016.0201).

Yarosh et al., "Narrating Data Structures: The Role of Context in CS2.", ACM J. Educ. Resour. Comput, 7(10), 2008, Abstract, (https://dl.acm.org/citation.cfm?doid=1316450.1316456).

Yarosh et al., "Supporting parent-child communication in divorced families.", International Journal of Human-Computer Studies, 67(2), 192-203, 2009, Abstract, (https://www.sciencedirect.com/science/article/pii/S1071581908001201?via%3Dihub).

americangreeting.com [online], "American Greetings", Jun. 22, 2016, [retrieved on Mar. 30, 2018]. Retrieved from the Internet: URL https://web.archive.org/web/20160622174740/https:/www.americangreetings.com/, 2 pages.

androidgo.fun [online], "Pixgram", 2017, [retrieved on Mar. 30, 2018]. Retrieved from the Internet: URL web.archive.org/web/20160716194042/http:/funimate.com/, 2 pages.

bengreenfieldfitness.com [online] "A Groundbreaking New Way to Combine Artificial Intelligence, Sound & Music to Boost Creativity, Focus, Sleep & More.", [retrieved on Mar. 30, 2018]. Retrieved from the Internet: URL https://bengreenfieldfitness.com/podcast/brain-podcasts/how-does-brain-fm-work/?_ga=2.253365324.414530301.1499365561-575416859.1499365561, 14 pages.

bluemountain.com [online], "Father's Day eCards", Jun. 17, 2016, [retrieved on Mar. 30, 2018]. Retrieved from the Internet: URL https://web.archive.org/web/20160617235426/https:/www.bluemountain.com/, 2 pages.

clickz.com [online]. "Why mobile video is massive and other lessons from Mobile World Congress 2017", Mar. 15, 2017, [retrieved on Mar. 30, 2018]. Retrieved from the Internet: URL web.archive.org/web/20170318043809/https:/www.clickz.com/why-mobile-video-is-massive-and-other-lessons-from-mobile-world-congress-2017/110028/, 12 pages.

couple.me [online], "An Intimate place for two", May 29, 2016, [retrieved on Mar. 30, 2018]. Retrieved from the Internet: URL web.archive.org/web/20160529205409/https:/couple.me/, 1 page.

dubsmash.com [online], "Bringing joy to messaging", Oct. 20, 2016, [retrieved on Mar. 30, 2018]. Retrieved from the Internet: URL https://web.archive.org/web/20161020222620/https:/www.dubsmash.com/, 1 page.

dubsmash.com [online], "dubsmash", Apr. 16, 2016, [retrieved on Mar. 30, 2018]. Retrieved from the Internet: URL web.archive.org/web/20160416002031/https:/www.dubsmash.com/, 5 pages.

elovegrams.com [online], "Lovegrams", Jul. 2, 2015, [retrieved on Mar. 30, 2018]. Retrieved from the Internet: URL https://web.archive.org/web/20150702174547/http:/www.elovegrams.com:80/, 3 pages.

en.wikipedia.org [online] "KakaoTalk", Jun. 6, 2016, [retrieved on Mar. 30, 2018]. Retrieved from the Internet: URL http://web.archive.org/web/20160606045635/https:/en.wikipedia.org/wiki/KakaoTalk, 6 pages.

facebook.com [online], Jun. 14, 2016 [retrieved on Mar. 30, 2018]. Retrieved from the Internet: URL https://web.archive.org/web/20160622062454/https:/www.facebook.com/facebook, 9 pages.

flipgram.com [online], "Everyone has stories worth telling", May 3, 2016, [retrieved on Mar. 30, 2018]. Retrieved from the Internet: URL web.archive.org/web/20160503043646/https:/flipagram.com/, 14 pages.

funimate.com [online], "Be a video star", Jul. 16, 2016, [retrieved on Mar. 30, 2018]. Retrieved from the Internet: URL web.archive.org/web/20160716194042/http:/funimate.com/, 2 pages.

hallmarkecards.com [online] May 8, 2015, [retrieved on Apr. 26, 2018]. Retrieved from the Internet: URL https://web.archive.org/web/20160314202124/https:/www.hallmarkecards.com/.

International Search Report and Written Opinion in International Application No. PCT/US18/12102, dated Jan. 2, 2018.

itskoko.com [online], "Outsmarting stress, together", Apr. 27, 2016, [retrieved on Mar. 30, 2018]. Retrieved from the Internet: URL web.archive.org/web/20160427230120/https:/itskoko.com/, 3 pages.

itunes.apple.com [online], "InstaVideo Editor—Trim & Add music to videos", 2015, [retrieved on Apr. 2, 2018]. Retrieved from the Internet: URL https://itunes.apple.com/us/app/instavideo-editor-trim-add-music-to-videos/id715257165?mt=8.

itunes.apple.com [online], "Quik—GoPro Video Editor", 2013, [retrieved on Apr. 2, 2018]. Retrieved from the Internet: URL https://itunes.apple.com/us/app/quik-gopro-video-editor/id694164275?mt=8.

itunes.apple.com [online], "The Mood Meter", 2013, [retrieved on Mar. 30, 2018]. Retrieved from the Internet: URL https://itunes.apple.com/us/app/the-mood-meter/id825930113?mt=8, 6 pages.

itunes.apple.com, [online], "iMovie", 2013, [retrieved on Mar. 30, 2018]. Retrieved from the Internet: URL https://itunes.apple.com/us/app/imovie/id377298193?mt=8, 9 pages.

kik.com [online], "Be with your people", May 11, 2017, [retrieved on Mar. 30, 2018]. Retrieved from the Internet: URL web.archive.org/web/20170511175115/https:/www.kik.com/features/, 7 pages.

linkedin.com [online]. "Why "how many jobs will be killed by AI?" is the wrong question", Jun. 24, 2017, [retrieved on Mar. 30, 2018]. Retrieved from the Internet: URL https://www.linkedin.com/pulse/why-how-many-jobs-killed-ai-wrong-question-andrew-mcafee/?trk=eml-email_feed_ecosystem_digest_01-hero-0-null&midToken=AQFb8xLZqRqVxQ&fromEmail=fromEmail&ut=0-y1gpbhPm6Ucl, 5 pages.

magisto.com [online], "Stories Come Alive", Jul. 8, 2016, [retrieved on Mar. 30, 2018]. Retrieved from the Internet: URL http://web.archive.org/web/20160708205545/https:/www.magisto.com/, 3 pages.

microsoft.com [online], "PicPlayPost", Oct. 16, 2016, [retrieved on Mar. 30, 2018]. Retrieved from the Internet: URL http://web.archive.org/web/20161016112215/https:/www.microsoft.com/en-us/store/p/picplaypost/9nblggh09118, 6 pages.

(56) References Cited

OTHER PUBLICATIONS moodpanda.com [online], "Track happiness mood panda", Mar. 29, 2016, [retrieved on Mar. 30, 2018]. Retrieved from the Internet: URL web.archive.org/web/20160329000908/http:/www.moodpanda.com/, 2 pages.
moodwatchapp.com [online], "Help you to live a happier and more productive life", [retrieved on Mar. 30, 2018]. Retrieved from the Internet: URL web.archive.org/web/20161009132211/http:/moodwatchapp.com/, 3 pages.
musical.ly [online] "Musical.ly", Jun. 2015, [retrieved on Mar. 30, 2018]. Retrieved from the Internet: URL https://www.musical.ly/en-US/, 5 pages.
npr.org [online] "Irresistible, The Rise of Addictive Technology and the Business of Keeping Us Hooked", [retrieved on Mar. 30, 2018]. Retrieved from the Internet: URL https://www.npr.org/books/titles/519978642/irresistible-the-rise-of-addictive-technology-and-the-business-of-keeping-us-hoo, 4 pages.
pandora.com [online], "Pandora", Jun. 24, 2016, [retrieved on Mar. 30, 2018]. Retrieved from the Internet: URL https://web.archive.org/web/20160624031416/https:/www.pandora.com/, 2 pages.
path.com [online], "Who We Are", Jun. 16, 2016, [retrieved on Mar. 30, 2018]. Retrieved from the Internet: URL http://web.archive.org/web/20160616051216/https:/path.com/about, 2 pages.
pixorial.com, [online], "Photo and Video sharing made easy", Feb. 5, 2015, [retrieved on Mar. 30, 2018]. Retrieved from the Internet: URL https://web.archive.org/web/20150205232728/http:/www.pixorial.com/, 4 pages.
play.google.com [online], "1 Second Everyday", Aug. 11, 2016, [retrieved on Mar. 30, 2018]. Retrieved from the Internet: URL http://web.archive.org/web/20160811083200/https:/play.google.com/store/apps/details?id=co.touchlab.android.onesecondeveryday&hl=en, 3 pages.
play.google.com [online], "Bitmoji—Your Personal Emoji", Mar. 29, 2018, [retrieved on Apr. 2, 2018]. Retrieved from the Internet: URL https://play.google.com/store/apps/details?id=com.bitstrips.imoji.
play.google.com [online], "Bobble Keyboard—GIF, Emojis, Fonts, & Themes", Mar. 29, 2018, [retrieved on Apr. 2, 2018]. Retrieved from the Internet: URL https://play.google.com/store/apps/details?id=com.touchtalent.bobbleapp.
play.google.com [online], "Fideo: Fun Video", Apr. 21, 2016, [retrieved on Mar. 30, 2018]. Retrieved from the Internet: URL web.archive.org/web/20160416002031/https:/www.dubsmash.com/, 4 pages.
play.google.com [online], "GIPHY—Animated GIFs Search Engine", [retrieved on Apr. 2, 2018]. Retrieved from the Internet: URL https://play.google.com/store/apps/details?id=com.giphy.messenger.
play.google.com [online], "Hobnot Invitations: Invitation Maker & Text RSVP", Mar. 19, 2018, [retrieved on Mar. 30, 2018]. Retrieved from the Internet: URL https://play.google.com/store/apps/details?id=io.hobnob.hobnob, 3 pages.
play.google.com [online], "Pinnatta-Interactive e-cards", Apr. 9, 2016, [retrieved on Mar. 30, 2018]. Retrieved from the Internet: URL http://web.archive.org/web/20160409011040/https:/play.google.com/store/apps/details?id=com.pinnatta.android, 3 pages.
play.google.com [online], "Video Lab", Mar. 12, 2018, [retrieved on Apr. 2, 2018]. Retrieved from the Internet: URL https://play.google.com/store/apps/details?id=mappstreet.videoeditor.
play.google.com [online], "Videoshop—Video Editor", Apr. 2, 2018, [retrieved on Apr. 2, 2018]. Retrieved from the Internet: URL https://play.google.com/store/apps/details?id=com.videoshop.app.
play.google.com [online], "Vivavideo: free video editor", Jul. 22, 2016, [retrieved on Mar. 30, 2018]. Retrieved from the Internet: URL http://web.archive.org/web/20160722230805/https:/play.google.com/store/apps/details?id=com.quvideo.xiaoying, 3 pages.
play.google.com [online], "WeChat", Mar. 6, 2018, [retrieved on Mar. 30, 2018]. Retrieved from the Internet: URL https://play.google.com/store/apps/details?id=com.tencent.mm&hl=en, 3 pages.
play.google.com, [online], "Moodtrack Social Diary", Feb. 23, 2018, [retrieved on Mar. 30, 2018]. Retrieved from the Internet: URL https://play.google.com/store/apps/details?id=com.moodtrak.diary, 3 pages.
play.google.com, [online], "Social Cam", Mar. 2, 2018, [retrieved on Mar. 30, 2018]. Retrieved from the Internet: URL https://play.google.com/store/apps/details?id=com.dsinnovators.socialcam, 3 pages.
recode.com [online] "Musical.ly syncs up with Apple Music", Apr. 27, 2017, [retrieved on Mar. 30, 2018]. Retrieved from the Internet: URL http://web.archive.org/web/20170617135605/https:/www.recode.net/2017/4/27/15463286/musical-ly-apple-music, 4 pages.
smilebox.com [online], "Create greetings, invites, slideshows and more", [retrieved on Mar. 30, 2018]. Retrieved from the Internet: URL www.smilebox.com/lp/smilebox.html?partner=yahooee&campaign=search_us_smilebox~smilebox~nofree&utm_source=yahoo&utm_medium=cpc&utm_campaign=search_us_smilebox, 2 pages.
smilebox.com [online], "Smilebox", [retrieved on Mar. 30, 2018]. Retrieved from the Internet: URL www.smilebox.com/lp/video-slideshow-maker-var1.html?partner=yahooee&campaign=search_us_animoto~animoto_generic_exact~&utm_source=yahoo&utm_medium=cpc&utm_campaign=search_us_animoto, 2 pages.
snapchat.com [online], [retrieved on Mar. 30, 2018]. Retrieved from the Internet: URL https://web.archive.org/web/20161001000000*/https:/www.snapchat.com/, 7 pages.
spotify.com [online], Jun. 6, 2016, "Spotify" [retrieved on Mar. 30, 2018]. Retrieved from the Internet: URL https://web.archive.org/web/20160606084949/https:/www.spotify.com/us/, 2 pages.
statista.com [online] "The Kanye Effect Helps Tidal Make Waves", Feb. 16, 2016, [retrieved on Mar. 30, 2018]. Retrieved from the Internet: URL web.archive.org/web/20160602212834/https:/www.statista.com/chart/4367/google-search-interest-in-tidal/, 2 pages.
statista.com [online]. "Is TV's Reign Nearing Its End?", Jun. 9, 2017, [retrieved on Mar. 30, 2018]. Retrieved from the Internet: URL web.archive.org/web/20170625204040/https:/www.statista.com/chart/9761/daily-tv-and-internet-consumption-worldwide/, 3 pages.
telegraph.co.uk [online] "Facebook shuts down robots after they invent their own language", Aug. 1, 2012, [retrieved on Mar. 30, 2018]. Retrieved from the Internet: URL https://www.telegraph.co.uk/technology/2017/08/01/facebook-shuts-robots-invent-language/?WT.mc_id=tmg_share_em, 3 pages.
theringer.com [online]. "There are no new social networks", Apr. 14, 2017, [retrieved on Mar. 30, 2018 Retrieved from the Internet: URL https://www.theringer.com/2017/4/14/16038242/social-media-invention-facebook-twitter-snapchat-tech-e40178df183, 8 pages.
triller.com [online], "Drop a music video, anytime.", Sep. 12, 2016, [retrieved on Mar. 30, 2018]. Retrieved from the Internet: URL web.archive.org/web/20160912172032/http:/www.triller.co/, 4 pages.
usatoday.com [online] "Zuckerberg seeks to bring communities together", Jun. 22, 2017, [retrieved on Mar. 30, 2018]. Retrieved from the Internet: URL https://www.usatoday.com/videos/news/nation/2017/06/22/zuckerberg-seeks-bring-communities-together/103113954/, 1 page.
whatsapp.com [online], "Whatsapp", Jul. 18, 2016, [retrieved on Mar. 30, 2018]. Retrieved from the Internet: URL https://web.archive.org/web/20160718015143/https:/www.whatsapp.com/, 2 pages.
woebot.com [online] "WOEBOT", [retrieved on Mar. 30, 2018]. Retrieved from the Internet: URL web.archive.org/web/20170114191138/http:/www.woebot.com/, 16 pages.
youtube.com [online], "youtube", Jun. 23, 2016, [retrieved on Mar. 30, 2018]. Retrieved from the Internet: URL https://web.archive.org/web/20160623100629/https:/www.youtube.com/, 2 pages.

* cited by examiner

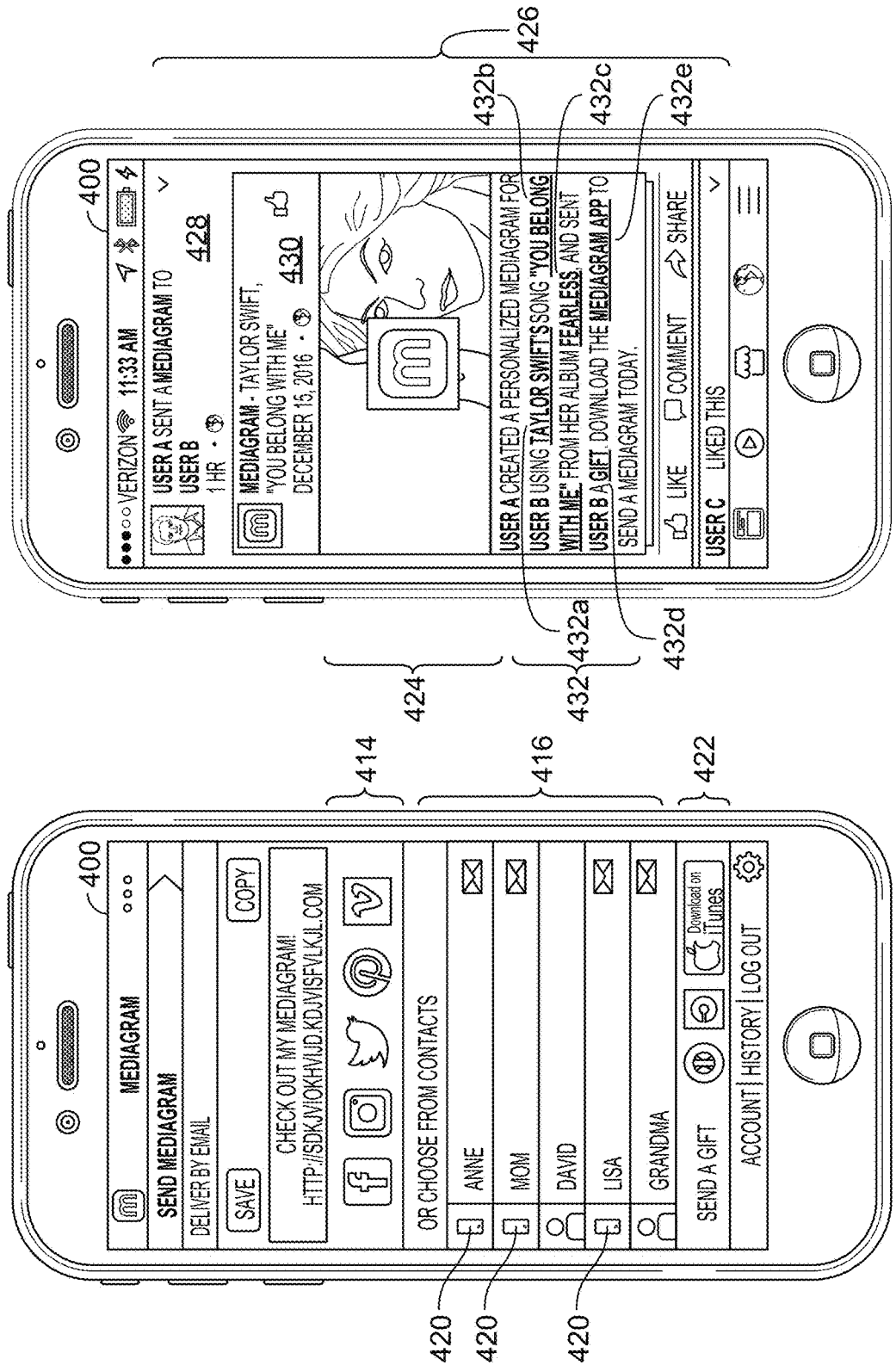

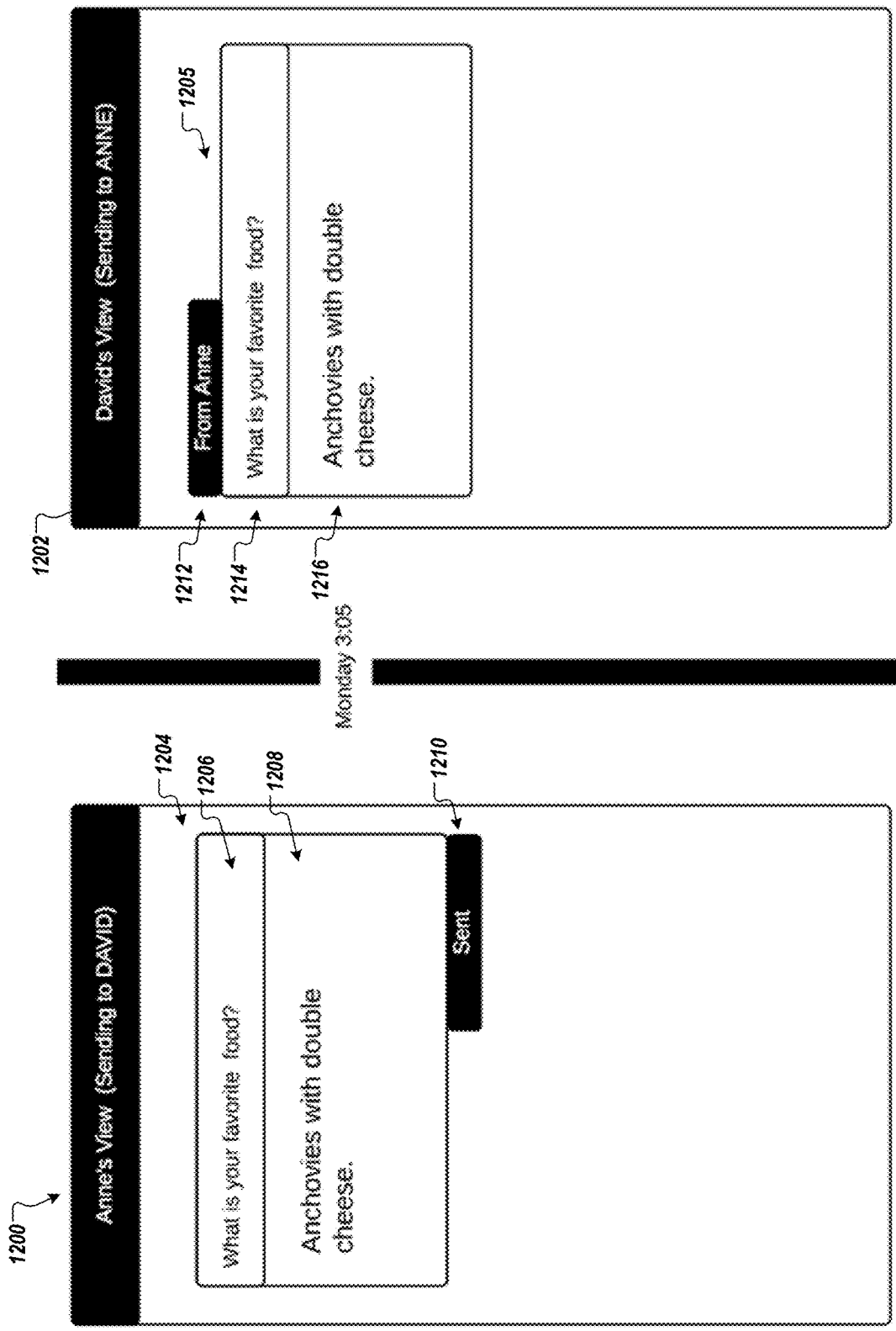

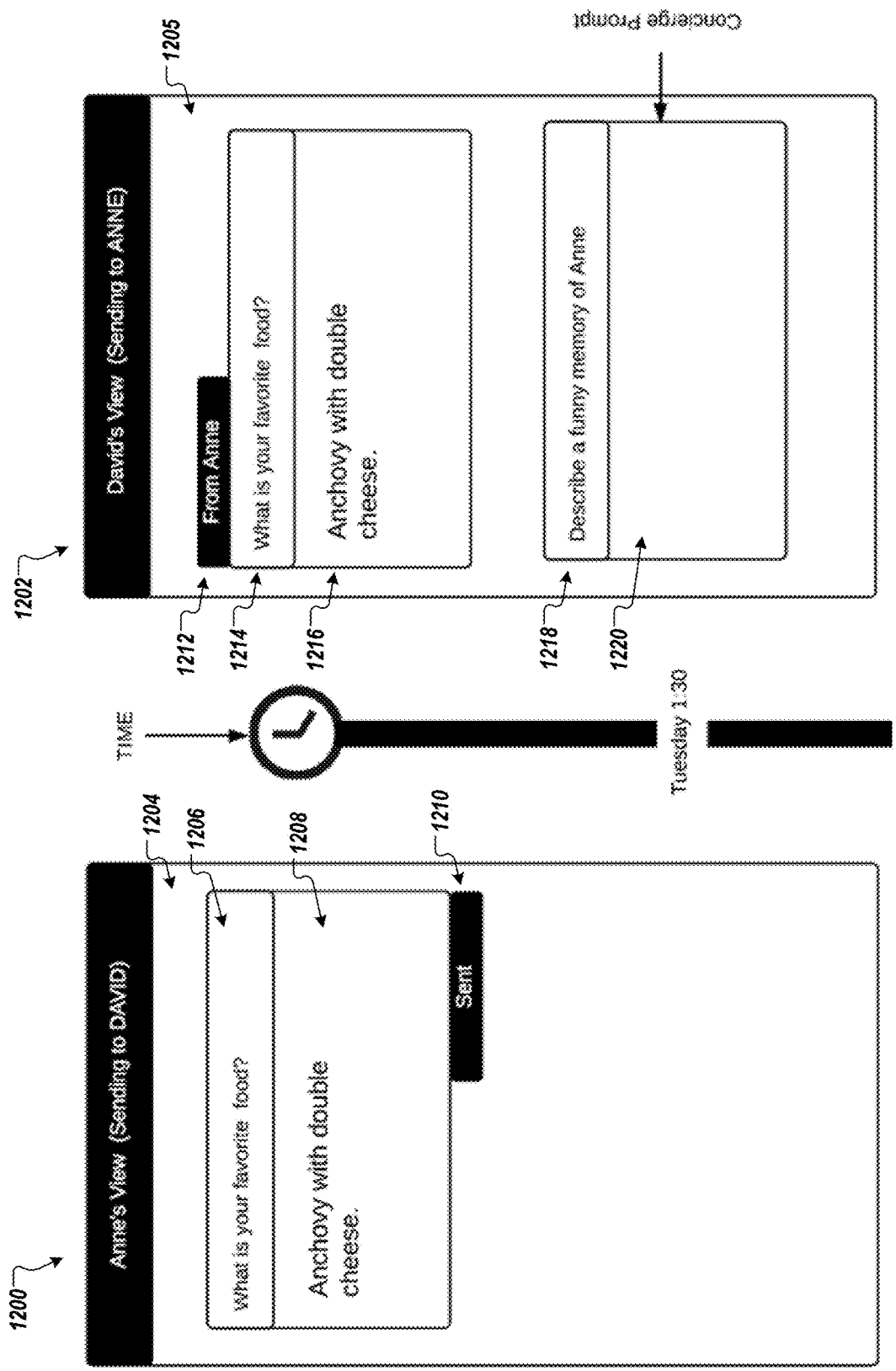

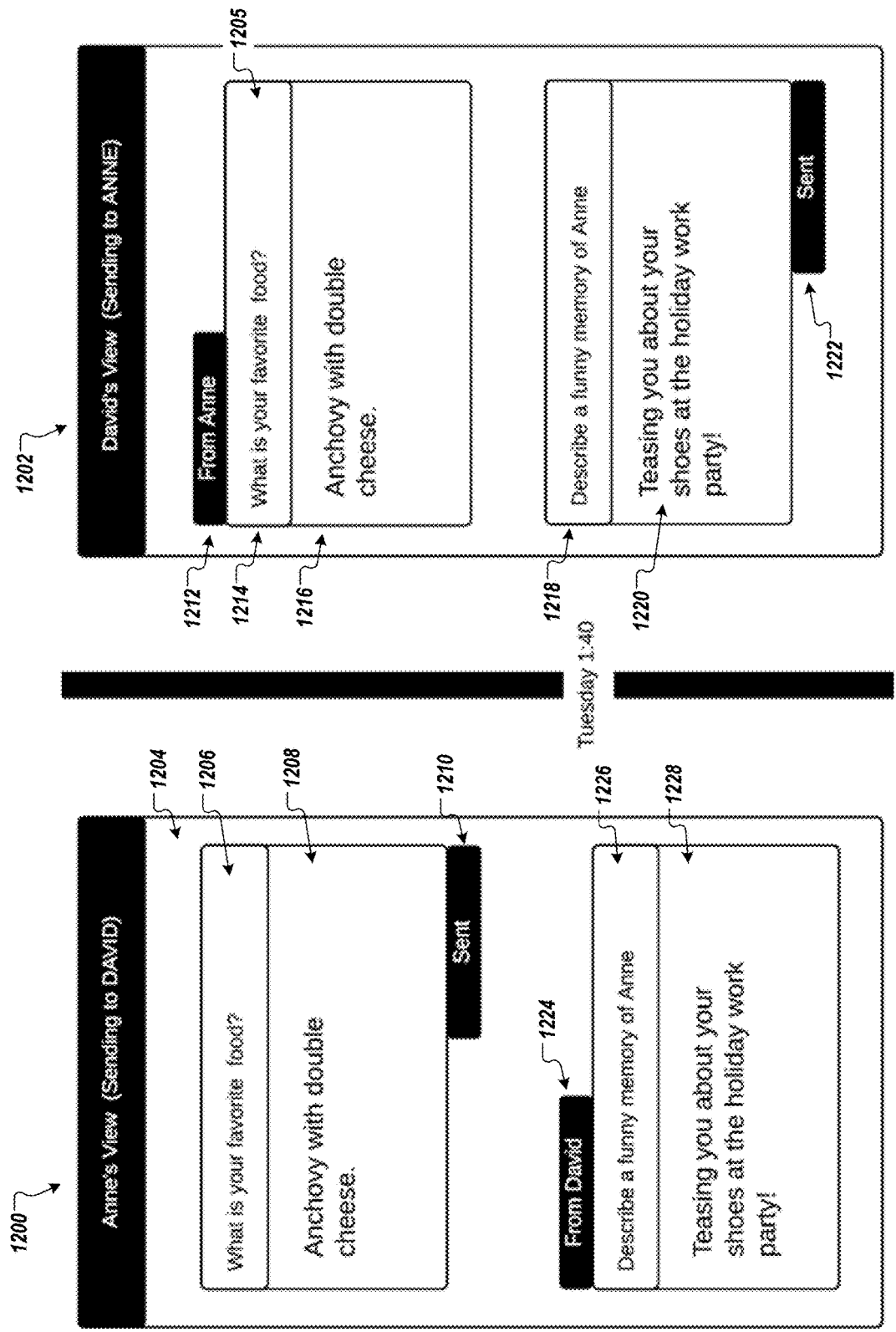

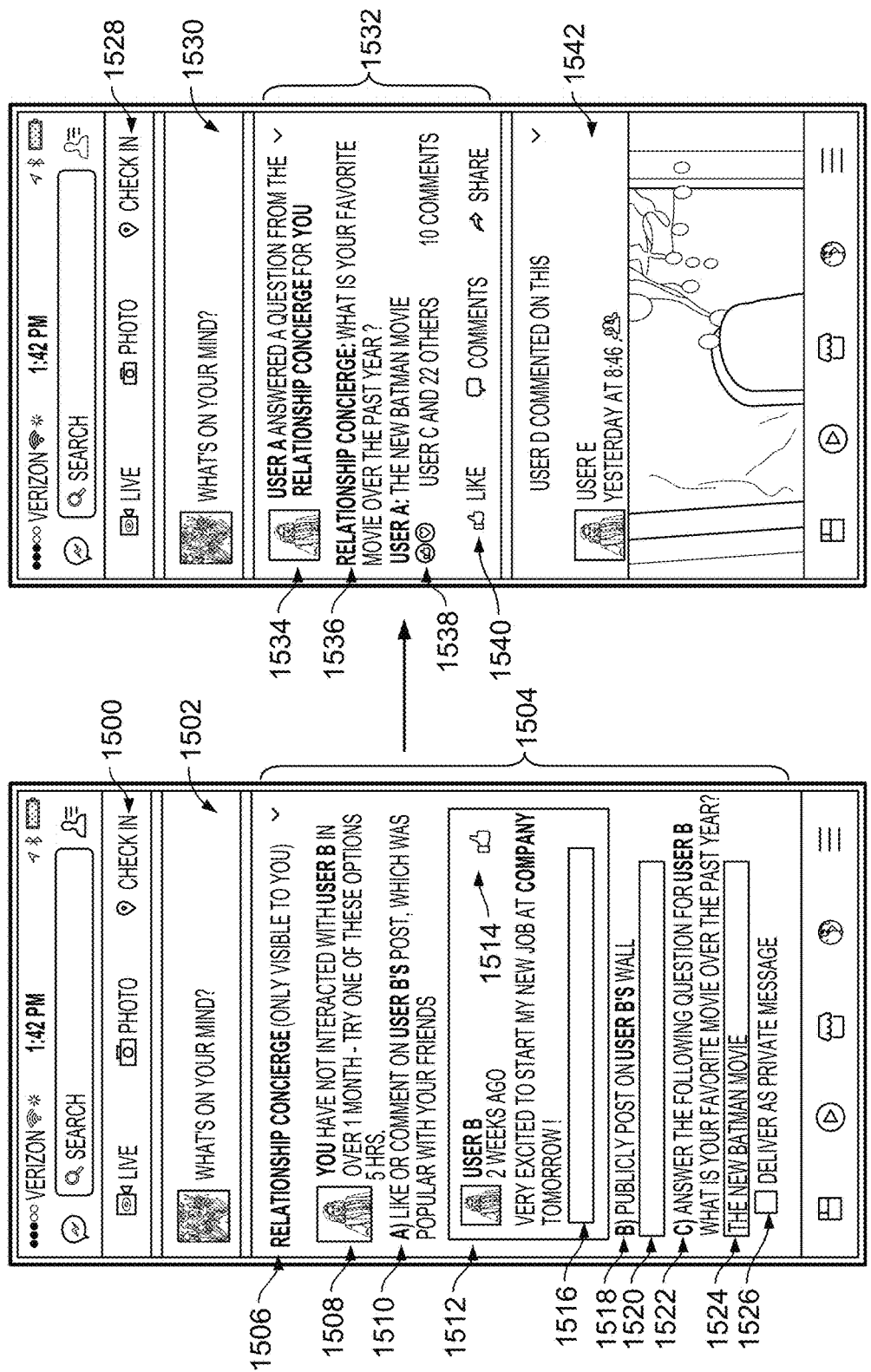

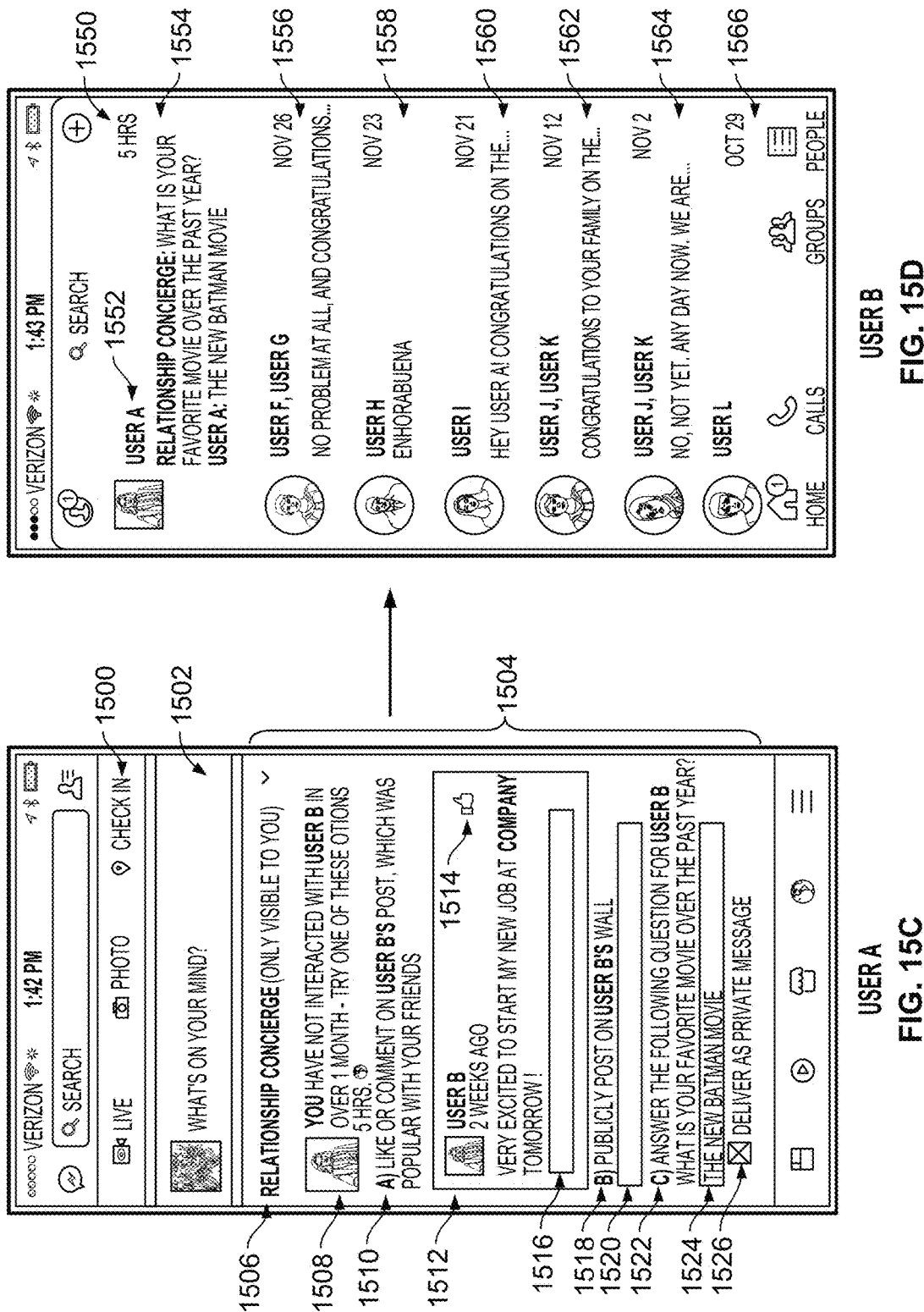
FIG. 15C USER A
FIG. 15D USER B

USER RELATIONSHIP ENHANCEMENT FOR SOCIAL MEDIA PLATFORM

CROSS-REFERENCE TO RELATED APPLICATIONS

This application claims the benefit of priority to U.S. Provisional Application Ser. No. 62/441,081, filed Dec. 30, 2016, entitled MEDIA PERSONALIZATION AND SOCIAL MEDIA PLATFORM, the entire contents of which are hereby incorporated by reference.

TECHNICAL FIELD

This specification relates to technology for providing a social media platform to improve the quality of online social interactions among users.

BACKGROUND

Media personalization software, such as video and audio editing software, provides users with features that can be used to combine media content (e.g., videos, audio, images, text) in various ways. For example, video editing software can allow a user to trim video clips, combine video clips, add audio tracks, and to add graphics, images, and text. Video editing software can rely on users to retrieve and identify video clips for editing, the manner and timing with which video clips are combined, and the ultimate composition of the final video.

While social media platforms (e.g., FACEBOOK, TWITTER, LINKEDIN, INSTAGRAM) vary in their approach to online interactions between users, social media platforms generally provide features through which users can share information and interact with a broader collection of users on the platform. For example, users on social media platforms can post content that is then distributed to other users on the social media platform, such as friends, followers, or fans of the user posting the content. Such distribution of content among users can be non-private in that it is broadcast among a broad group of users, which can sometimes be people without any sort of social connection to the posting user.

SUMMARY

This document generally describes improved technology for personalizing media content to more consistently and efficiently generate emotionally impactful personalized media content. Computer systems, techniques, and devices are described for automating the personalization of media content to ensure that personalized content is presented at appropriate times and places on the underlying media content that is being personalized, and to ensure that the quality of the underlying media content is undisturbed by the personalization. For example, music and videos often have "chill" moments that are emotionally impactful for listeners/viewers, such as the chorus in the song "Let It Go" from the movie Frozen. The technology described in this document can automate generation of a personalized "mediagram" (personalized media content conveying a message) based on an excerpt of the song "Let It Go" with personalization (e.g., text, images, video, audio) at appropriate times and locations around the song's chorus to provide an emotionally impactful message that leverages the chill moment from the song.

This document also generally describes an improved social platform to enhance the quality of social interactions and relationships among users. Such a social platform can include a variety of features, such as private communication channels between users centered around the user relationships, relationship concierge features to facilitate and improve the quality of social interactions, time delays between social interactions to alleviate the pressure and stress on users of needing to respond quickly, temporary social interactions that are inaccessible to users involved in the interactions after a threshold period of time, private group communication channels and group relationship concierge features, relationship scoring features, personalized media content creation and distribution features, interactive and social emotional well-being meters through which users can identify their own emotional state and the states of other users, and/or combinations thereof. Such features can assist users in building and maintaining strong relationships with other users.

In one implementation, a method for automatically generating personalized videos includes outputting, in a user interface on a client computing device, information identifying a plurality of preselected videos, wherein each of the plurality of preselected videos (i) are excerpts of longer videos and (ii) include at least one emotionally impactful moment; receiving, through an input subsystem on the client computing device, selection of a particular video from the plurality of preselected videos; retrieving, by the client computing device and in response to receiving the selection, the particular video and a personalization template for the particular video, wherein the personalization template designates particular types of media content to be combined with the video at particular locations to maximize the at least one emotionally impactful moment for an intended recipient; outputting, by the client computing device, a plurality of input fields prompting the user to select the particular types of media content from one or more personal repositories of media content; automatically retrieving, in response to user selections through the plurality of input fields, personal media content from the one or more personal repositories of media content; automatically assembling, by the client computing device and without user involvement beyond the user selections, a personalized video that includes the particular video and the personal media content at the particular locations in the video; and outputting, by the client computing device, the personalized video.

Such an implementation can optionally include one or more of the following features. The longer videos can be full-length music videos that include audio tracks containing full-length songs. The plurality of preselected videos can include audio tracks containing excerpts of the full-length songs. An audio track for the particular video, in its entirety, can be an excerpt of the audio track for a particular longer video. A video track for the particular video can include (i) a first portion that is an excerpt of a video track for the particular longer video and (ii) one or more second portions that are filler video not from the particular longer video. The one or more second portions of the particular video can be locations in the particular video where personalized video tracks derived from the personal media content are automatically inserted. The video tracks can be derived from the personal media content are not inserted at or over the first portion. The first portion of the video track can correspond to an emotionally impactful moment in the particular video. Personal media content can be designated as being the most emotionally impactful from among the personal media content is automatically positioned immediately following the first portion. The longer videos can be full-length movies that include audio tracks containing full-length movie sound tracks. The plurality of preselected videos can include audio tracks containing excerpts of the full-length movie sound tracks.

The personal media content can include one or more of: digital photos, digital videos, and personalized text. The method can further include automatically analyzing, by the client computing device, waveforms for another longer video to automatically identify an emotionally impactful moment; determining, by the client computing device, starting and end points within the other longer video based on intro and outro transition points within a threshold timestamp from the emotionally moment in the other longer video; automatically generating, by the client computing device, a video excerpt from the other longer video using the starting and end points; and adding the video excerpt from the other longer video to the plurality of preselected videos. The method can further include generating a personalization template for the video excerpt from the other longer video based, at least in part, on the location of the emotionally impactful moment within the video excerpt. The automatic waveform analysis can be performed based on one or more of the following waveform characteristics: mode, volume, tempo, mood, tone, and pitch. The personalized video can include a mediagram that is intended to provide an emotionally impactful message that is specifically tailored to a relationship between a sender and recipient.

In another implementation, a method for providing a social media platform for enhancing and improving social interactions among users includes retrieving, by a relationship concierge running on a social media system, (i) user profiles for a first user and a second user, and (ii) a relationship profile for a relationship between the first user and the second user; retrieving, by the relationship concierge, historical interactions among the first user and the second user on the social media platform; determining, by the relationship concierge, whether provide a social interaction prompt to one or more of the first user and the second user based on the user profiles, the relationship profile, and the historical interactions, wherein the social interaction prompt provides a call to action for interaction within the relationship between the first user and the second user; identifying, in response to determining that the social interaction prompt is to be provided, the first user from among the first and second users as the recipient of the social interaction prompt; automatically transmitting, by the relationship concierge and without a request from either the first or second user, the social interaction prompt to a first client computing device for the first user, wherein the social interaction prompt is only visible to the first user until the first user responds to the prompt; receiving, at the relationship concierge, a response from the social interaction prompt; automatically transmitting, by the relationship concierge and without a request from either the first or second user, the response with the social interaction prompt to a second client computing device for the second user, wherein the social interaction prompt and the response are presented to the second user by the second client computing device based on the first user having provided the response.

Such an implementation can optionally include one or more of the following features. The social interaction prompt can include a question that is posed to the first user. The social interaction prompt can include the first user being directed to create a mediagram for the second user. The mediagram can include a personalized video segment that is automatically personalized to provide an emotionally impactful message that is particularly tailored to the relationship between the first and second users. The social interaction prompt can include an interactive game to be played by the first and second users. The first and second users can interact on the social platform via a private wall that is exclusive to the first and second users. The social interaction prompt can be initially only visible on the private wall to the first user. The social interaction prompt can become visible on the private wall to the second user in only after and in combination with the response to the social interaction prompt by the user. The second user can be delayed from replying to the response for at least a threshold period of time following the response and the social interaction prompt appearing to the second user on the private wall. The response and the social interaction prompt can be automatically deleted from the private wall after a threshold amount of time or interactions have elapsed since they appeared on the private wall.

In another implementation, a computer-implemented method includes receiving from a first user a selection of a sub-portion of a music video that includes audio from a sub-portion of a song and video that corresponds to the audio; receiving from the first user personalization content entered into a template that designates particular types of media content to be combined with the music video at particular locations of the music video; providing, to a second user who was designated by the first user, an indication that the content is available for review by the second user; and providing, to the second user and in response to a second user confirmation of the provided indication, the sub-portion of the music video in combination with the personalization content.

Such an implementation can optionally include one or more of the following features. The method can further include previously determining portions in each of a plurality of music videos, sub-portions of each of the plurality of music videos that will have an increased impact on a viewer of the sub-portions as compared to other sub-portions of the music videos. Determining the portions can include manually reviewing the videos with trained human classifiers. Determining the portion can include identifying which portions of particular videos are played the most by visitors to one or more on-line video sites. Determining the portions can include performing automatic music analysis of a plurality of different music videos to identify musical patterns previously determined to have an emotional effect on a typical listener. The personalization content can include a textual message entered by the first user. The second user can be provided with one or more bumpers created by the first user and appended to the front, back, or both of the video sub-portion.

In another implementation, a system for providing a social media platform to enhance the quality of online social interactions among users, the system including: first and second client computing devices that are running social media applications for the social media platform, each of the social media applications being programmed to provide a graphical user interface (GUI) that presents digital content retrieved over the internet from the social media platform and to receive user inputs via one or more graphical input elements in the GUI, the first client computing being associated with a first user and the second client computing device being associated with a second user; a digital profile repository storing (i) user profiles for a first user and a second user, and (ii) a relationship profile for a relationship between the first user and the second user; a relationship history database storing historical interactions among the first user and the second user on the social media platform; and a relationship concierge to facilitate meaningful social interactions among the first and second client computing devices, the relationship concierge being programmed to: retrieve the user profiles for the first user and the second user, and the relationship profile for the relationship between the first user and the second user from the digital profile repository, retrieve the historical interactions among the first user and the second user on the social media platform from the relationship history database, determine whether to provide a social interaction prompt to one or more of the first client computing device and the second client computing device based on the user profiles, the relationship profile, and the historical interactions, wherein the social interaction prompt provides a call to action for interaction within the relationship between the first user and the second user, identify, in response to determining that the social interaction prompt is to be provided, the first client computing device from among the first and second users as the recipient of the social interaction prompt, automatically transmit, without a request from either the first client computing device or the second client computing device, the social interaction prompt to a first client computing device, wherein the social interaction prompt is only presented in the GUI on the first client computing device for the first user until the first user responds to the prompt, and the social interaction prompt is not transmitted to the second client computing device or presented in the GUI on the second client computing device, receive a response to the social interaction prompt from the first client computing device, and automatically transmit, without a request from either the first client computing device or the second client computing device, the response with the social interaction prompt to the second client computing device for presentation in the GUI on the second client computing device, wherein the social interaction prompt and the response are presented in the GUI on the second client computing device based on the first user having provided the response.

Such an implementation can optionally include one or more of the following features. The social interaction prompt can include a question that is posed in the GUI on the first client computing device to the first user. The social interaction prompt can include the first user being directed to create a mediagram for the second user, wherein the mediagram comprises a personalized digital video segment that is automatically personalized to provide an emotionally impactful message that is particularly tailored to the relationship between the first and second users. The social interaction prompt can include an interactive game to be played by the first and second users. The GUI on the first client computing device and the GUI on the second client computing device can provide a private wall that is exclusive to the relationship between the first and second users, the social interaction prompt can initially be only visible on the private wall presented by the first client computing device to the first user, and the social interaction prompt can become visible on the private wall presented by the second client computing device to the second user only after and in combination with the response to the social interaction prompt by the user. The GUI in the second client computing device can delay the second user from replying to the response for at least a threshold period of time following the response and the social interaction prompt being presented on the private wall of the second client computing device. The GUI in the second client computing device (i) can inactivate the graphical input elements to receive a reply from the second user until after a delayed response period has elapsed, and (ii) can presents timing information identifying an amount of time remaining until the delayed response period has elapsed, and the GUI in the first client computing device can also present the timing information identifying an amount of time remaining until the delayed response period has elapsed for the second user to respond. The GUI in the second client computing device (i) can activate the graphical input elements to receive a reply from the second user during a delayed response period and (ii) can present timing information identifying an amount of time remaining until the delayed response period has elapsed and the reply from the second user will be transmitted to the first client computing device, and the GUI in the first client computing device can also present the timing information identifying an amount of time remaining until the delayed response period has elapsed for the second user's reply to be transmitted to the first client computing device. The response and the social interaction prompt can be automatically deleted from the private wall after a threshold amount of time or interactions have elapsed since they appeared on the private wall.

In another implementation, a computer-implemented method for providing a social media platform to enhance the quality of online social interactions among users, the computer-implemented method comprising: retrieving, from a digital profile repository storing (i) user profiles for a first user and a second user, and (ii) a relationship profile for a relationship between the first user and the second user, user profiles for the first user and the second user, and the relationship profile for the relationship between the first user and the second user, retrieving, from a relationship history database storing historical interactions among the first user and the second user on the social media platform, historical interactions among the first user and the second user on the social media platform, and facilitating meaningful social interactions among the first and second client computing devices that are running social media applications for the social media platform, each of the social media applications being programmed to provide a graphical user interface (GUI) that presents digital content retrieved over the internet from the social media platform and to receive user inputs via one or more graphical input elements in the GUI, the first client computing being associated with the first user and the second client computing device being associated with the second user, the facilitating including: determining whether to provide a social interaction prompt to one or more of the first client computing device and the second client computing device based on the user profiles, the relationship profile, and the historical interactions, wherein the social interaction prompt provides a call to action for interaction within the relationship between the first user and the second user, identifying, in response to determining that the social interaction prompt is to be provided, the first client computing device from among the first and second users as the recipient of the social interaction prompt, automatically transmitting, without a request from either the first client computing device or the second client computing device, the social interaction prompt to a first client computing device, wherein the social interaction prompt is only presented in the GUI on the first client computing device for the first user until the first user responds to the prompt, and the social interaction prompt is not transmitted to the second client computing device or presented in the GUI on the second client computing device, receiving a response to the social interaction prompt from the first client computing device, and automatically transmitting, without a request from either the first client computing device or the second client computing device, the response with the social interaction prompt to the second client computing device for presentation in the GUI on the second client computing device, wherein the social interaction prompt and the response are presented in the GUI on the second client computing device based on the first user having provided the response.

Such an implementation can optionally include one or more of the following features. The social interaction prompt can include a question that is posed in the GUI on the first client computing device to the first user. The social interaction prompt can include the first user being directed to create a mediagram for the second user, wherein the mediagram comprises a personalized digital video segment that is automatically personalized to provide an emotionally impactful message that is particularly tailored to the relationship between the first and second users. The social interaction prompt can include an interactive game to be played by the first and second users. The GUI on the first client computing device and the GUI on the second client computing device can provide a private wall that is exclusive to the relationship between the first and second users, the social interaction prompt can initially be only visible on the private wall presented by the first client computing device to the first user, and the social interaction prompt can become visible on the private wall presented by the second client computing device to the second user only after and in combination with the response to the social interaction prompt by the user. The GUI in the second client computing device can delay the second user from replying to the response for at least a threshold period of time following the response and the social interaction prompt being presented on the private wall of the second client computing device. The GUI in the second client computing device (i) can inactivate the graphical input elements to receive a reply from the second user until after a delayed response period has elapsed, and (ii) can presents timing information identifying an amount of time remaining until the delayed response period has elapsed, and the GUI in the first client computing device can also present the timing information identifying an amount of time remaining until the delayed response period has elapsed for the second user to respond. The GUI in the second client computing device (i) can activate the graphical input elements to receive a reply from the second user during a delayed response period and (ii) can present timing information identifying an amount of time remaining until the delayed response period has elapsed and the reply from the second user will be transmitted to the first client computing device, and the GUI in the first client computing device can also present the timing information identifying an amount of time remaining until the delayed response period has elapsed for the second user's reply to be transmitted to the first client computing device. The response and the social interaction prompt can be automatically deleted from the private wall after a threshold amount of time or interactions have elapsed since they appeared on the private wall.

In another implementation, a non-transitory computer-readable medium for providing a social media platform to enhance the quality of online social interactions among users and storing instructions, that when executed, cause one or more processors to perform operations including: retrieving, from a digital profile repository storing (i) user profiles for a first user and a second user, and (ii) a relationship profile for a relationship between the first user and the second user, user profiles for the first user and the second user, and the relationship profile for the relationship between the first user and the second user, retrieving, from a relationship history database storing historical interactions among the first user and the second user on the social media platform, historical interactions among the first user and the second user on the social media platform, and facilitating meaningful social interactions among the first and second client computing devices that are running social media applications for the social media platform, each of the social media applications being programmed to provide a graphical user interface (GUI) that presents digital content retrieved over the internet from the social media platform and to receive user inputs via one or more graphical input elements in the GUI, the first client computing being associated with the first user and the second client computing device being associated with the second user, the facilitating including: determining whether to provide a social interaction prompt to one or more of the first client computing device and the second client computing device based on the user profiles, the relationship profile, and the historical interactions, wherein the social interaction prompt provides a call to action for interaction within the relationship between the first user and the second user, identifying, in response to determining that the social interaction prompt is to be provided, the first client computing device from among the first and second users as the recipient of the social interaction prompt, automatically transmitting, without a request from either the first client computing device or the second client computing device, the social interaction prompt to a first client computing device, wherein the social interaction prompt is only presented in the GUI on the first client computing device for the first user until the first user responds to the prompt, and the social interaction prompt is not transmitted to the second client computing device or presented in the GUI on the second client computing device, receiving a response to the social interaction prompt from the first client computing device, and automatically transmitting, without a request from either the first client computing device or the second client computing device, the response with the social interaction prompt to the second client computing device for presentation in the GUI on the second client computing device, wherein the social interaction prompt and the response are presented in the GUI on the second client computing device based on the first user having provided the response.

Such an implementation can optionally include one or more of the following features. The social interaction prompt can include a question that is posed in the GUI on the first client computing device to the first user.

In another implementation, a system for generating digital media files includes a digital media file repository, a front end system, a backend system, and a digital media distribution system. The digital media file repository stores a plurality of preselected digital video files that are excerpts of longer digital video files. The plurality of preselected digital video files are encoded in a common digital video codec and are stored with metadata that identifies times within the plurality of preselected digital video files at which emotionally impactful moments occur.

The frontend system is in communication with client computing devices. The frontend system receives digital media file content generation requests from the client computing devices that include parameters identifying particular preselected digital video files to be combined with personal digital media files to generate personalized digital video files. The personal digital media files include personal digital video files, personal digital audio files, personal text, and personal digital image files that are uploaded to the frontend system by the client computing devices. the personal digital video files are encoded across a plurality of digital video codecs.

The backend system generates the personalized digital video files using the particular preselected digital video files and the personal digital media files. The backend system being programmed to: convert the personal digital video files from the plurality of digital video codecs to the common video codec; retrieve personalization digital media templates that designate (i) particular types of media content to be combined with the particular preselected digital video files and (ii) particular times within particular preselected digital video files at which the particular types of media content are to be combined with the particular preselected digital video files, the particular times being relative to the times within the plurality of preselected digital video files at which the emotionally impactful moments occur; assemble digital media content for the personalized digital video files using particular preselected digital video files, the digital media templates, and the personal digital media files, the personal digital media files being (i) positioned at the particular times relative to the times at which the emotionally impactful moments occur in the particular preselected digital video files, (ii) visually combined with video tracks of the particular preselected digital video files so that digital images and videos from the personal digital media files replace the video tracks at the particular times, and (iii) audibly combined with audio tracks for the particular preselected digital video files so that audio from the personal digital media files are automatically mixed with the audio tracks at the particular times, wherein the video tracks and the audio tracks for the particular preselected digital video files at the times at which the emotionally impactful moments occur remain unmodified in the assembled digital media content; encode the assembled digital media content using the common video codec to generate the personalized digital video files; and store the personalized digital video files. The digital media distribution system is configured to transmit the personalized digital video files to the client computing devices.

Such an implementation can optionally include one or more of the following features. The longer digital video files can be full-length music videos containing full-length songs and the plurality of preselected digital video files can be excerpts of the full-length music videos that include the emotionally impactful moments. The longer digital video files can be full-length movies and the plurality of preselected digital video files can be excerpts of the full-length movies that include the emotionally impactful moments. The personalized digital video files can comprise mediagrams that include a personalized message centered around the emotionally impactful moments in the particular preselected digital video files and the mediagrams can be configured to be digitally sent from one client computing device to another client computing device. The personal digital media files can have variable lengths of time. Assembling the digital media content can include adding one or more portions of digital filler content so as (i) to fit the personal digital media files with variable lengths of time at the particular times according to the digital media templates and (ii) ensure that the video tracks and the audio tracks for the particular preselected digital video files at the times at which the emotionally impactful moments occur remain unmodified in the assembled digital media content. The one or more portions of digital filler content can be loops of digital content derived from the particular preselected digital video files. The one or more portions of digital filler content can be preselected loops of digital content.

In another implementation, a computer-implemented method includes receiving digital media file content generation requests from client computing devices that include parameters identifying particular preselected digital video files to be combined with personal digital media files to generate personalized digital video files, the personal digital media files including personal digital video files, personal digital audio files, personal text, and personal digital image files, the personal digital video files being encoded across a plurality of digital video codecs, the preselected digital video files being excerpts of longer digital video files, the preselected digital video files being encoded in the common digital video codec and being stored with metadata that identifies times within the preselected digital video files at which emotionally impactful moments occur. The method further includes converting the personal digital video files from the plurality of digital video codecs to a common video codec. The method further includes retrieving personalization digital media templates that designate (i) particular types of media content to be combined with the particular preselected digital video files and (ii) particular times within particular preselected digital video files at which the particular types of media content are to be combined with the particular preselected digital video files, the particular times being relative to the times within the plurality of preselected digital video files at which the emotionally impactful moments occur. The method further includes assembling digital media content for the personalized digital video files using particular preselected digital video files, the digital media templates, and the personal digital media files, the personal digital media files being (i) positioned at the particular times relative to the times at which the emotionally impactful moments occur in the particular preselected digital video files, (ii) visually combined with video tracks of the particular preselected digital video files so that digital images and videos from the personal digital media files replace the video tracks at the particular times, and (iii) audibly combined with audio tracks for the particular preselected digital video files so that audio from the personal digital media files are automatically mixed with the audio tracks at the particular times, wherein the video tracks and the audio tracks for the particular preselected digital video files at the times at which the emotionally impactful moments occur remain unmodified in the assembled digital media content. The method further includes encoding the assembled digital media content using the common video codec to generate the personalized digital video files. The method further includes storing the personalized digital video files. The method further includes transmitting the personalized digital video files to the client computing devices.

Such an implementation can optionally include one or more of the following features. The longer digital video files can be full-length music videos containing full-length songs and the plurality of preselected digital video files can be excerpts of the full-length music videos that include the emotionally impactful moments. The longer digital video files can be full-length movies and the plurality of preselected digital video files can be excerpts of the full-length movies that include the emotionally impactful moments. The personalized digital video files can comprise mediagrams that include a personalized message centered around the emotionally impactful moments in the particular preselected digital video files and the mediagrams can be configured to be digitally sent from one client computing device to another client computing device. The personal digital media files can have variable lengths of time. Assembling the digital media content can include adding one or more portions of digital filler content so as (i) to fit the personal digital media files with variable lengths of time at the particular times according to the digital media templates and (ii) ensure that the video tracks and the audio tracks for the particular preselected digital video files at the times at which the emotionally impactful moments occur remain unmodified in the assembled digital media content. The one or more portions of digital filler content can be loops of digital content derived from the particular preselected digital video files. The one or more portions of digital filler content can be preselected loops of digital content.

In another implementation, a computer program product encoded on a non-transitory storage medium comprises non-transitory, computer readable instructions for causing one or more processors to perform operations. The operations include receiving digital media file content generation requests from client computing devices that include parameters identifying particular preselected digital video files to be combined with personal digital media files to generate personalized digital video files, the personal digital media files including personal digital video files, personal digital audio files, personal text, and personal digital image files, the personal digital video files being encoded across a plurality of digital video codecs, the preselected digital video files being excerpts of longer digital video files, the preselected digital video files being encoded in the common digital video codec and being stored with metadata that identifies times within the preselected digital video files at which emotionally impactful moments occur. The operations further include converting the personal digital video files from the plurality of digital video codecs to a common video codec. The operations further include retrieving personalization digital media templates that designate (i) particular types of media content to be combined with the particular preselected digital video files and (ii) particular times within particular preselected digital video files at which the particular types of media content are to be combined with the particular preselected digital video files, the particular times being relative to the times within the plurality of preselected digital video files at which the emotionally impactful moments occur. The operations further include assembling digital media content for the personalized digital video files using particular preselected digital video files, the digital media templates, and the personal digital media files, the personal digital media files being (i) positioned at the particular times relative to the times at which the emotionally impactful moments occur in the particular preselected digital video files, (ii) visually combined with video tracks of the particular preselected digital video files so that digital images and videos from the personal digital media files replace the video tracks at the particular times, and (iii) audibly combined with audio tracks for the particular preselected digital video files so that audio from the personal digital media files are automatically mixed with the audio tracks at the particular times, wherein the video tracks and the audio tracks for the particular preselected digital video files at the times at which the emotionally impactful moments occur remain unmodified in the assembled digital media content. The operations further include encoding the assembled digital media content using the common video codec to generate the personalized digital video files. The operations further include storing the personalized digital video files. The operations further include transmitting the personalized digital video files to the client computing devices.

Such an implementation can optionally include one or more of the following features. The longer digital video files can be full-length music videos containing full-length songs and the plurality of preselected digital video files can be excerpts of the full-length music videos that include the emotionally impactful moments. The longer digital video files can be full-length movies and the plurality of preselected digital video files can be excerpts of the full-length movies that include the emotionally impactful moments. The personalized digital video files can comprise mediagrams that include a personalized message centered around the emotionally impactful moments in the particular preselected digital video files and the mediagrams can be configured to be digitally sent from one client computing device to another client computing device. The personal digital media files can have variable lengths of time. Assembling the digital media content can include adding one or more portions of digital filler content so as (i) to fit the personal digital media files with variable lengths of time at the particular times according to the digital media templates and (ii) ensure that the video tracks and the audio tracks for the particular preselected digital video files at the times at which the emotionally impactful moments occur remain unmodified in the assembled digital media content. The one or more portions of digital filler content can be loops of digital content derived from the particular preselected digital video files. The one or more portions of digital filler content can be preselected loops of digital content.

Particular implementations may realize none, one or more of the following advantages. For example, media content can be personalized in ways that ensure that synchronization between audio and video portions of the underlying media content are not disrupted. When editing media content, particularly when overlaying video and/or audio tracks across different devices, video and audio can get out of sync.

In another example, media content personalization can be streamlined to provide novice users with the ability to readily create impactful personalized content. In particular, a user interface can be presented to users that narrows the field of options for personalization down to a limited number through the use of preselected media content excerpts, personalization templates, guided personalization steps, and other features to ensure emotionally impactful personalized content is created.

In another example, social platforms can facilitate improved and more meaningful social interactions and relationships between users through a variety of features, such as private walls, relationship concierges, time delays for interactions, personalized media content distribution, time-limited social content, and/or combinations thereof. For instance, given the open nature of many social platforms (meaning that posts are viewable to a broad audience of users), social interactions can be guarded and reserved. By providing a social platform in which a primary mechanism for interacting with other users is either private walls or private group walls, user interactions can be with smaller and more intimate sets of users, which can help users drop their guard and interact more naturally/honestly. In another instance, relationship concierges can automate and assist users in building and maintaining strong relationships by prompting users with ways to interact with each other. In a further instance, personalized media content creation and distribution on a social platform can assist users in conveying emotionally impactful messages that may otherwise be difficult to express through traditional social media interactions (e.g., posts, images, text). In another instance, mandatory time delays for interactions between users can alleviate the pressure, stress, and burden that users feel to promptly respond to interactions in order to avoid expressing disinterest with a late response or no response at all. In a further instance, time-limited social content can additionally promote more natural/honest social interactions (help users drop their guard) by ensuring that social interactions on the platform will not persist for perpetuity, but instead will be inaccessible to both users after a period of time or after a series of interactions. The app can force both senders and recipient to be reflective based on the app forcing them to have a delay before sending/receiving the message. The time delays introduce a component of "scarcity" which enforces reflection, anticipation and attention to detail, fostering better relationships.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-F are screenshots that collectively show an example sequence of steps for creating and distributing a mediagram.

FIGS. 12A-H are screenshots of an example process flow for a relationship concierge facilitating and improving social interactions among users via private walls on a social platform.

FIGS. 15A-D are screenshots of a relationship concierge being applied to other social platforms providing predominantly open communication among broad groups of users.

Like reference numbers and designations in the various drawings indicate like elements.

DETAILED DESCRIPTION

Figure 1:
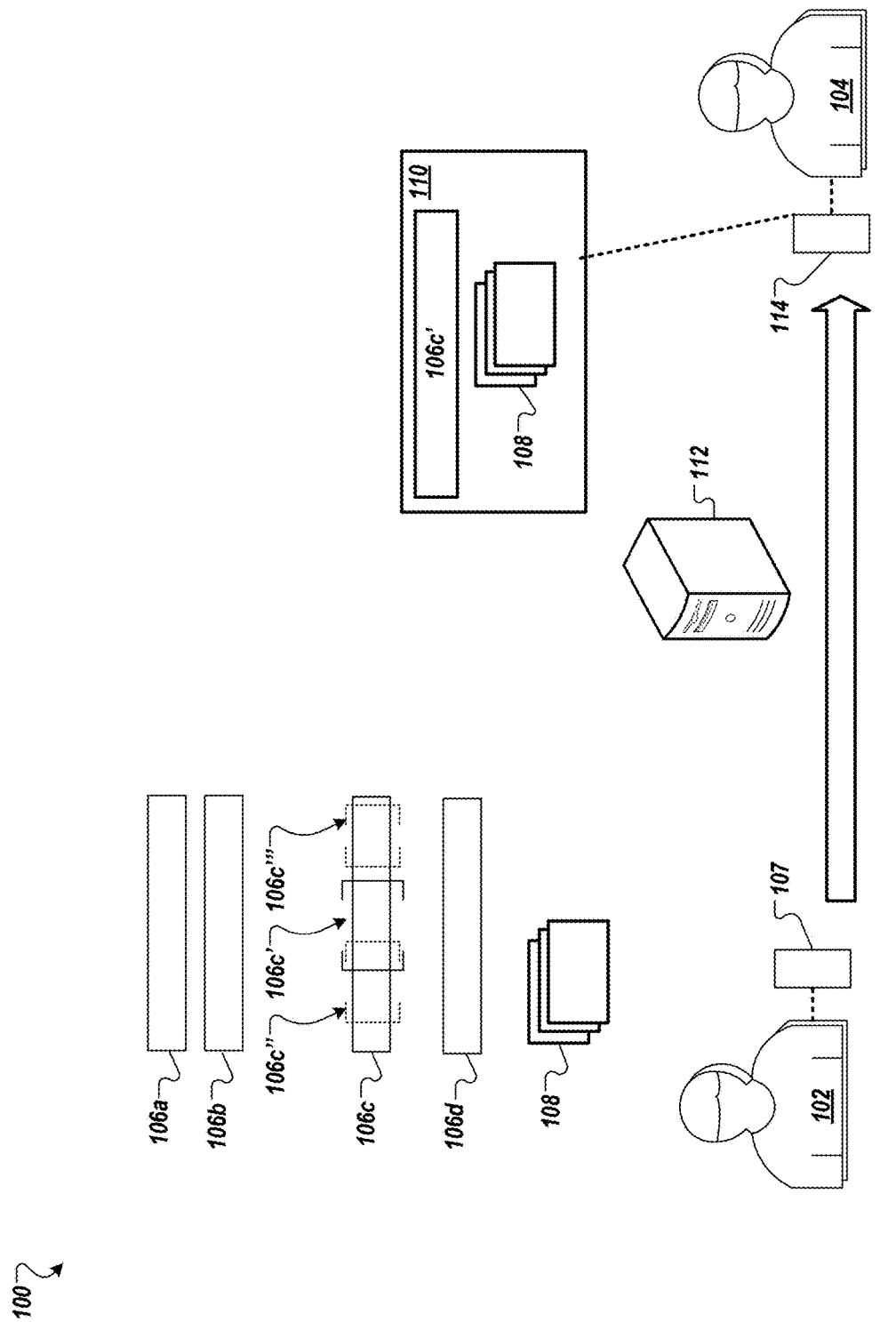
FIG. 1 is a block diagram of an example system for generating personalized media content.

FIG. 1 is a block diagram of an example system 100 for generating personalized media content, such as mediagrams. A mediagram can be personalized media content that is configured in a particular manner to convey an emotionally impactful message between users. Mediagrams can include, for example, underlying media content that is combined with other, personal media content to provide personalization to the underlying media content. Media content can include, for instance, music and/or video excerpts, movie excerpts, music files, images, television clips (ex. SNL skits), Viral videos (ex. Home videos that have been popularized), concert videos, and/or other types of media. For example, a mediagram can be an excerpt from a music video that is personalized with text, images, audio, and video.

A mediagram that is produced by the system 100 can be a ready-to-play presentation of media that is prepared by a sender 102 and sent to at least one recipient 104. The mediagram can include, for example, music files and other media that are combined into the mediagram in a way that is personalized by the sender 102. Personalization can include adding personalized messages and/or other elements to the media, including text, audio, images, video, etc., which can overlay and/or adjoin segments of the media. For example, personalization can be a caption that precedes or accompanies an image, a video, or some other media segment.

As an example, the system 100 can provide, for presentation to the sender 102, different media segments that can be selected by the sender 102 for personalization. For example, the sender 102 can select from among media content 106a-106d (e.g., music videos, music, movies, videos). The media content 106a-106b may be presented to the sender 102, for example, upon execution of a search query (e.g., to find songs for specific artists, titles, subjects, genres, etc.). Selection of media content can be made, for example, from the sender's library of downloaded and/or owned media content, generated from a subscribed list of available songs, and/or in some other way. Presentation of the media content 106a-106d, as well as other aspects of a user interface for creating mediagrams, can be presented on a user device 107 of the sender 102.

In some implementations, media content and/or excerpts of media content (e.g., portions of a song, portions of a movie, portions of a music video) can be pre-selected to provide a chill moment, which can be a point in a song or other media that has been shown to provide a chill to a viewer of the media (e.g., moment that provides tingles, a chill running down one's spine, a significant emotional and/or physical response, or some other reaction by the recipient 104). Example chill moments in songs include a particular note or passage in a song, particular lyrics, and/or other features that are otherwise emotionally impactful upon users. Example chill moments in a movie or video can include a chase scene or an important scene, such as a celebratory moment, the death of a character, or some other significantly impactful segment.

In some implementations, media content with chill moments can be identified in a catalog of chill moments, which may be stored in (and available from) a proprietary catalog. Each chill moment, identified for a particular song or movie, for example, can identify a point in the particular song or movie that produces a "chill" reaction (in an audience of the media) that results in a sensation that is similar to feeling cold, getting goosebumps, having one's hair stand on end, or some other physiological reaction. Such reactions can include, for example, an increased heart rate, an increased respiration rate, in increased skin conductance (or "galvanic skin response"), or some other physiological response. Sources for chills can include, for example, music (e.g., most potent), visual arts, speeches (e.g., notable speechmakers), beauty (or other breath-taking appearance), or physical contact. The intensity and/or effect of chills can be affected by factors such as mode, volume, tempo, mood, tone, and pitch, or other factors that may help to convey or amplify emotion. Generally, it can be assumed that chill moments can only exist for music or video that have already been experienced before, such as by at least one user.

In the depicted example, the sender 102 select the media content 106c from among the media content 106a-106d. While the selected media content 106c can refer to the entire media content (e.g., the entire song, the entire movie, the entire music video), the sender 102 can select from among media content excerpts 106c'-106c''' (segments of the media content 106), each of which may include the chill moment that the sender 102 wishes to share with the recipient 104. The excerpts 106c'-106c''' can be pre-designated for the media content 106c (e.g., manually designated, crowd sourced) and/or automatically identified (e.g., waveform analysis). Each of the other media content 106a-b and 106d can additionally include one or more excerpts that are proposed to the sender 102 for selection.

In the depicted example, the sender 102 selects the excerpt 106c' for personalization. However, at this point the media content excerpt 106c' has yet to be personalized (e.g., just a segment of a music video without personalization). The sender 102 can be prompted to identify personal media content to add to the selected excerpt 106c', such as overlaying a portion of the excerpt 106c' (e.g., photo overlaying a portion of a music video, text overlaying a portion of a movie), being presented adjacent to the selected excerpt 106c' (e.g., video that is played before or after the excerpt 106c'), and/or other combinations with the excerpt 106c'. The sender 102 can be guided through selection of media content for the excerpt 106c' by the sender's device 107, which can be programmed, for example, to use one or more personalization templates to assist the sender 102 in the selection of personalized media content to provide maximize the emotional impact of the personalized media content. For example, the sender 102 can be prompted to enter a textual message for the recipient 104, then to provide up to 10 seconds of a personalized video message to the recipient 104, and then to provide up to 3 photos that include both the sender 102 and the recipient 104. In the depicted example, the sender 102 selects the example personal media content 108 (e.g., photos, videos, audio, text) to be used to personalize the excerpt 106c' for the mediagram.

A server system 112 (e.g., cloud computer system) can receive the selection of the media content excerpt 106c' along with the personal media content 108 and can generate a mediagram to be delivered to the recipient 104. Such generation can include, for example, referencing one or more personalization templates to determine how to combine the excerpt 106c' with the personal media content 108 (as well as referencing particular instructions/designations for the mediagram made by the sender 102). The generation can also be completed using digital rights management code, which can be encoded into the resulting mediagram to manage aspects of copyrights and payment of royalties and/or other fees. The mediagram can be output, for example, in the form of deliverable media 110 (e.g., video file, audio file) that results from audio, video, images, text, and/or other media content items being assembled by a server 112. For example, the deliverable media 110 can be a single video file and that is transmitted to a computing device 114 for the recipient 104.

In some implementations, the component parts of the mediagram, including the associated media segments, can be sent individually (e.g., not in the form of deliverable media 110) and assembled by the computing device 114 for presentation to the recipient 104.

The deliverable media 110 can be provided to the device 114 using one or more features to protect against piracy. For example, the deliverable media 110 can be provided in a "lock box" to protect media and avoid piracy. The lock box may include a feature that prevents consumption of the mediagram unless the recipient 104 provides credentials or some other form of authentication. In another example, the mediagram can include features that control the number of times and/or a timeframe over which the mediagram is presented, such as a single time or a limited number of times, or an expiration time that limits presentation of the mediagram to a time-limited viewing. In another example, the mediagram deliverable 110 can include digital rights management (DRM) features and/or other techniques for copyright protection of digital media, including restricting copying of media and preventing unauthorized redistribution. In another example, the device 114 of the recipient 104 may be required to install/run/load a specialized/authorized media player (or an application providing similar functionality) to view content of the mediagram.

The mediagram deliverable 110 can be distributed to the device 114 in any of a variety of ways, such through an account that the recipient 104 may have on the server system 112 (e.g., push notification provided to mobile app on the device 114 that is hosted by the server system 112), by transmitting a link to the deliverable 110 (e.g., sending an email including a uniform resource locator (URL) for the deliverable 110, sending a text message including the URL for the deliverable). Other ways of providing notification to the recipient 104 that the deliverable 110 is available and ready for him/her to access it are also possible.

Figure 2:
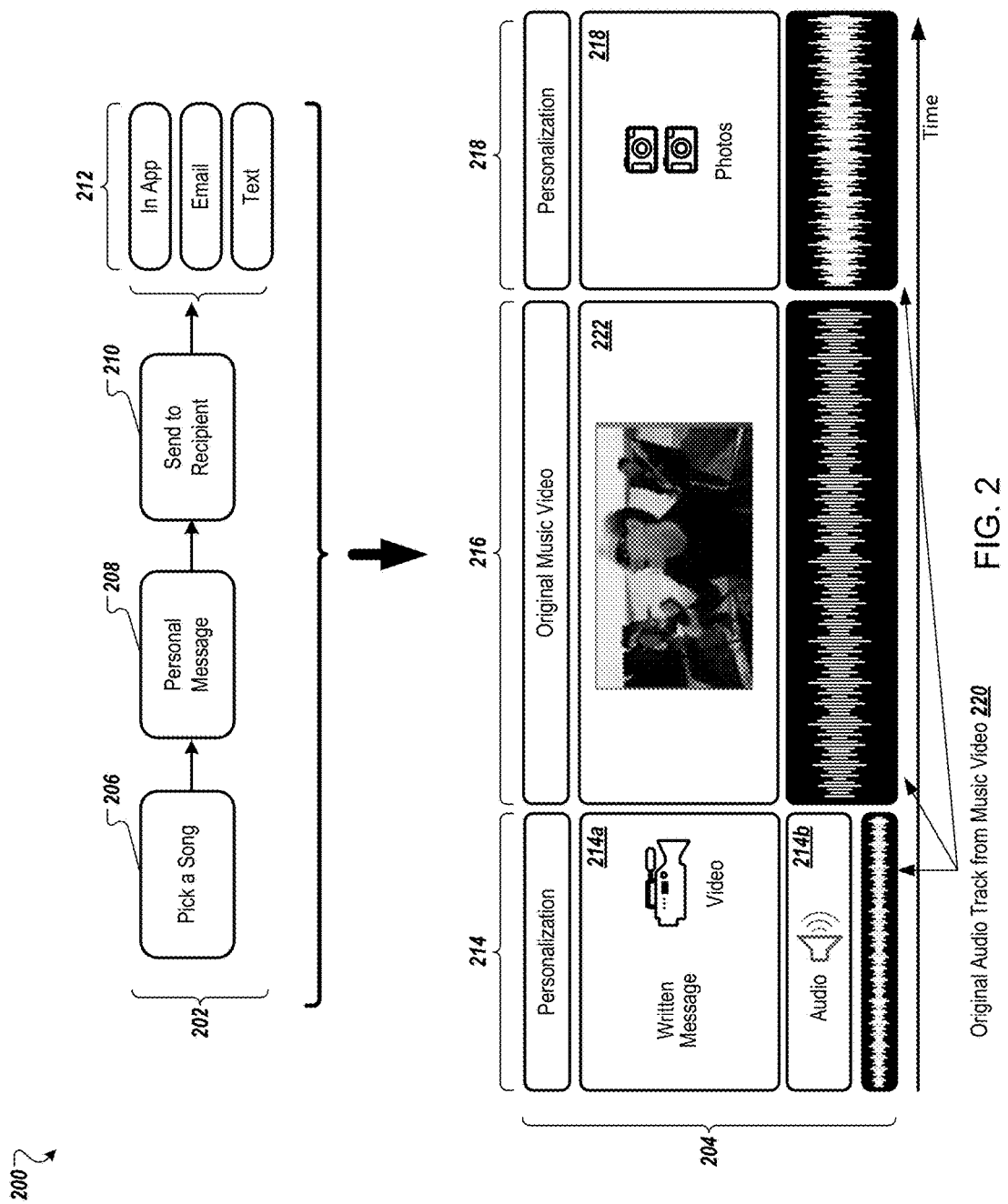
FIG. 2 is a block diagram showing an example technique for creating and delivering a personalized mediagram to a recipient.

FIG. 2 is a block diagram 200 showing an example technique 202 for creating and delivering a personalized mediagram 204 to a recipient. In the depicted example, the mediagram 204 is created using a music video as the underlying media content that is being personalized.

To create the mediagram 204, a user can starts by selecting a song that will be personalized (206). For example, referring to FIG. 1, the sender 102 selects a song from pre-made categories or uses a search feature to identify songs by artist, song title, or occasion/subject (e.g., Christmas songs, love songs, etc.), or in some other way. The user can then create a personal message through personal media content that the user selects (208). For example, referring to FIG. 1, the sender 102 can designate text, audio, photos, videos, and/or other personal media content to be added and/or otherwise combined with the selected song to generate the mediagram 204. As described above with regard to FIG. 1, the user can be guided through the selection and designation of the personal media content for the mediagram, such as through the use of personalization templates that can identify specific types of media content that should be added to particular locations of the song excerpt to maximize the emotional impact of the mediagram. Additionally and/or alternatively, for senders and receiver pairs who have relationships modeled by a relationship concierge (e.g., users of the social platforms described below with regard to FIGS. 8-21 that use relationship concierges to facilitate and improve social interactions), the relationship concierge can be used to identify and select personal media content for the mediagram. The relationship concierge can be used alone and/or in combination with other features guiding personal media content selection for the mediagram, such as the personalization temples, with the systems, techniques, and devices described throughout this document.

For instance, the example mediagram 204 can include personalization that is added to an original music video 222 for the song selected by the user (206). The mediagram 204 may be for the entire music video 222 or just a portion of the music video 22, such as an excerpt of the music video 222 that has a chill moment in the song as its focal point. The mediagram 204 includes audio and video tracks, one or both of which can be personalized by the user at various points in the mediagram 204. In this example, the original audio track 220 (not personalized) from the music video run the entire length of the mediagram 204, but the original video track (not personalized) for the music video 222 runs for only the middle portion 216 of the mediagram 204. The video tracks for the beginning 214 and end 218 of the mediagram 204 in this example are personalized with personal media content designated by the user. For example, the video track for the beginning portion 214 of the mediagram 204 includes a written message and a video 214*a*, and the video track for the end portion 218 of the mediagram 204 includes photos 218. Although the original audio 220 for the music video 222 runs the entire length of the mediagram 204, it is combined (blended) with personalized audio 214*b* that corresponds to the personalized video 214*a* at the beginning of the mediagram 204. The user can be guided through the process of selecting personal media content (214*a-b*, 218) for personalizing the music video 222, such as with a personalization template to assist the user in identifying the best type of media content to select to make the mediagram 204 emotionally impactful upon the recipient.

Although not made explicit in the technique 202, once the personal message (214*a-b*, 218) has been obtained from the user, the mediagram 204 can be automatically assembled so to generate a high-quality mediagram deliverable that combines the personal media content with the original music video 222. These steps can be performed automatically by a computing device (e.g., client computing device, server system) without the user having to designate how the original or personal media content should be assembled, let alone go through the process of laying out audio and video tracks for the mediagram 204. Additionally, the personal media content (214*a-b*, 218) can be automatically positioned at or around the chill moment in the music video 222 so that the mediagram 204 will be emotionally impactful for the recipient with regard to the sender and the relationship between the sender and recipient.

The assembly of the mediagram 204 with original and personal media content is one example. Other configurations and arrangements of personal media content with regard to original media content are also possible.

Once the mediagram 204 has been created, it can be sent to the recipient (210), such as by specifying the recipient's contact information (phone number, email, social network identifier, etc.). Once specified, the mediagram 204 can be delivered either directly (e.g., file transmission) or indirectly (e.g., link transmission, notification) to the recipient along one or more communication channels (212), such as in-app communications, email, or text message. Depending on the delivery method, the recipient can be prompted to send a response (e.g., via a social platform), download an application (to render the mediagram), or to subscribe to a mediagram service, some or all of which may be free or have a cost to the recipient and/or sender.

Figure 3:
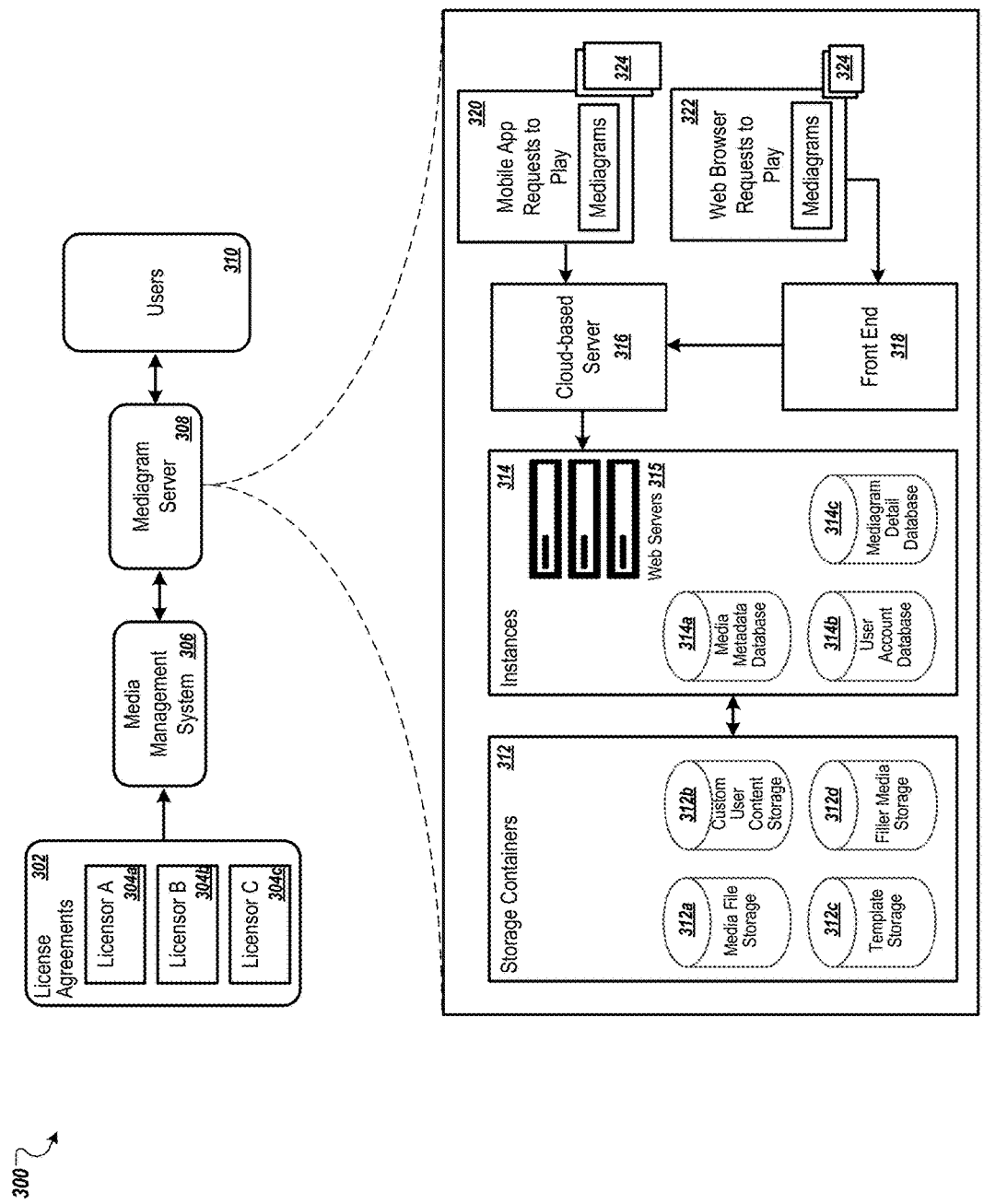
FIG. 3 is a block diagram of an example system for generating and consuming mediagrams.

FIG. 3 is a block diagram of an example system 300 for generating and consuming mediagrams. The system 300 can host a mediagram creation and deliver service that can provide services to users, like the generation, storage, and distribution of mediagrams that are created by the users. The system 300 can use license agreements 302 that are held with licensors 304, such as music, movie, and other media content copyright owners. When used for generating and consuming mediagrams, for example, the system 300 can refer as needed to the license agreements 302 in order to remain protected under copyright and other restrictions and laws associated with the owners who license content to be used in mediagrams.

License agreements with copyright holders can dictate what media content is provided by the mediagram server 308 for users to incorporate into their mediagrams. A media management system 306 can be dedicated to ensuring that all of the original media content in a library used by the mediagram server 308 is currently licensed with the licensors A-C (304*a-c*). The media management system 306 can maintain the license agreements 302 and a library of licensed original media content that have been downloaded from the licensors 304*a-c*. The media management system 306 can additionally generate licensed media content excerpts that include chill moments and provide them to the mediagram server 308, which can store it in a repository 312*a* of licensed media content. Over time, as some media content falls out of license, the media management system 306 can purge unlicensed media content from the media file storage 312*a* that is used by the mediagram server 308.

A mediagram server 308 can store and manage mediagrams generated by users 310, who may subscribe to or otherwise be enrolled with the mediagram service. The mediagram server 308 can provide a server system through which users can create and distribute personalized mediagrams using preselected and licensed content from the media management system 306. For example, the mediagram server 308 can store excerpts of songs, videos and other content obtained from the media management system 306. Using the mediagram server 308, for example, users 310 can request and/or access new music and other content from the media management system 306, and use the content to create mediagrams. The users 310 can also stream and/or distribute their mediagrams at any time. The mediagram server 308 can include tools, including templates, that allow a user who is not proficient in media editing to easily create mediagrams The process of generating a mediagram can include identifying chill moments, "hooks," and/or other features in the media content (e.g., punchline of a joke) that elicit one or more target emotional responses in a user, and then generating excerpts that include the chill moments, hooks, or other features eliciting emotional responses in users. A hook is a musical idea, often a short riff, passage, or phrase, that is used in popular music to make a song appealing and to "catch the ear of the listener." The term "hook" generally applies to popular music, especially rock, R&B, hip hop, dance, and pop. In some implementations, chill moment identification can be done automatically using an algorithm based on a variety of different factors, such as changes in tempo, mode, volume, mood, tone, pitch, etc. Chill moment identification can also be done using crowd-sourced identification of popular moments in songs, such as using information from previous user selections of (or identification of) favorite song parts. Identification can be done manually by trained professionals. Hook identification and other emotion-eliciting feature identification can be performed in similar ways and can additionally and/or alternatively be used to generate excerpts in the systems, techniques, and devices described throughout this document.

As shown in an expanded view of media management system 306, storage containers 312 can store media and associated files for use in generating mediagrams. For example, media file storage 312a can store the actual media used in the mediagrams (e.g., media content excerpts with chill moments), including media that is obtained from the media management system 306. Custom user content storage 312b can store personalizations that users have added to their mediagrams and/or the finalized mediagrams themselves.

Template storage 312c can store templates that can be used by users creating mediagrams, which can simplify the process of creating mediagrams and allow users having little or no experience in combining media to nonetheless generate mediagrams. Templates can identify and/or suggest (to the user) specific types of personalization to insert at various points in media, and suggestions on what to insert for different media content categories. Templates can be specific to media files, meaning that each media file (e.g., song, video, etc.) can have one or more templates that help coordinate a user-identified personalization to the specific chill moment in the media so that the chill moment is the most impactful/powerful. Additional templates can exist for different categories, such as romance, celebration, birthday, or other categories.

Filler media storage 312d, can include snippets or other lengths of audio/visual media that can be inserted during some or all of the personalization to accommodate variable length personalized content. For example, the media content excerpts that are used to generate mediagrams can be centered around chill moments in the media content excerpts, which can be designed to occur in a middle to middle-end portion of the excerpt. Accordingly, changing the length of a mediagram to accommodate variation on the length of the personal content to be added to the excerpt can throw off the positioning of the chill moment in the mediagram. Fillers can be added to the beginning and/or the end of the excerpt to accommodate for variation in the length of the mediagram due to variable personal content without disrupting the positioning of the chill moment within the mediagram. Filler content can be looped portions (e.g., one or two bars) of instrumentals in musical content, musical content with lyrics, or a few seconds of video content. Filler content can include copyright free content that matches up well with the media content.

The mediagram server 308 can include web servers, various data stores, and services for mediagram instances 314, which can be extensible and scalable (e.g., cloud computer system). For example, web servers 315 can provide access to external entities that access mediagrams. A media metadata data store 314a can include metadata associated with media stored in the media file storage 312a. A user account database 314b can identify users to the mediagram system and the users' account information. A mediagram detail database 314c can include definitions of mediagrams that have been generated by users.

The mediagram server 308 can include at least one cloud-based server 316, such as implemented or provided by Amazon Elastic Load Balancers (ELB), that distributes mediagrams (or provides access) to user computing devices 324. For example, user computing devices 324 that are mobile devices can be used by recipients 104 to receive distributed mediagrams, such as through one or more applications that reside on a mobile device. Desktop implementations of the user computing devices 324, for example, can access mediagram through a front end 318, implemented as Amazon Web Services (AWS). User computing devices 324 of users 310 can be used by both the sender and/or a recipient of a mediagram.

Figure 4B:
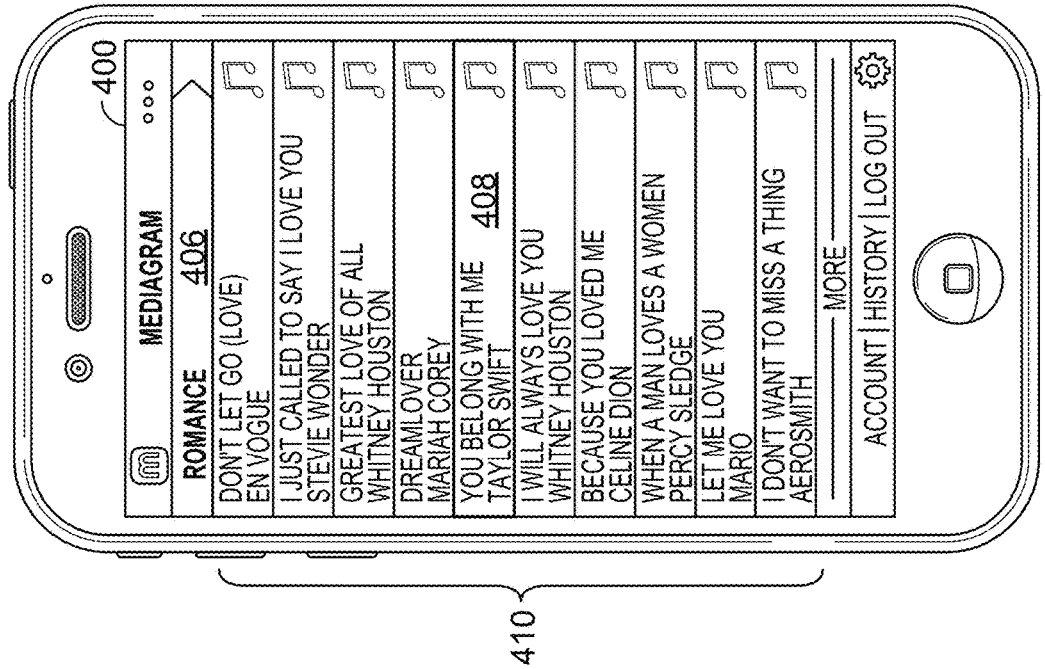

FIGS. 4A-F are screenshots that collectively show an example sequence of steps for creating and distributing a mediagram. For example, FIGS. 4A-E show screenshots captured during use of a mobile application for creating a mediagram, which can also be done through a web application through a web browser, and FIG. 4E shows an example mediagram presented in a social network.

Figure 4A:
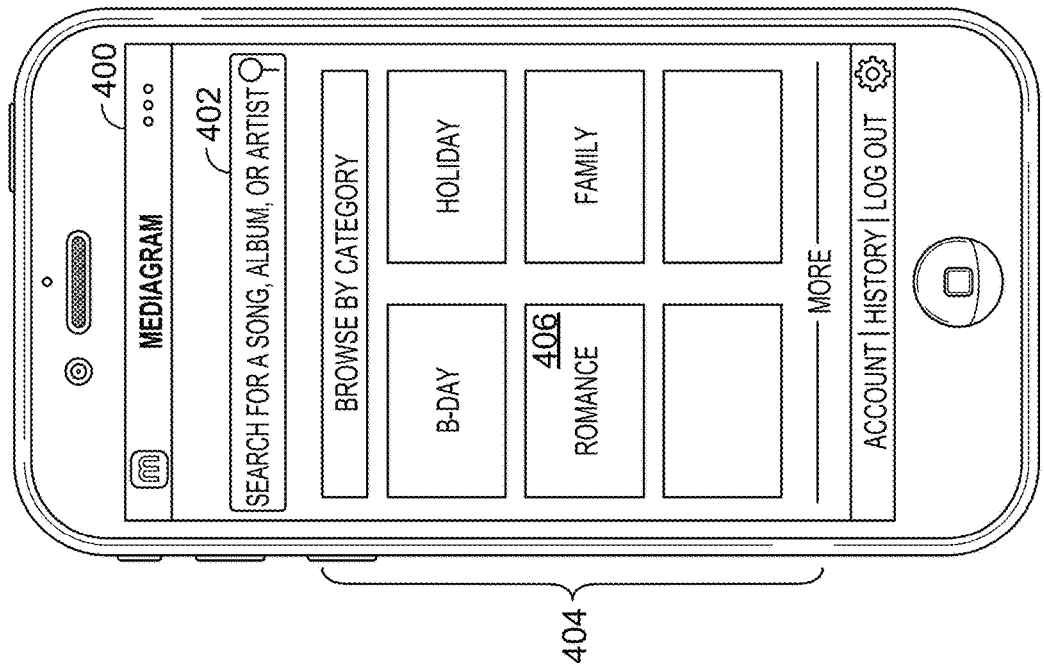

FIG. 4A shows an initial display of an example interface 400 used to identify a media excerpt to use for a mediagram. For example, using a search control 402, a user can search by song, album, artist, or in other ways. Further, controls 404 can be used to browse songs of various categories, such as a romance category 406 that includes songs related to romance. The songs (or other media) that are searchable in the interface 400 can include songs (or other media) stored in the media management system 306. In the depicted example, the user selects the romance category 406.

FIG. 4B shows a display of the example interface 400 that presents media excerpts 410 that are in the romance category 406. Each of the media excerpts 410 can include a chill moment that they are intended to leverage to be emotionally impactful as part of a mediagram. In the depicted example, the media excerpt 408 for a Taylor Swift song is selected from a list 410. Similar or different types of lists can be presented when the search control 402 is used.

Figure 4D:
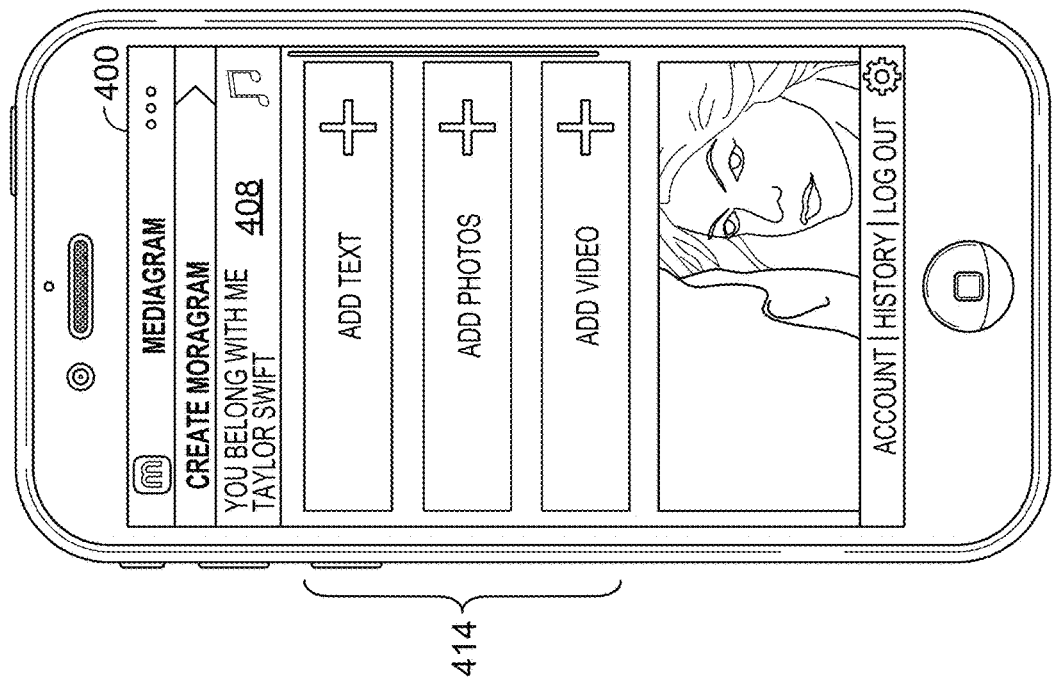
Figure 4C:
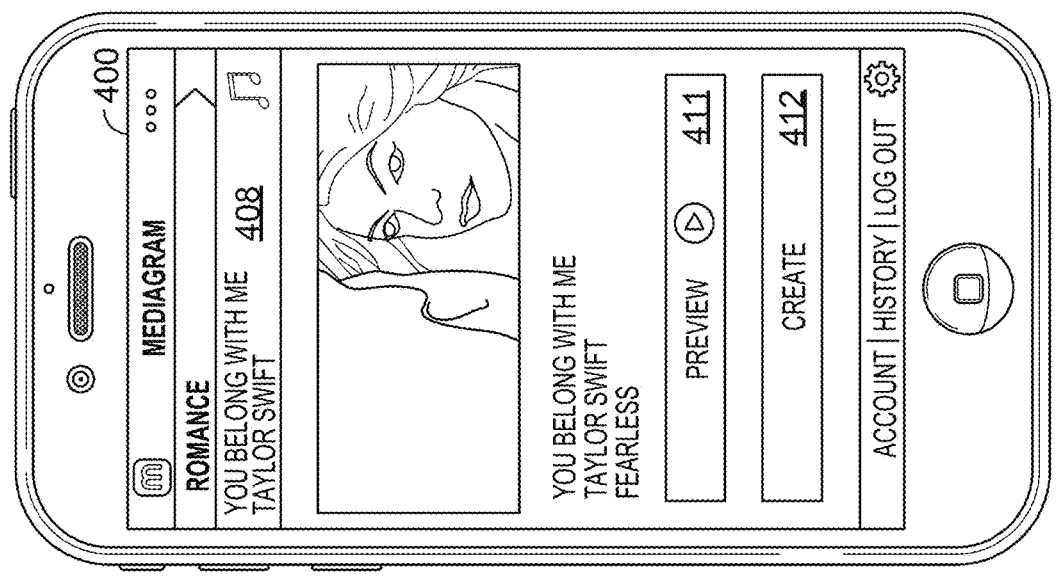

FIG. 4C shows a display of the example interface 400 in which the user can preview the song. For example, using a preview control 411, the user can preview the media excerpt 408. If the user then decides to use the media excerpt 408 (e.g., Taylor Swift song) in a mediagram, then a create control 412 can be used to initially populate a new mediagram with the selected song.

FIG. 4D shows a display of the example interface 400 in which the user can personalize the mediagram. For example, using various controls 414, the user can add text, photos, videos, and/or other types of personal media to the mediagram. Selecting a particular one of the controls 414, for example, can result in the user being guided through selection, using a template, that is specific to the media excerpt 408 (e.g., Taylor Swift song) and/or the romance category 406. As an example, the template may suggest that the user obtain a photo of the user with the recipient, then include a ten-second personalized message or text expressing the user's feelings. The system can then automatically insert the photo and personalized message in the right locations relative to the media excerpt 408, generating a personalized mediagram without requiring user to have media editing knowledge or skills. For example, there is no need for the user to figure out where the photo and personalized message should go (e.g., relative to the chill moment), how to edit video/audio, or how to perform other tasks. As such, automatically inserting the photo and personalized message can create a compilation of a professional-looking video, with complicated details of video editing being handled automatically for the user. Additional controls in the interface 400 can allow the user to preview and view the mediagram once completed.

FIG. 4E shows a display of the example interface 400 in which the user is distributing the mediagram. In this example, the user is sending the mediagram by email, but other distribution channels, including sending via social media, are available through controls 414. The user can select the recipients of the user's mediagram from a contact list 416. Contacts in the contact list 416 can be annotated, such as to differentiate between contacts who have mediagram accounts (e.g., designated with mobile phone/app icons 420) and other contacts who do not have mediagram accounts (e.g., designated by grayed out a respective user icon). If a particular recipient has a mediagram account, then the mediagram can be delivered via their account. Otherwise, if a particular recipient does not have a mediagram account, then the mediagram can be delivered via available contact options (e.g., email, text, social network, etc.).

In some implementations, the user can optionally elect to send a gift with the mediagram. For example, selection of a respective control from controls 422 can lead to additional user interface elements that allow the user to designate a monetary amount of or a selection of a gift that is included (e.g., using a link or an attachment) with the mediagram. Gifts can also be integrated into the mediagram, such as with a link that can navigate the recipient to a web page or other resource from which the gift can be redeemed. The user is also given the ability to download and/or purchase the song or video for their personal use.

FIG. 4F shows a display of the example mediagram 424 displayed on a mobile device of a recipient. For example, the mobile device can present a mediagram entry 426 on a social network page of a User B for the mediagram 424 created by a User A, as indicated by a mediagram social network header entry 428. The mediagram entry 426 can be generated, for example, if the user selected a social network control from the controls 414 in order to share the mediagram with one or more recipients who are friends of the user in the social network. A mediagram song title 430 can identify the media excerpt 408 (e.g., Taylor Swift song) selected by the user. A mediagram description 432 can include, for example, a number of underlined portions that are links to the content, which can help drive cross-user promotion based on the mediagram content. The underlined portions can include, for example, an artist link 432a, a song link 432b for the media excerpt 408, an album link 432c, a gift link 432d (e.g., if a gift was selected using controls 422), and an app link 432e by which a mediagram application can be downloaded.

FIGS. 5A-M are block diagrams showing example assemblies of mediagrams. The block diagrams depicted in FIGS. 5A-M present solutions to various technical problems for mediagram creation. First, a variable amount of user-supplied personalized content (photos, video, text) the length of the audio portion of the license music video playing prior to and after the primary licensed video clip can present a problem for presenting a chill moment at the right time within a mediagram. Audio pre-rolls can be used to account and solve for this. The goal is to provide an audio overlay for the user supplied personalized content that transitions seamlessly into and out of the licensed video clip. Several of the block diagrams depicted in FIGS. 5A-M use pre-rolls to solve for variable personalized content.

Second, video and audio tracks for original content can be licensed together or separately, depending on contractual agreements with various licensors, which can create technical hurdles in generating a mediagram file that is compliant with licensing agreements. For example, some agreements may permit the audio track from a video (e.g., movie, music video) to be licensed separately (and at a lower price point) than the price for licensing the audio and video together. However, some agreements may not permit such bifurcation of audio and video licensing rights. Additionally, some agreements may grant licenses to master audio loops from a song that could be used for pre-roll fillers, but some agreements may not. Some agreements may also grant licenses to lead in or out of the licensed media content with other content (e.g., third party content, in-house generated content), but others may not. The block diagrams depicted in FIGS. 5A-M provide a variety of approaches and file formats for generating mediagrams to accommodate and comply with a wide variety of licensing restrictions imposed by agreements with licensors.

Third, audio and video track synchronization, particularly when they are not licensed together throughout the entirety of the mediagram, can be problematic. To solve for this, several of the block diagrams depicted in FIGS. 5A-M insert blank video on the audio-only licensed portions so that a single video file can be generated and used for personalization. For example, if an excerpt for a music video includes a first portion that is licensed for audio only—meaning that the mediagram system has an audio file for the first portion—and a second portion that is licensed audio and video—meaning that the system has a video file for the second portion—there may be potential issues with synchronization if the first and second portions are adjoined to each other with various personalized user content. To solve for this, a blank video track can be combined with the audio file for the first portion of the excerpt to generate a video file for the first portion of the excerpt. Then, the video file for the first portion and the video file for the second portion can be assembled together to ensure proper synchronization between the first and second portions. After generating this singular video file, the personalization can be added and combined to generate the personalized mediagram.

Figure 5A:
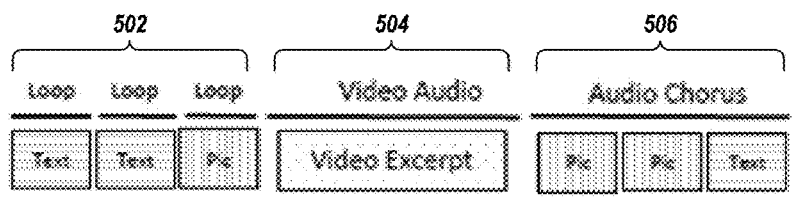
FIGS. 5A-M are block diagrams showing example assemblies of mediagrams.
Figure 5B:
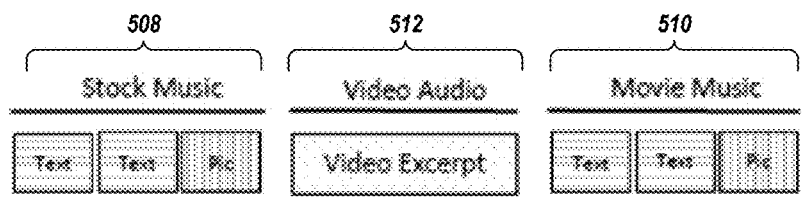

For example, in FIG. 5A, the mediagram includes a licensed video and audio excerpt 504 that is combined with personalization sections 502 and 506 consisting of instrumental music clip loops and audio chorus clips, respectively. In FIG. 5B, a licensed video and audio excerpt 512 is combined with personalization sections 508 and 510 with audio files that are from the different sources. For example, the audio files can consist of in-house created music and/or music from the same source as the excerpt 512 (e.g., the excerpt 512 and the audio 510 can be from the same movie).

Figure 5C:
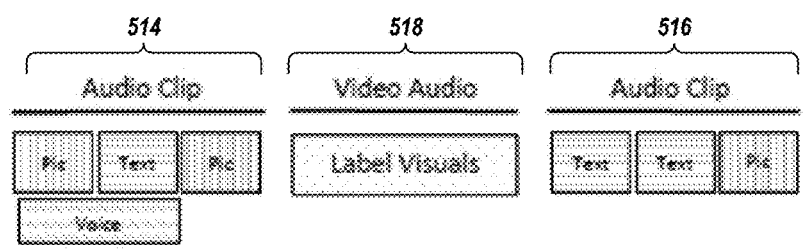

In FIG. 5C, licensed audio 518 is combined with licensed visuals, which are then combined with user-designated audio clips used in the personalization sections 514, 516. The user-designated audio clips can be, for example, music that is uploaded by the user or selected using a mediagram template for the licensed audio 518. The video excerpts can consist of label approved visuals 518 (e.g., album art, concert photos/pictures, concert video, photo shoots, etc.). Label approved visuals 518 can be used, for example, when there is not an available music video, or when label approved visuals are more appropriate than the music video.

Figure 5D:
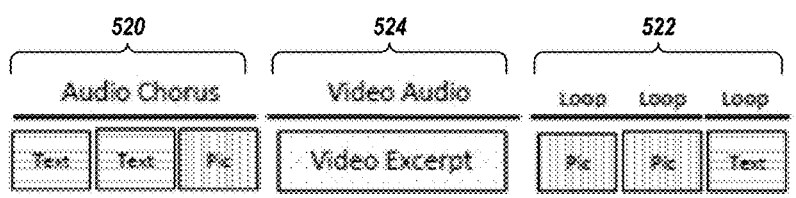

In FIG. 5D, personalization section 520 consists of complete audio section, and personalization section 522 consists of looping segments of a song, e.g., associated with licensed video audio excerpt 524.

Figure 5E:
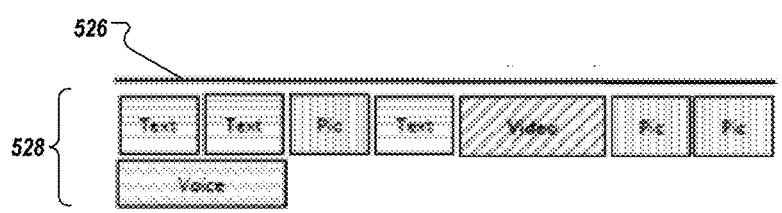

In FIG. 5E, there is a solid piece of licensed or user-generated audio 526 over personalization 528. In this example, there is no video excerpt, and voice audio can take precedent over the audio file.

Figure 5F:
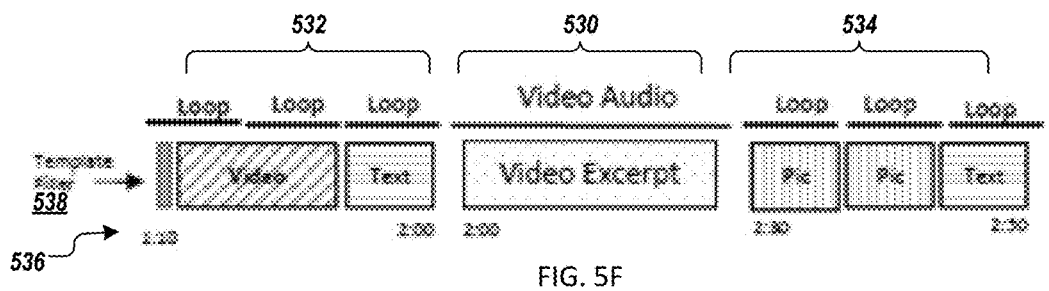

In FIG. 5F, a licensed video audio excerpt 530 is preceded by personalizations 532 and 534, each having a duration of a template-specified or template-aided length of time 536, and each being generated using a template filter 538 that can automatically fit personalization content around a video excerpt. For example, the personalized pictures and text can be a set phrase from the song, but depending on length of the phrase, this time can vary. For instance, if the phrase is three seconds long the app will use three second increments to determine the length of each personalized option. This can seamlessly lead into the excerpt, and can create a standard for the timing of the personalization sections. For instance, a picture can be three seconds and a text box can be three seconds long, which can cause a video to need to fit into a divisible of three seconds. For personalized videos, the app can put the "extra" seconds at the beginning of the video with a template filler, which can solve a technological issue with fitting the personalization section. The loop can be either a continuous video or singular audio loops. For single audio loops, they can be programmatically assembled with personalized media content on the fly. For the video loop, the audio can be, for example, a looping phrase of the song and the visual can be a black screen. The loops can be pre-combined into a single file on the beginning and end of the excerpt, with a black screen over which personalization can be added. The program can be designed to start at the beginning of a loop, with a maximum number of permitted loops for a mediagram. Technological aspects of such a configuration include, at least, a portion of the audio from the licensed music video being chosen for use as looping audio clip. This clip can be pre-chosen and stored as a supplementary file to the licensed music video. The audio clip can be played over the user-supplied content in a loop and then stopped during the playback of the music video, for example.

Figure 5G:
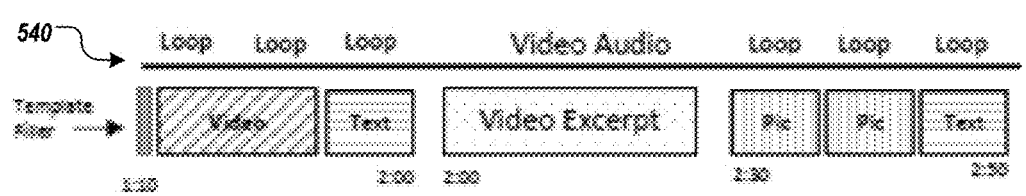

FIG. 5G shows an example mediagram in which the components of the media content being personalized in FIG. 5F (separate loops and video excerpt with audio) are combined into a single, seamless file 540. Creating a seamless file (instead of using the separate component files (loops, video excerpt, video audio) that will be used for personalization), for example, can resolve technological issues associated with presenting individual files, such as audio and video files getting out of sync, and can create a seamless transition that improves the user experience.

Figure 5H:
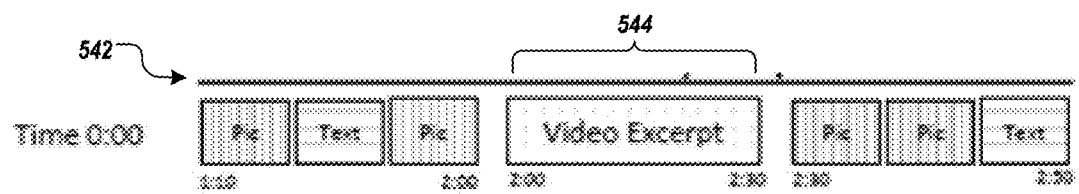

FIG. 5H shows an example mediagram that uses a solid stream of audio 542 that then transitions into a video excerpt 544. For example, in this scenario the music and video tracks are licensed for the entire mediagram, even though the video is only presented during the excerpt 544 portion. The personalization in this example is placed on the video track before or after the excerpt 544. The mediagram system can determine the start and end times for the beginning and end of the video, not the excerpt in the middle, which can provide users will have the ability to extend and contract the audio of the clip depending on how much personalization is added before or after the excerpt without having to use fillers or loops. Thus a mediagram can have varying beginning and end times within the actual song. Personal images and text (and other personal media) can have a preset duration while personal videos can vary in length. In this example, the entire music video (and accompanying audio layer) can be available within the app. The cue point for beginning to play the audio layer of the music video would be determined programmatically on-the-fly by counting the time-values (e.g. in seconds) associated with each piece of user supplied personalization. The licensed audio layer (no video) portion of the video file can be played starting from the calculated cue point. The video portion of the licensed music video can be masked during that time. At the end of the user personalization portion of the playback, the audio layer of the licensed music video can then continue to play, and the video layer can become visible for the licensed video playback portion of the presentation.

Figure 5I:

FIG. 5I shows an example mediagram in which a user has uploaded a voice recording for a personalization 546, and an audio clip is created and licensed by the system for a personalization 548.

Figure 5J:
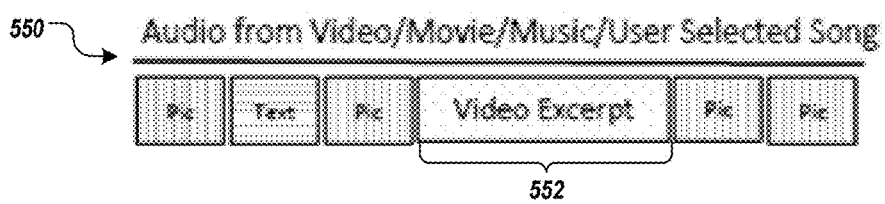

FIG. 5J shows an example mediagram in which a video stream of audio 550 overlays a variety of personalization options, in which inclusion of a video excerpt 552 is optionally included.

Figure 5K:

In FIG. 5K, the audio and video portions of a music video excerpt 556 are licensed along with the audio tracks (not video) for the personalization sections 554 and 558 before and after the excerpt 556. This scenario can involve the two audio only files and a video file being licensed and combined into the mediagram, and can be used, for example, when sync rights will not permit personalization on top of the video portion. Similar to FIG. 5H, personalization before and after the excerpt 556 can be variable in length.

Figure 5L:
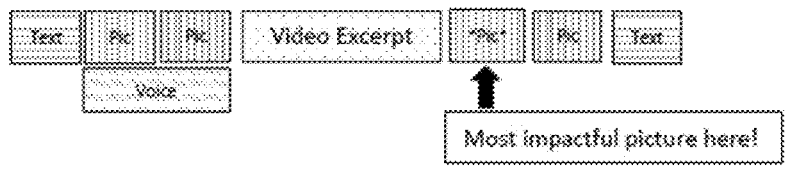

FIG. 5L depicts an example scenario in which a template for the video excerpt guides the user in how to best personalize the mediagram. In this example, the template guides the user to designate the most impactful, sentimental picture, which the mediagram system can automatically place immediately after the video excerpt. Alternatively, the mediagram system can permit the user to place personal media content at various locations and can identify the location where the most impactful picture should be placed, which can correspond with the chill moment.

Figure 5M:
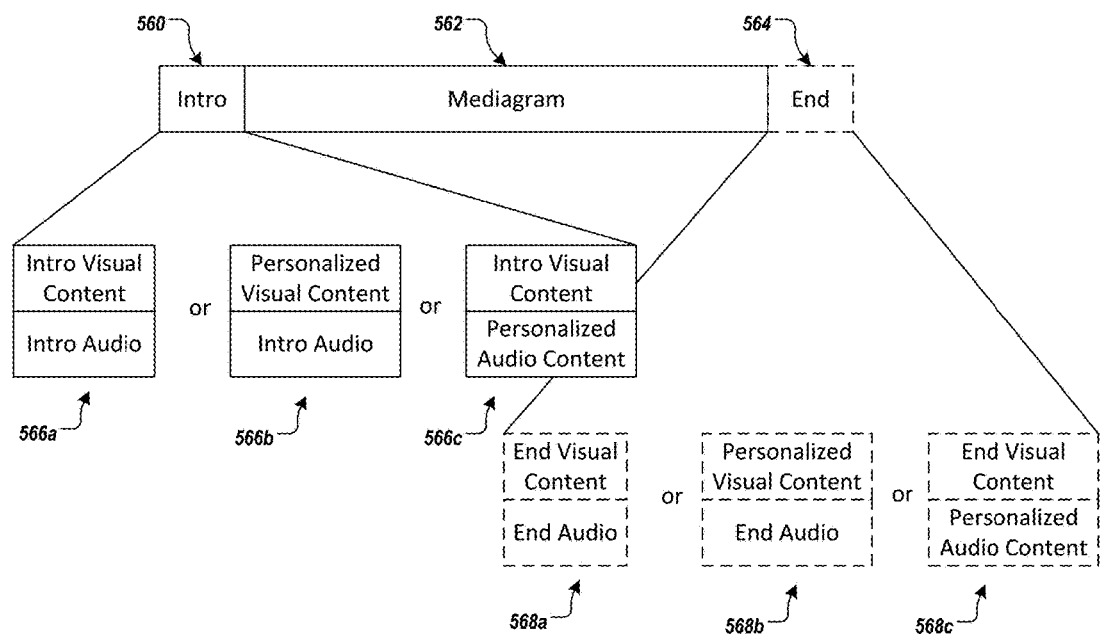

FIG. 5M depicts an example mediagram 562 that has an introduction 560 appended to the start of the mediagram 562 and, in some instances, an end 564 appended to the end of the mediagram 562. The introduction 560 can include any of a variety of different combinations of visual content and audio content, such as the examples 566a-c (other combinations are also possible). For example, the introduction 560 can include a combination of preselected introductory visual content and preselected introductory audio content 566a, a combination of personalized visual content and preselected introductory audio content 566b, a combination of preselected introductory visual content and personalized audio content 566c, and/or other combinations (e.g., combination of preselected and personalized visual content, combination of preselected and personalized audio content). Preselected introductory audio content can be, for example, an audio mark (e.g., music or other audio files that identify a good or service). Preselected introductory video content can be, for example, a visual mark (e.g., logo, animation, name, or other visual content that identifies a good or service). Personalized visual content can be, for example, videos and/or images selected by a user (e.g. user-generated photos and/or videos). Personalized audio content can be, for example, audio recordings selected by a user (e.g., user-recorded audio message). The personalized visual and/or audio content may extend into and be part of the mediagram 562.

Additionally and/or alternatively, the mediagram 562 can include the end 564, which can be similar to the intro 560 in that it can include preselected and/or personalized audio and/or visual content. For example, the end 564 can include a combination of preselected visual and audio content 568a, a combination of personalized visual content and preselected audio content 568b, a combination of preselected visual content and personalized audio content 568c, and/or other combinations.

Figure 6:
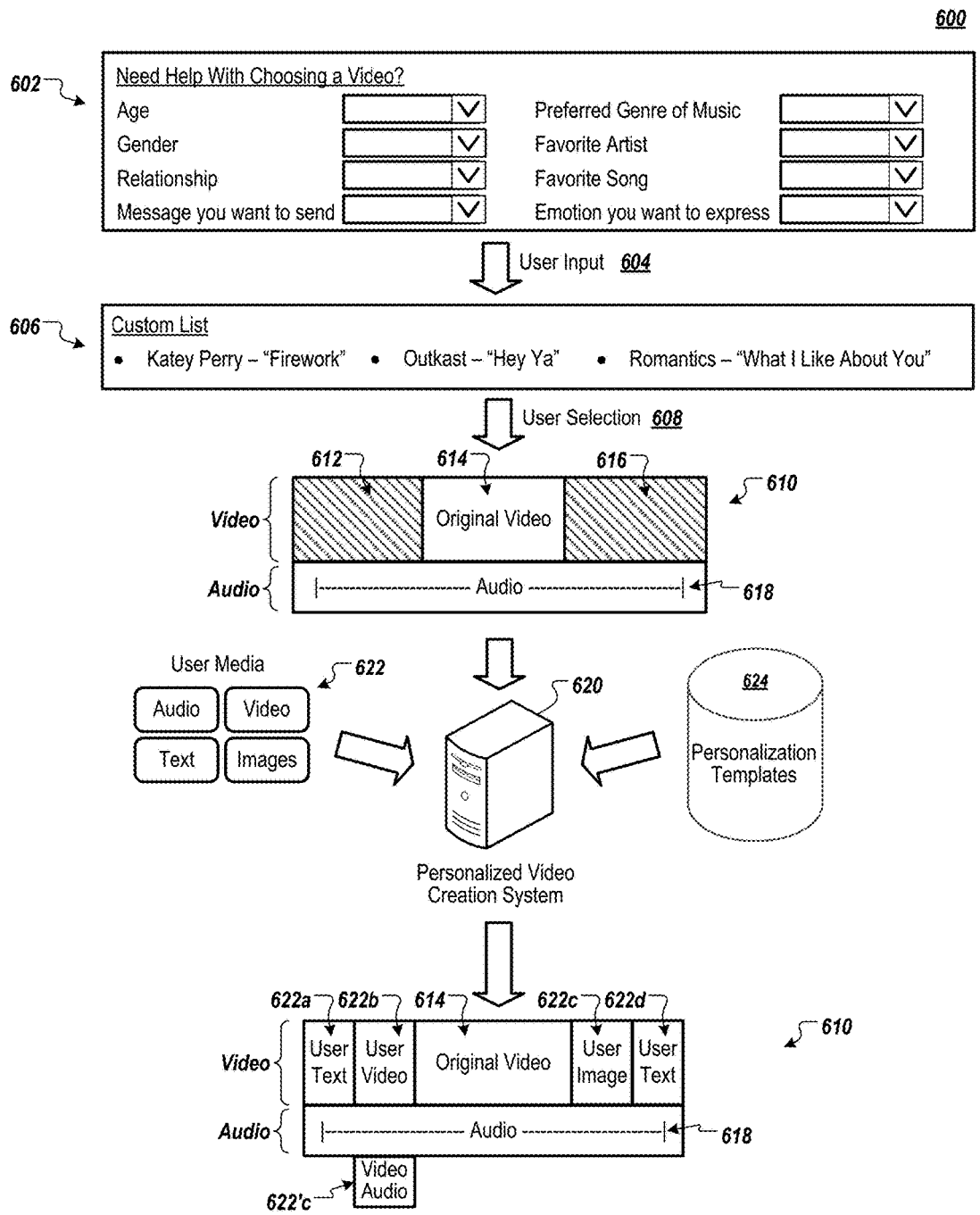
FIG. 6 is a conceptual diagram of an example system for generating personalized media content.

FIG. 6 is a conceptual diagram of an example system 600 for generating personalized media content, such as mediagrams. The example system 600 can facilitate a user search of a video (e.g., a music video), and can present a custom list of videos to the user based on various specified search parameters. In response to receiving a user selection of one of the videos from the custom list of videos, for example, the system 600 can integrate various user-provided media items (e.g., audio, video, text, and/or images) with an excerpt of the selected video, based on a personalization template associated with the selected video.

For example, the system 600 can present user interfaces, such as the user interface 602, to assist the user in selecting a video for a particular recipient. A variety of different features can be used to guide selection for the user's self-expression and for the best fit video for the recipient. For example, the interface 602 can provide a set of questions to guide the user with selecting the best video to express themselves (e.g., provide engagement announcement), not particularly to a specified person. Libraries can be provided for the user on each of the personalized content types: text, photos, videos/animations. The style and tone of the library content presented to a user can be pre-filtered based on prior personalization choices presented within the app (interests, age, sex, etc.). The specific library content presented can also be based on the category of the chosen music video and/or specific tagged keywords applied to it by administrators of the app.

In another example, the interface 602 can provide a set of questions to guide the user with picking the best video to tell a specific user a specified message they want to get across (e.g., provide well wishes to friend who lost a loved one). In addition to a user being able to provide explicit search parameters, the system can use data associated with the user profile and/or supplied at the time of song selection such as occasion, age, nature of the relationship to guide song selection and suggest personalized content. The application can programmatically filter the song list based on tags applied to the song list at the database level. These tags can be similar to the allowed profile choices (age, relationship type, etc.).

In a further example, the interface 602 can prompt a user to answer questions about the user/or recipient to pick which song to use. This can create a personal list of songs to choose from. Such questions can be based on, for example, demographics of recipient (age, gender, occasion, favorite genre of music, relationship, message you want to get across). The answers and contact information (i.e. email address, or other unique identifier) can be stored to create a profile for the user if they sign up with the app. If the recipient responds to the mediagram and signs up, the profile that was saved can populate the recipient's profile.

In another example, cached profiles for recipients generated by other users can be leveraged in song selection. For example, recipient/user profiles can be built based on information other users have provided. When finding what song to pick, stored answers and links to accounts/email addresses can be used to identify songs.

As shown in FIG. 6, the example system 600 can include a personalized video creation system 620. The personalized video creation system 620, for example, can be implemented using one or more computer servers. In some examples, the computing server(s) can include various forms of servers, including, but not limited to a network server, a web server, an application server, or a server farm. The computing server(s) may be configured to execute application code associated with a variety of software components (e.g., modules, objects, libraries, services, etc.) and/or hardware components. Two or more software components, for example, may be implemented on the same computing device, or on different devices, such as devices included in a computer network, a peer-to-peer network, or on a special purpose computer or special purpose processor. Operations performed by each of the components may be performed by a single computing device, or may be distributed to multiple devices.

The personalized video creation system 620, for example, can provide various user interfaces (e.g., web interfaces, client/server interfaces, etc.) for presenting information to users through various types of user devices (e.g., laptop or desktop computers, tablet computers, smartphones, personal digital assistants, or other stationary or portable devices), and for receiving input from the user devices in regard to generating personalized videos. The user devices can communicate with the personalized video creation system 620, for example, over one or more networks, which may include a local area network (LAN), a WiFi network, a mobile telecommunications network, an intranet, the Internet, or any other suitable network or any appropriate combination thereof.

Operations performed by the example system 600 and the personalized video creation system 620 will be described in further detail below, for example, with reference to FIGS. 7A and 7B.

Figure 7A:
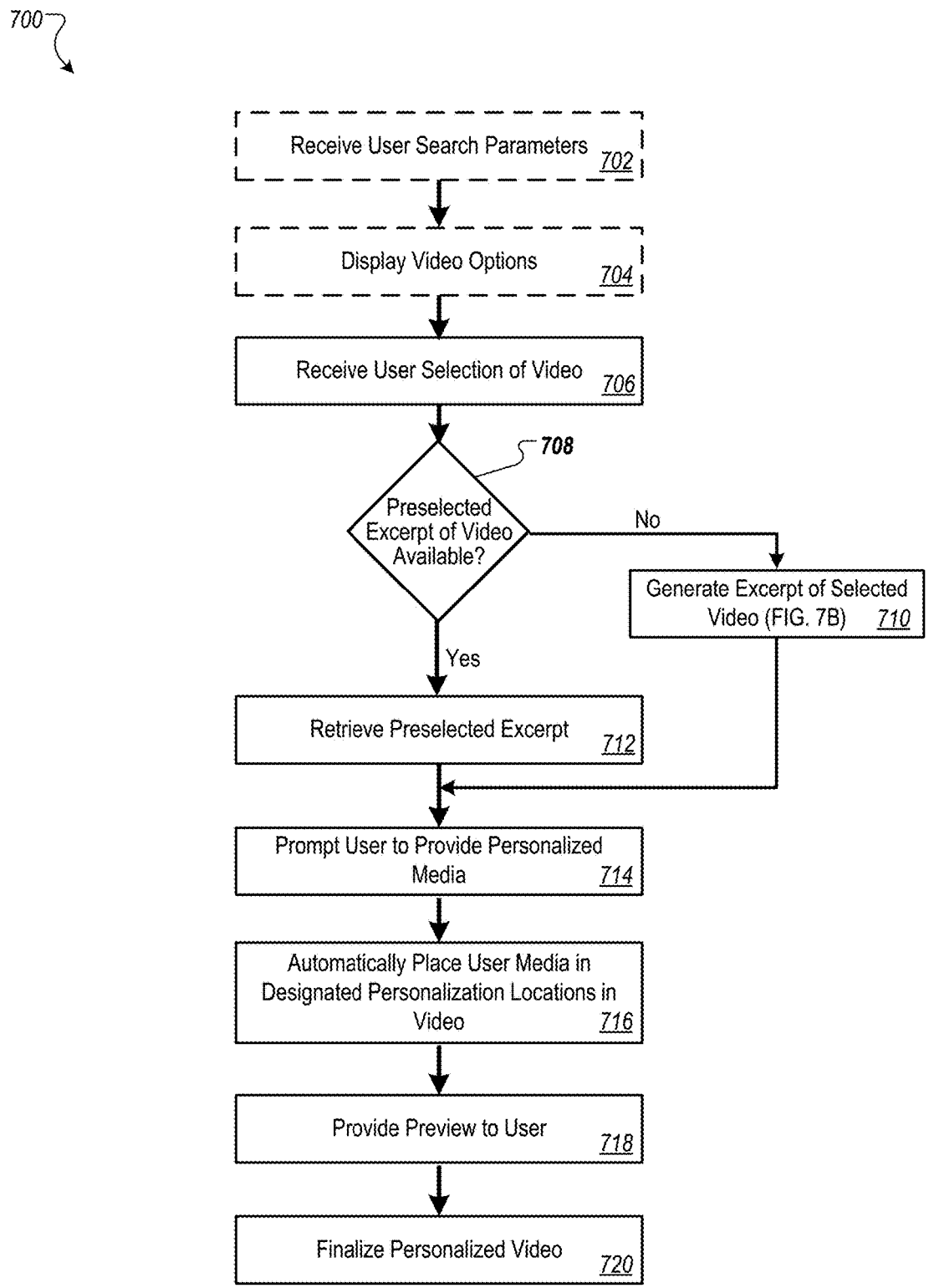
FIGS. 7A-B are a flowchart of an example technique for generating personalized videos.

FIG. 7A is a flowchart of an example technique 700 for generating personalized videos. The example technique 700 can be performed by any of a variety of video generating systems, such as the personalized video creation system 620 (shown in FIG. 6).

User search parameters can optionally be received (702). Referring to FIG. 6, for example, a video search interface 602 can be presented at a user device, the interface including a set of controls (e.g., text input controls, option selection controls, etc.) through which a user can specify values for one or more parameters to facilitate a search and selection of a video. In the present example, the video search interface 602 includes a control for specifying an age, a control for specifying a gender, a control for specifying a relationship, a control for specifying a message to be sent, a control for specifying a preferred genre of music, a control for specifying a favorite artist, a control for specifying a favorite song, and a control for specifying an emotion to be expressed. A user of the personalized video creation system 620 may want to send personalized video that incorporates a friendly/romantic/upbeat message, for example. The user can select one or more appropriate values using one or more corresponding controls in the video search interface 602, for example, and can submit the selected values to the personalized video creation system 602 as user input 604.

Video options can optionally be displayed (704). In response to the user input 604 (shown in FIG. 6), for example, the personalized video creation system 620 can identify one or more videos that match the user selected values of the various search parameters. A corpus of videos (not shown), for example, may be indexed per the search parameters to facilitate subsequent searches. In response to the user input 604, for example, a custom list of video options 606 can be presented at the user device. In the present example, the custom list of video options 606 includes Katy Perry's "Firework," Outkast's "Hey Ya," and the Romantics' "What I Like About You."

A user selection of a video can be received (706). For example, a user can select one of the videos presented in the custom list of video options 606 (shown in FIG. 6) presented at the user device. As another example, a user can submit a video title, a video title and an artist name, or another sort of video identifier. In the present example, the user selects the Romantics' "What I Like About You," as indicated by user selection 608.

A determination is made of whether a preselected excerpt of video is available (708). For example, each of the videos included in an indexed corpus of videos may be associated with a corresponding preselected excerpt of the video. A video excerpt, for example, can be a portion of the video, and can be of a duration that is less than a duration of the video itself. The video excerpt can include one or more impactful moments, such as moments for which the video and/or associated music are generally recognized, such as a chorus of a song, a popular scene of a video, or another sort of impactful moment. Video excerpts can be manually and/or automatically generated.

If the preselected excerpt of video is unavailable, an excerpt of the selected video can be generated (710), as will be discussed in further detail with regard to FIG. 7B.

If the preselected excerpt of video is available, the preselected excerpt can be retrieved (712). For example, in response to the user selection 608 (e.g., a selection of the Romantics' "What I Like About You"), a video excerpt 610 (shown in FIG. 6) can be retrieved. The video excerpt 610, for example, can be of a duration that is less than that of the video, such as fifteen seconds, thirty seconds, a minute, or another suitable length of time. In some implementations, a duration of a video excerpt may be based at least in part on video and/or musical elements of the video. For example, beginning and/or end points of a video excerpt may occur during scene transitions of a corresponding video, musical transitions (e.g., transitions between a chorus and a verse, transitions to and from solo portions) of the corresponding video, or other appropriate transition points. In general, video excerpts can include a continuous audio track from an original video, and can include a segmented video track which includes one or more portions of the original video, and one or more personalization locations for user provided media. The portion(s) of the original video and the personalization location(s) can occur at any position within a video excerpt, such as at the beginning, middle, or end of the excerpt. In the present example, the video excerpt 610 includes a first personalization location 612 at the beginning of the excerpt, a portion 614 of the original video in the middle of the excerpt, and a second personalization location 616 at the end of the excerpt. The video excerpt 610 of the present example also includes a continuous audio track 618 from the original video, such that the audio track is synchronized with the portion 614 of the original video.

A prompt can be provided for the user to provide personalized media (714). For example, each video excerpt can be associated with one or more corresponding personalization templates, which can be retrieved by the personalized video creation system 620 from a data store of personalization templates 624 (shown in FIG. 6). In general, personalization templates can be used by the personalized video creation system 620 to place user provided media in appropriate personalization locations of a video excerpt. For example, a personalization template for the video excerpt can include locations for user provided text, user provided video (e.g., including audio), and a user provided image. In the present example, the user can be prompted to provide each media item in accordance with the personalization template, such as through a prompt to "type a hello message for the recipient," a prompt to "upload a short video telling the recipient what you like about them," a prompt to "upload a funny picture," and a prompt to "type a goodbye message." As another example, the user can provide one or more media items of the user's choice, and the personalized video creation system 620 can match the provided media items by media type to a suitable personalization template for the video excerpt. For example, in response to receiving a series of images from the user, the personalized video creation system 620 can select a suitable personalized template for the video excerpt that is configured to accept media items of the received type (e.g., images). Templates can suggest stored media content that is appropriate to include with a particular video, such as famous quotes, canned "helper" text/templates for different types of mediagrams, and/or libraries of artwork, graphics, and pre-generated text.

User-provided media can be automatically placed in one or more designated personalization locations in the excerpt of video (716). For example, the personalized video creation system 620 can place the user provided media 622 in designated personalization locations in the video excerpt 610 (shown in FIG. 6). In the present example, text provided by the user (e.g., in response to the prompt to "type a hello message for the recipient") is placed in a designated personalization location 622a. A video provided by the user (e.g., in response to the prompt to "upload a short video telling the recipient what you like about them"), for example, is placed in a designated personalization location 622b. Audio associated with the provided video is integrated with (e.g., overlaid on) the continuous audio track 618 from the original video, for example, at a designated personalization location 622e. The image provided by the user (e.g., in response to the prompt to "upload a funny picture"), for example, is placed in a designated personalization location 622c. Additional text provided by the user (e.g., in response to the prompt to "type a goodbye message"), for example, is placed in a designated personalization location 622d.

A preview can be provided to the user (718). For example, in response to receiving the one or more media items from the user, the personalized video creation system 620 (shown in FIG. 6) can generate a preview of the video excerpt integrated with the user provided media item(s). The preview can be provided to the user at the user's device, and the user can be given an option to modify and resubmit the media items.

A personalized video (e.g., mediagram) can be finalized (720). For example, the personalized video creation system 620 (shown in FIG. 6) can finalize the personalized video, including generating a file of a selected type (e.g., .AVI, .FLV, .GIF, .MOV, .WMV, .MP4, etc.). After finalizing the personalized video, for example, the file can be sent to one or more selected recipients and/or posted to one or more social media platforms.

For example, a proprietary file format for the video 610 can be used for personalizing the video to allow for the smooth and accurate playback of the various elements involved (photos, looping audio, licenses video, text, etc.) a single video file should be constructed in a special fashion. The video file can include three segments. First, a lead segment (612) can include a blank/black video track and looping audio repeated in the audio track. This lead section can be standardized to be at least of a certain length capable of playing during the time the personalized content would be displayed. Second, the middle segment (614) of the proprietary file can include the licensed music video and the accompanying licensed track. Third, the last segment (616) of the proprietary file format can again include blank/black video as looping audio played on the audio track.

The use of this file configuration can be to programmatically determine the length of time the personalized content needed to be displayed and cue the video file (programmatically) at the proper point within the blank video and looping audio segment, over which, the photos and text is displayed. When the personalized content display period has completed the looping audio track can seamlessly transition (within the underlying video file format) to play the licensed music and audio segment of the file. Finally, a smooth transition can occur to the looping audio once again (located in the final segment of the proprietary file) as additional personalized content can be displayed over the blank video portion of the file. Note that the looping audio could alternately be replaced by a seamless audio track which transitions into and out of the license video segment. In this way the format is flexible to allow for both kinds of audio content to play during the personalized content—looping or seamless. A benefit of this approach is to reduce the complexity of synchronizing content programmatically and push the organization work into the content editing and preparation process, and also circumventing potential issues that sequencing the audio together as individual files could introduce such as small gaps or glitches in the audio playback moving from one file to the next.

Figure 7B:
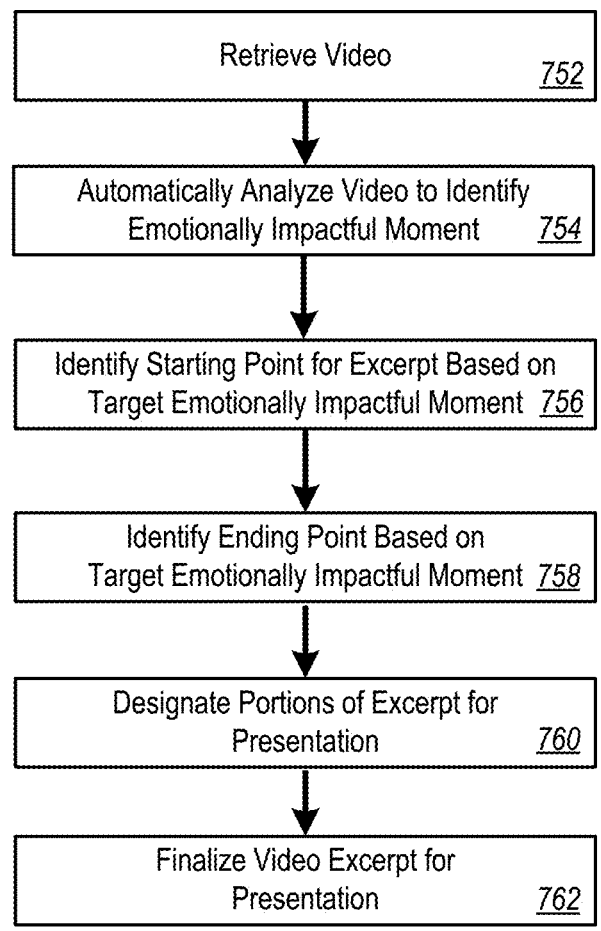

FIG. 7B is a flowchart of an example technique 750 for generating an excerpt of a selected video. The example technique 700 can be performed by any of a variety of video generating systems, such as the personalized video creation system 620 (shown in FIG. 6).

A video can be retrieved (752). For example, the video creation system 620 can retrieve a video from a corpus of videos. Retrieving the video, for example, can be performed in response to a user selection of a video, when a corresponding preselected excerpt of the video is unavailable. As another example, one or more videos can be selected for automatic generation of corresponding excerpts, and the selected video(s) can be retrieved for further processing.

The video can be automatically analyzed to identify one or more emotionally impactful moments (754). For example, the video creation system 620 can automatically analyze the retrieved video to identify emotionally impactful moment(s) in the video, such as portions of the video and/or associated music which are generally recognized as causing an emotional impact.

In some implementations, automatically analyzing the retrieved video can include performing an automatic analysis of the video content and/or associated audio content. For example, video analysis of the video content can be performed to identify portions of the video which include a close up of a performer in the video of a particular duration (e.g., several seconds), which may be associated with an emotionally impactful moment. As another example, audio analysis of audio content associated with the video can be performed to identify portions of the video which include various musical transitions (e.g., significant volume level changes, key changes, transitions between solo instrumentation and singing, etc.), which may be associated with an emotionally impactful moment. As another example, text analysis of time indexed lyrics associated with the video can be performed to identify portions of the video which include lyrics that correspond with a song title associated with the video, a particular topic (e.g., love, happiness, etc.), or another sort of lyric that may indicate an emotionally impactful moment.

In some implementations, automatically analyzing the retrieved video can include performing an automatic analysis of user interaction data associated with the retrieved video. For example, user interaction data may include video play data for the retrieved video from various users. Identifying emotionally impactful moments, for example, can include identifying portions of the video which are frequently replayed by users. As another example, a video presentation platform may provide users with an option for generating video clips, and identifying emotionally impactful moments can include identifying portions of the video which have frequently been included in user generated video clips. As another example, a video presentation platform may provide users with an option for indicating a point in time in the video to commence playback, and identifying emotionally impactful moments can include identifying the point in time that has frequently been selected.

For example, emotionally impactful moments can be identified by using one or more of the following features:
referencing song portion/hook start and stop times in third-party online library,
truncating song based on lyric analysis and corresponding lyric timestamps in the song,
waveform analysis to identify optimal 'chill' moment based on dramatic waveform changes, such as changes in verse/chorus, pitch, tempo, loudness, verse/chorus transitions based on changes in amplitude/frequency, determine hook from repeated waveform sections, and/or determine instrumentation change moment, e.g. small ensemble to full orchestra,
Tagging the hook, chorus, intro, outro, and other song features,
Analyzing beats-per-minute (BPM) data to determine, for example, whether a chill moment exists within the song (e.g., ballads are slower and often do not include chill moments, whereas dance-able tunes are faster and more often include chill moments), Identifying the first iteration of optimal excerpt, e.g. the first verse/chorus transition, as the primary 'chill' moment sets the stage for the rest of the song, Assigning weights to selection criteria, such as verse/chorus transitions being given more weight than repetitious outros, additional weights being given to input reflecting user preferences, profile, relationship to recipient, and additional weights being assigned to music visuals referencing iconic sections, and Modeling the classification criteria around human utterances, such as lower frequencies being associated with more somber mood, whereas higher frequencies indicate alertness, excitement, and slower tempos trigger reflection, faster tempos inspire motion (entrainment)—a melody's pitch generally rises and then falls, which can allow for following the 'melodic arc' to identify phrases.

Chill moments within media content can be based on a variety of factors, such as mode, mood, tone, pitch, tempo, and/or volume. Many of these factors couple together and are used in tandem, and a combination of these factors (2 or more factors) can provide chill moments. To fully capture a chill moment in a way that emotionally impactful, an excerpts can be shorter in length, such as from 10 seconds up to over a minute for the music video portion of the song.

As discussed above, chill moments, also known as goose bumps and shivers down the spine, are physiological reactions to visual art, speech, beauty, physical contact and music. The autonomic responses can include increased heart rate, increased respiration, forearm muscle activity, increased skin conductance and forearm pilo-erection (hair-raising). Chills induced by music are evoked by temporal phenomena, such as expectations, delay, tension, resolution, prediction, surprise and anticipation. Chills are evidence of the human brain's ability to extract specific kinds of emotional meaning from music.

Neural mechanisms of chills involve increased blood flow in the brain regions responsible for movement planning and reward, specifically the nucleus accumbens, left ventral striatum, dorsomedial midbrain, insula, thalamus, anterior cingulate, supplementary motor area and bilateral cerebellum. Decreased blood flow in the brain during chill moments has been observed in areas known to process emotions and visual stimuli, namely the amygdala, left hippocampus and posterior cortex.

Chill moments are most often generated by stark musical contrasts, e.g. dramatic changes in mode (minor to major), loudness (soft to loud), tempo (slow to fast), mood (sad to happy), tone (dull to bright) and pitch (low to high). Lyrical passages can trigger chill moments; however, the effect is secondary to the musical effect.

People are most likely to experience chills when listening tunes with which they are familiar and have learned to appreciate, comparing what they are hearing with their recalled musical model. The music builds tension up to the chill moment (the build-up is longer for romantic, mood-changing chills), at which point there is a resolving release and a concomitant emotional/physiological response.

Chill moment identification and use in mediagrams to provide emotionally impactful messages to recipients can be specifically accomplished using the techniques and systems described throughout this document.

Referring back to FIG. 7B, a starting point for a video excerpt can be identified, based at least on part on a target emotionally impactful moment (756). For example, the target emotionally impactful moment can be identified based at least in part using automatic analysis. The starting point for the video excerpt can be designated as occurring at the beginning of the target emotionally impactful moment, or can be designated as occurring at a point in time before the beginning of the moment. In some implementations, the point in time before the beginning of the moment can be a predetermined amount of time (e.g., 15 seconds, 30 seconds, etc.). In some implementations, the point of time before the beginning of the moment can be automatically selected based at least in part on video and/or musical elements of the video. For example, the beginning point of a video excerpt may occur during a scene transition, a musical transition, or at another suitable transition point.

An ending point for the video excerpt can be identified, based at least on part on the target emotionally impactful moment (758). The ending point for the video excerpt can be designated as occurring at the end of the target emotionally impactful moment, or can be designated as occurring at a point in time after the ending of the moment. In some implementations, the point in time after the ending of the moment can be a predetermined amount of time (e.g., 15 seconds, 30 seconds, etc.). In some implementations, the point of time after the ending of the moment can be automatically selected based at least in part on video and/or musical elements of the video. For example, the ending point of a video excerpt may occur during a scene transition, a musical transition, or at another suitable transition point.

For example, designating the starting and ending point can include automatically identifying natural and seamless entrances and exits of the excerpt. In particular, the automatic identification can avoid jarring, altering pitch, dead air, off beat, unnatural entrances and exits to the excerpt. Additionally, the automatic identification can establish complete messages and sentiments, thoughts, ideas, phrases, etc. for the excerpt (not truncating messages).

One or more portions of the video excerpt can be designated for personalization (760). For example, the target emotionally impactful moment can be associated with a duration (e.g., based on automatic analysis of the retrieved video and/or user interaction data associated with the video), and portions of the video excerpt that occur outside of the duration of the moment can be designated for personalization.

The video excerpt can be finalized for personalization (762). For example, portions of the video excerpt that are designated for personalization can be removed, transition effects can be applied such that video and/or audio appropriately fades in and out, and other suitable finalization techniques can be applied to the video excerpt. After finalizing the video excerpt, for example, it can be added to a corpus of preselected video excerpts.

The techniques 700 and 750 can allow for users to contribute to the selection and incorporation of videos and other media content into the catalogue of media content that is offered for personalization. For example, record searches (song, artist, genre, occasion, mood, version of the song) can be used to identify media content that is of interest to users. Aggregation of the record searches can be used as implicit requests for media content to be added to the library. In another example, users can provide explicit requests for particular songs by filling out fields (song, artist, etc.) that identify, for example, the lyrics of the portion of the song they are interested in, and/or notation of which verse they are requesting. Users submitting requests can be notified when songs are added.

In another example, streaming media services (e.g., SPOTIFY, PANDORA) can be incorporated into the system to permit near limitless selection from existing databases and instantaneous access. Such services may present various disadvantages, such as copyright issues, song version variation, spoofed titles, and improper truncation that would have to happen on the fly and decrease mediagram quality.

In another example, a user's device song library could be used as a source of new media content for incorporation into mediagrams and, possibly, into the system library.

Figure 8A:
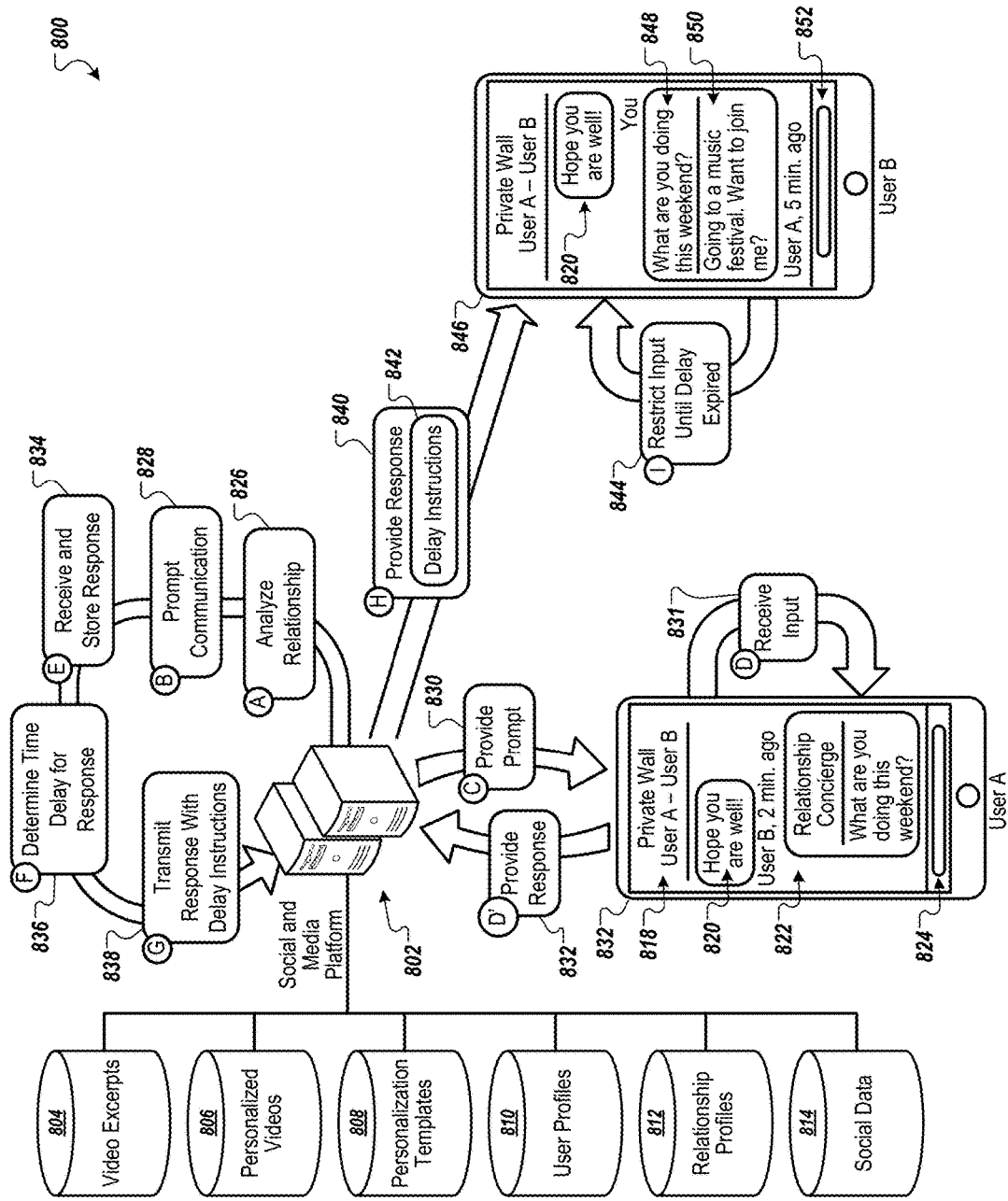
FIG. 8A is a conceptual diagram of an example social media platform for providing improved and more meaningful social interactions among users.

FIG. 8A is a conceptual diagram of an example social media platform 800 for providing improved and more meaningful social interactions among users. The platform 800 can include a variety of features that provide a variety of benefits over conventional social platforms. In particular, features of the platform 800 aim to build better relationships among users by promoting sincere social interactions (no shallow interactions), to put emotion and meaning back into social media, to provide both sender and receiver with insights (whether realized or not), to offer private person-person communication (as opposed to communication in front of a broader audience), to provide a fun/playful tone that makes relationships easier to maintain and more rewarding, to assist users in conveying and sending sentiments more accurate to actual feelings (versus free form text), and to provide social media that can be useful and uplifting to all users, including introverts.

The platform 800 improves upon social platforms in a number of ways. For example, the platform 800 uses gamification to create scarcity within the platform, such as scarcity with the number of mediagrams that can be generated and distributed on the platform 800, and scarcity with regard to the frequency of interactions among users. A relationship concierge can also employ scarcity in providing prompts at a deliberate pace (e.g., one prompt per day), which can cause users to wait for the chance to use "high value" prompts (i.e., scarcity can cause users to use these high value prompts less frequently). Scarcity on the platform 800 can also mimic real-world interactions (e.g., receiving cards/gifts/sentiments) among users that are less frequent than on social platforms and, in general, more meaningful. Scarcity on the platform 800 can also reduce burn out among users and can promote regular schedule of usages.

The platform 800 can also draw on game theory to improve social interactions and relationships. For example, subtle visual and audio cues (e.g., message being concealed and unwrapped like a gift) can be used when viewing/responding to delivered prompts to enhance the emotional state of the user when viewing/receiving the delivered items. Rewards can be used to increase behavior, such as rewards for improvements in a relationship (e.g., more frequent interactions, more meaningful interactions) and/or establishing new relationships. Such rewards can include, for example, points, ratings, icons, symbols, branding methods, emojis and/or other features to represent relationship states.

The platform 800 can also incorporate a relationship concierge that can help users improve variety, depth and frequency of communication within relationships. Such a relationship concierge can use artificial intelligence (AI) algorithms and systems to predict interests, supply content and guide the user towards more meaningful relationships. For example, the relationship concierge can understand who the people involved in a relationship by creating a smart wall that prompts the users to interact with each other on the wall in particular ways to improve and maintain their relationship. The relationship concierge can be fed information about users (e.g., interests, demographic information) and their relationship (e.g., common interests, type of relationship), and can churn on that information with its AI techniques to determine and provide, for example, to insert prompts directly into the user's shared private wall to facilitate continued and improved communication. To avoid annoying some users and to allow for varied interest in the relationship concierge, its involvement can be adapted to match user preference (e.g., increase or restrict involvement in relationship). Such interest in the relationship concierge can be explicit (e.g., user-designated concierge settings) and/or implicit (e.g., user liking or disliking certain prompts from the concierge).

The platform 800 can decrease the anxiety associated with social network interactions being in front of a broader audience, which can cause users' interactions to be more guarded and less authentic, through the use of private walls that one-on-one between users. With private walls, only the participants in the wall are able to view/contribute to the conversation. Prompts from the relationship concierge can be presented on private walls. For example, prompts can include questions (e.g., individual questions, instructions, ideas for topics, joint questions that are asked to both users with the answers only being presented if both users answer), drawing pictures (e.g., draw pictures and send to each other), games (e.g., creating a story line by line, hang man, 20 questions), challenges (e.g., can take a snap of yourself doing something fun/unique, user-designated challenges), articles, pictures (e.g., creating memes and comment on pictures, Rorschach test, photo hunt), other creative options (make picture, memes, art, jokes), and/or other options. Private walls can use extrinsic stimulation (e.g., using colors, movement and sound to keep users attention) and intrinsic stimulation (e.g., creating an environment that fosters an intimate connection) to engage users. Such private walls can, for example, create environments that fosters communication among both extroverted and introverted individuals who are looking for social media that is more protective and thoughtful than traditional social media, that includes more intimate communication using media, and that offers protection, reassurance, and control over messages (e.g., knowledge of who sees the messages, who can see the messages, time-limited duration).

As noted in the previous paragraph, the platform 800 can use temporal aspects to reduce anxiety and uncertainty. In one example, messages can have a lifespan and will be inaccessible to users/deleted from the server once they expire. In another example, users can only view messages for a limited number of viewings, a limited number of times, can only be viewed after a specified period, etc. Such features (time limits, view limits) can be controlled and designated by the user. Similarly, the platform 800 can permit users to create messages that are sent at a predetermined time. (e.g., sent next Thursday at 10 am) and/or after an event has occurred (e.g., user returns from vacation).

Additionally, the platform 800 can provide and security measures in place to provide assurances and protection to user privacy, such as private walls being restricted to the participants and/or controls restricting and notifications regarding screenshots taken of content. For example, the platform 800 and mobile apps running on client devices can prohibit forwarding messages outside of the app, alteration of a shared wall to being accessible to the participants, the taking of screenshots (recipient is notified if screenshot is attempted), the device's ability to copy and paste text, and/or images, downloading pictures and messages, and/or forwarding content to other users.

In addition to private one-on-one walls, the platform 800 can provide group walls that, similarly, are restricted to only the participants within the group. Group walls can be shared by more than two members and can creates a venue to share thoughts, ideas, commentary on topics, as well as a place to share pictures, videos, and other media content with specific people. Each user who is part of a group can view all comments/postings in the group. Each group can have an organizer who controls the group through group membership, topics, lifespan, moderation, and/or other group parameters. Members of a group can contribute to conversations, but are not permitted to control group parameters. The organizer can be identified to the group. As with private one-on-one walls, group walls can also have relationship concierges that help supply and insert content into the group, such as topics of common interest (either explicitly identified by the group or implicitly determined from user preferences). For example, the relationship concierge can prompt a group wall with different media types, such as pictures, questions, games, current news articles, memes, "good news" stories (e.g., stories that are relevant and positive. Aimed at creating thought provoking and inspirational dialogue), pop culture questions, themes, and/or other features. Also similar to private one-on-one walls, group walls can include temporally limited content as well as having a time-limited existence. For example, the organizer and/or system can set a lifespan for the group, which can be noted to the group, after which the group will automatically dissolve and all of the content from the group wall will be deleted. Group walls can foster an environment for "self-regulated" discussion/sharing groups, which can permit the organizer and/or group members to remove users from the group, either through organizer admin approval, a vote of the users, and/or other features. Content within the group wall can be automatically analyzed, flagged, and deleted if deemed inappropriate (e.g., trolling, hate speech).

Referring back to FIG. 8A, the system 800 includes a social and media platform 802 that provides a social platform, as described in the preceding paragraphs, as well as a media personalization platform, as described above with regard to FIGS. 1-7. The platform 802 operates using a variety of different data sources, including video excerpts 804, personalized videos 806, personalization templates 808, user profiles 810, relationship profiles 812, and social data 814. The user profiles 810 can include user information (e.g., demographics, interests, location) and can model user behavior. The relationship profiles 812 can include relationship information (e.g., users involved in relationship, type of relationship, duration of relationship) and can model the relationship (e.g., state of the relationship). The social data 814 can include the data on social interactions between users (e.g., messages, posts, prompts, responses to prompts, content views) and other data for the social platform 802.

In the depicted example, user A (associated with computing device 816) and user B (associated with computing device 846) have a private wall for their relationship on the platform 802. A relationship concierge running on the platform 802 can periodically determine whether and when a prompts should be provided to one or more of the users A and B to help facilitate their relationship. As part of the relationship concierge process on the platform 802, the relationship between the users A and B can be analyzed (step A, 826). Such analysis can include evaluation of a variety of factors and data, including the profiles for the users A and B, the profile for the relationship between users A and B, analysis of historical interactions between the users A and B (e.g., determining a rating for the relationship), and/or other factors. Based on the analysis, the platform 802 determines that a prompt should be provided to user A (step B, 828).

In response to that determination, the prompt is provided to the device 816 for user A (step C, 830) and is presented (822) on the private wall 818 in sequential order with other interactions 820. The private wall 818 includes an interface 824 for the user to respond, user input is received and provided to the platform (step D, 831-832).

The platform 802 can receive and store the response (step E, 834) and can determine a minimum time delay for user B to respond (step F, 836). The time delay can vary depending on a variety of factors, such as the state of the relationship, a current trend of the relationship (e.g., becoming closer, becoming more distant), and/or other factors. Once the time delay has been determined, the response 840 and the time delay 842 can be transmitted (step G, 838).

The device 846 for user B can receive and present the response in the private wall, which includes the earlier message 820, the relationship concierge prompt 848, and the response 850. Based on the delay instructions 842, the device 846 can automatically restrict input being provided (via the input interface 852) to reply to the response 850 until after the delay has expired.

The platform 800 and the devices 816 and 846 can repeatedly perform these operations A-I in the back and forth communication between the user A-B, which is configured in such a way by the platform 800 so as to enhance the quality of the social interactions.

Figure 8B:
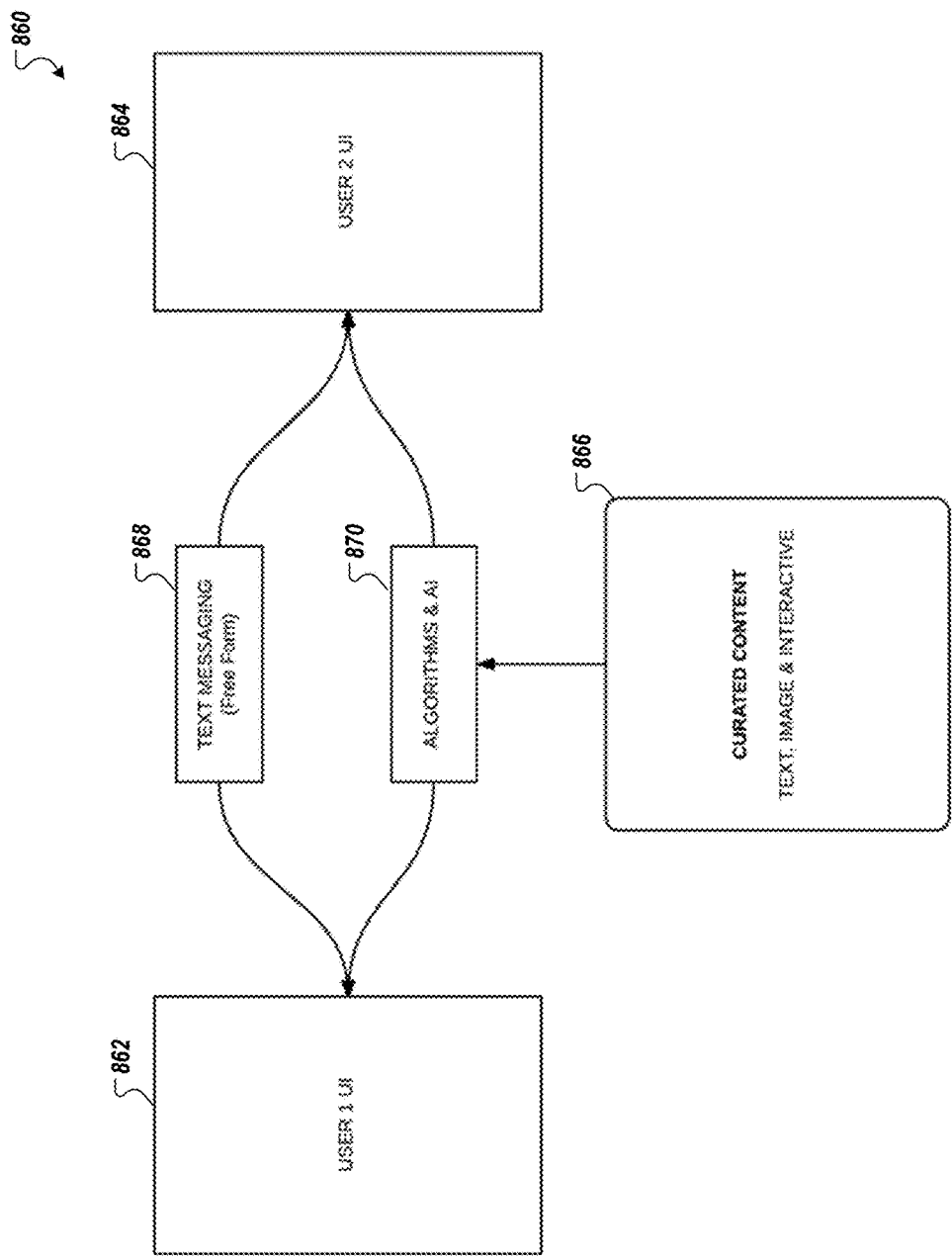
FIG. 8B is a conceptual diagram of another example social media platform for providing improved and more meaningful social interactions among users.

FIG. 8B is a conceptual diagram of another example social media platform 860 for providing improved and more meaningful social interactions among users. The platform 860 can include a variety of features that provide a variety of benefits over conventional social platforms, and can be similar to the platform 800. In particular, features of the platform 800 aim to build better relationships among users by promoting sincere social interactions (no shallow interactions), to put emotion and meaning back into social media, to provide both sender and receiver with insights (whether realized or not), to offer private person-person communication (as opposed to communication in front of a broader audience), to provide a fun/playful tone that makes relationships easier to maintain and more rewarding, to assist users in conveying and sending sentiments more accurate to actual feelings (versus free form text), and to provide social media that can be useful and uplifting to all users, including introverts.

For example, the platform 860 includes a text messaging system 868 that permits free form, direct messaging between users 862-864 (one-to-one messaging and group messaging). The users 862-864 can generate and distribute the content between each other using the text messaging system 868, such as through entering text (e.g., SMS message), providing multimedia content (e.g., mediagram, videos, photos, MMS message), and/or other content. The platform 860 can also include algorithms and an artificial intelligence (AI) system 870 that can use AI and algorithmic logic to dynamically infuse the text-messaging interface 868 between two users 862-864 with special selected and curated content 866 that can help facilitate more meaningful interactions and relationships. For example, the algorithms and AI system 870 can model a relationship between the two users 862-864 and use that model to select particular content from the curated content 866, and can present that selected content at particular points in time to facilitate the relationship between the users 862-864. The selected content can be injected into the text messaging system 868 in any of a variety of ways, such as by presenting the content to one of the users 862-864 to prompt that user's interaction with the other user, presenting the content to both of the users 862-864 to facilitate interactions among the users, and/or other mechanisms. The algorithms and AI system 870 can continually improve upon and refine its relationship model for the users 862-864 based on interactions between the users on the text messaging system 868 and their response to content injected into the text messaging system 868 by the algorithms and AI system 870, which can allow the platform to deliver content and experiences that enrich the relationship.

As discussed above, the content that is distributed by the users 862-864 and/or selected from the curate content 866 can be any of a variety content, including content excerpts (e.g., 2-6 second clips from mediagrams, 2-6 second clips from videos and/or music). Such content excerpts can be extracted from any of a variety of different content sources, such as music videos, television shows, live television shows (award shows), media (news), movies, sound bites from various media, mediagrams, and/or other content. Content excerpts can be sent as quick self-contained messages and/or in conjunction with other messages, for example, to enhance the overall impact of the messages. Similar to a mediagram, content excerpts can be sent without attaching the underlying content from which the excerpt is extracted and/or without associated user messages. In some instances, words and lyrics of the content excerpts can be included and/or transmitted with the content excerpts.

Figure 9A:
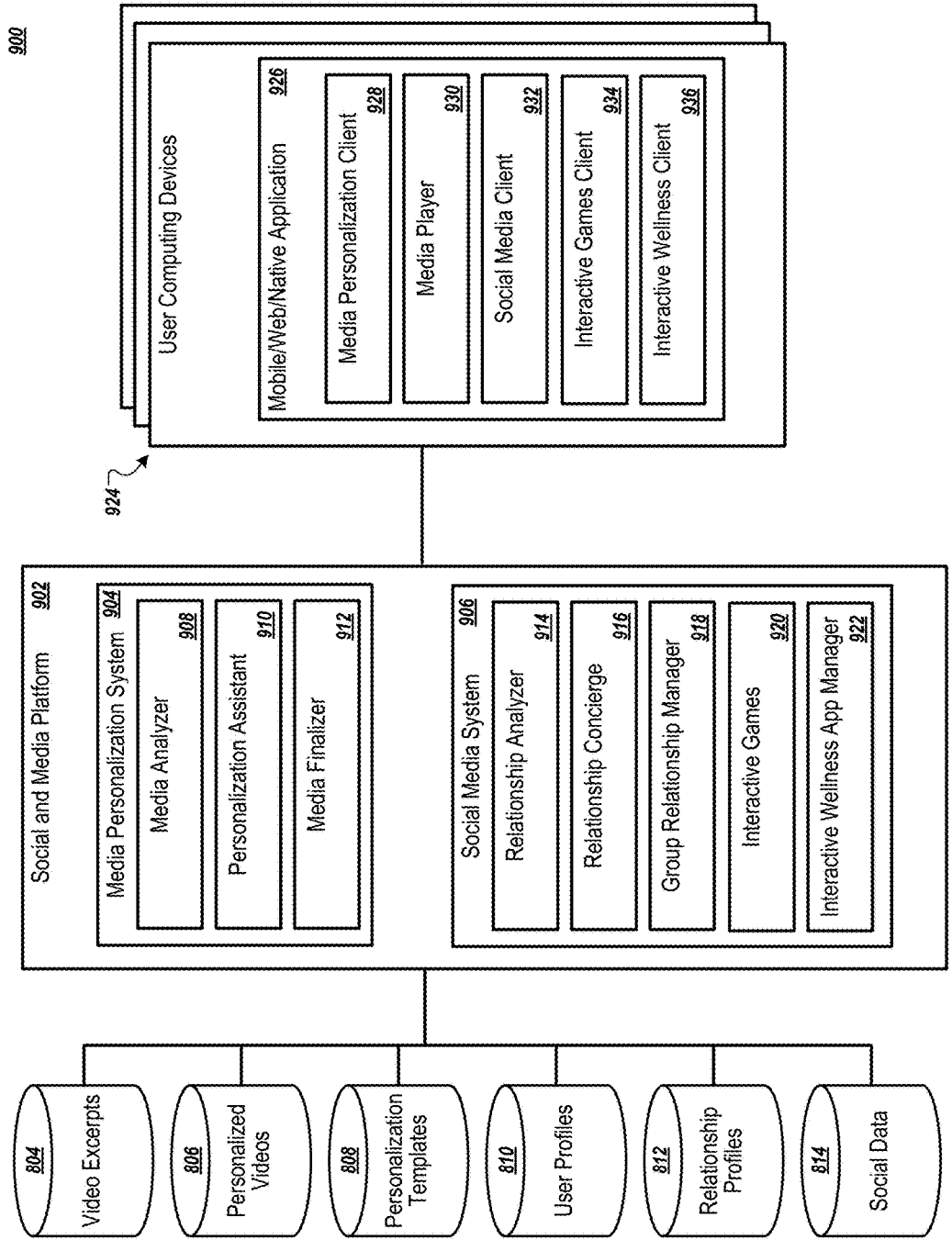
FIG. 9A is an example system for providing an improved social media platform with more meaningful social interactions among users.

FIG. 9A is an example system 900 for providing an improved social media platform with more meaningful social interactions among users. The example system 900 includes a social and media platform 902 (similar to the social and media platform 802), the databases 804-814 described above with regard to FIG. 8A, and user computing device 924. The platform 902 can include one or more computer servers, such as cloud computing systems. The platform 902 includes a media personalization system 904 with a media analyzer 908 that analyzes media content to identify excerpts for personalization, a personalization assistant 910 that guides users through the personalization processes described above with regard to FIGS. 1-7, and a media finalizer 912 that assembles personalized media content (e.g., mediagrams).

The platform 902 also includes a social media system 906, which includes a relationship analyzer 914 to determine the state and rating for relationships (see example technique 2000 in FIG. 20, which can be performed by the relationship analyzer 914), a relationship concierge 916 to prompt and facilitate meaningful social interactions among users (see FIGS. 11A-F, 12A-H, 15A-D, and 18A-B, and corresponding description below), a group relationship manager 918 that regulates group walls and group interactions (see FIGS. 16 and 21A-B, and corresponding description below), interactive games 920 that are used on private and group walls to allow users to play games alone or together on the platform (see FIG. 11B and corresponding description of option 1132), and an interactive wellness app manager 922 that provides features for users to self-rate their wellness state and to allow for wellness rating-related interactions among users (see FIGS. 17A-H and corresponding description).

The relationship concierge 916 evaluates whether and how to prompt users using a variety of relationship data representation and analysis techniques. For example, various values attached to questions (or other prompting in the database 814) can be stored, updated, and evaluated in a hierarchy to determine timing and nature of prompting delivered to the user. Promptings can have various database values, such as one or more of the following:

- a "seriousness rating" value in the database (e.g. 1-100) that indicates how light or heavy the nature of the subject is or question is,
- a "nature of relationship" value that indicates the type of relationship between two individuals (e.g., father, brother, coworker, etc.),
- a "topic" value that indicates the category of content (e.g., cars, politics, personal history, food, etc.),
- a "current relevance" value that indicates whether the subject is uniquely topical to current news or events,
- a sine wave like pattern that is applied around the seriousness range that is determined to be appropriate as a current starting point for a prompt (e.g., if 40 is the target number, prompting may be delivered in a pattern such as "30, 35, 40, 45, 40, 35, 30" etc.),
- topics can be favored or rejected (e.g. no politics) and stored as various values depending on user responses (e.g., stored as "never user" if rejected strongly, stored as a modifier value if favored),
- the center point of the sine wave pattern of delivery can be "nudged" little by little by the user for responding to "More Serious" or "Less Serious" preference promptings,
- frequency of promptings can default to a standard value (e.g., 1 prompting/day), but promptings may be delivered at different times throughout the day using, for example, a sine wave (or random) pattern centered on a given starting point (e.g., provide appearance of unpredictability),
- add additional variation by introducing randomization that may lead to skipping entire day(s) and/or possible delivering more than one prompting in a day,
- Record response times (time of day) in database for user, which can be analyzed for most activity to form a favored usage time to be applied to questions or contacts that a user is "stuck" on (i.e., user's relationship with other user is not progressing or has stalled out), and
- general "level" value that can be applied to each prompting in the database, and used to tally an overall ad cumulative "score" for an individual user if they choose to answer a given question. The cumulative score can be used to set milestones crossed that are either hidden from the user, or exposed to the user (i.e. displaying a tiered "level" you have achieved in the app with a particular friend).

The user computing devices 924 can each include a mobile app, native app, and/or web application 926 running on the devices 924 that provide interfaces and features for the social platform (e.g. private walls, group walls, personalized media content) directly to users. The application 926 includes a media personalizer client 928 that presents media personalization features in a user interface and that communicates with the platform 902 to create media personalization. The application 926 also includes a media player (e.g., generic media player, special/secure media player) and a social media client 932 that implements client-side of the features for the platforms 802 and 902 described above (e.g., implements time delayed responses, private wall sharing prohibitions). The application 926 also includes an interactive games client 934 to provide interfaces for interactive games and an interactive wellness client 936 to provide an interface for a wellness rating and interaction service provided by the social media system 906.

Figure 9B:
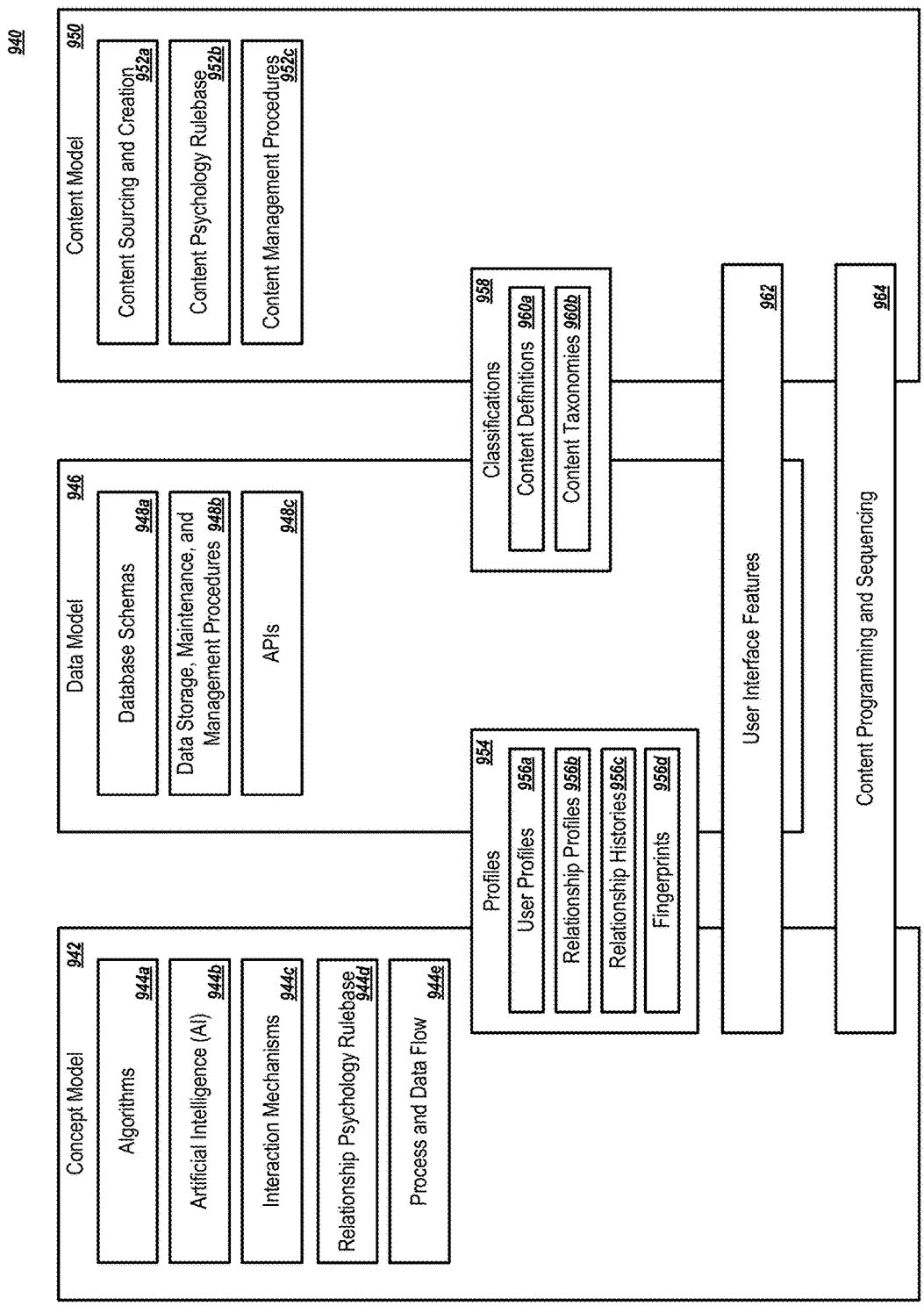
FIG. 9B is diagram of an example system for providing an improved social media platform with more meaningful social interactions among users.

FIG. 9B is diagram of an example system 940 for providing an improved social media platform with more meaningful social interactions among users. The example system 940 is similar to the system 900 and includes components that can be used to implement the social and media platform 902 (similar to the social and media platform 802) and the databases 804-814 described above with regard to FIG. 8A. For example, the system 940 includes a concept model 942, a data model 946, and a content model 950 that are used to model processes, user relationships, content, and other details that are used to provide the improved social media platform.

The concept model 942 can include data, rules, coding, logic, algorithms, computer systems, and/or other features to implement and provide enhanced social interactions among the users, which can be provided by, for example, the algorithms and AI system 870 described above with regard to FIG. 8B. The concept model 942 can be programmed to implement various psychological principles that are incorporated into the underlying rationale of feature and mechanism design and the AI and algorithmic frameworks that support them. For example, the concept model 942 can provide a feature set that addresses the emotive opportunities and issues, or affective benefits and costs, associated with remote communications, with the end goal being to maximize benefit metrics and minimize or mitigate cost metrics. Benefit metrics can include an emotional expressiveness metric (e.g., metric assessing ease with which platform permit users to express emotional states to others and/or to perceive feelings expressed by others), engagement and playfulness metric (e.g., metric assessing whether platform facilitates communication that is fun and exciting to participants), presence-in-absence metric (e.g., metric assessing whether platform fosters feeling of closeness and/or connectedness to others even though separated by time or space), opportunity for social support metric (e.g., metric assessing platform's ability to facilitate social support without being physically present, such as providing a general sense of the other person "being there" for you, reducing negative affect (such as soothing anxiety), and increasing positive affect (such as feeling "special" or loved)), and/or other metrics. Cost metrics can include a feeling obligated metric (e.g., metric assessing to what extent a platform creates an unwanted obligation to connect, such as creating unwanted feelings of obligation or guild to communicate), unmet expectations metric (e.g., metric assessing platform's propensity to create expectations for communication with others that will not be met and, as a result, have a negative impact on participants), threat to privacy metric (e.g., metric assessing platform's propensity to unexpectedly exposing private information to others, concerns that others are eavesdropping on private communication, and concerns that actions may be invading privacy of others), and/or other metrics.

The concept model 942 includes algorithms 944a and AI 944b (e.g., algorithms and AI 870), interaction mechanisms 944c (e.g., routines and/or subsystems to permit and facilitate user interactions), relationship psychology rulebase 944d (e.g., rules outlining different relationship models that can be used to categorize relationships among users), and process and data flows 944e (e.g., processes and data flows to facilitate improved social interactions among users, including obtaining implicit relationship feedback from user interactions, refining relationship modeling, and identifying content and timing to deliver the content to the users). Examples of these content selections and prompts provided to users are described below with regard to FIGS. 11A-F and 12A-H. One the primary goals of the concept model 942 is to help users stay connected over the long-term. The periodicity of prompts provides a cadence (commensurate with the user's wishes for a given relationship) of interactions that otherwise might languish due to ordinary circumstances of life and the typical dynamics of psychological tendencies. Mechanisms which support this goal can include:

user control over periodicity and level of content delivery,
user control over ongoing improvement of content relevance,
user anticipation via timing indications of prompting content visible in the UI, and
AI/Algorithms providing relationship-context-aware enhancements.

These and other features can improve social platforms by facilitating long-term use based on users gaining a perceptible recognition of some appreciable enrichment to his or her relationships.

The data model 946 corresponds to the structure and storage of data for the system 940, including the structure and storage of content, user profile data, relationship profile data, histories, and/or other data. The data model 946 includes database schemas 948a (e.g., table definitions, cloud storage database schemas and distribution), data storage, maintenance, and management procedures 948b (e.g., data storage policies, cloud based storage policies), and application programming interfaces (APIs) 948c (e.g., APIs to handle server and user device requests).

The content model 950 corresponds to the content that is delivered to users on the social platform. The content model includes content sourcing and creation 952a (e.g., user-generated content, preselected content, content models that can be adapted to personalize prompts to users), content psychology rulebase 952b (e.g., rules defining different types of content and their appropriateness to different users), and/or content management procedures 952c (e.g., processes for curating content over time). The content model 950 and the data model 946 can be used to provide content classifications 958, which can be used to identify relevant content to deliver to users at various points in time depending on any of a variety of factors, such as relationship profiles, user profiles, and/or other relevant details. The content classifications 958 can include content definitions 960a (e.g., definitions for different types of content) and content taxonomies 960b (e.g., hierarchical organization of relationships of different types of content). For example, the classification of content into different types of content can include different configurations of media and data, and can rely on multiple different taxonomies across different data dimensions that function together to more accurately classify content for selection and delivery to users. Taxonomies can include, for instance, a modal taxonomy (e.g., classification of content delivery which considers the combination of structural mechanism of delivery and general purpose behind the delivery), topical taxonomy (e.g., hierarchical classification of the content itself, i.e. topics and subject matter such arts, sports, history, music, baseball, Mozart, Babe Ruth), topical metadata (e.g., non-hierarchical metadata grouping method to allow retrieval and sorting by criteria such as, descriptive (e.g., fun, serious, cultural, academic, controversial), quantitative (e.g., locality, time sensitivity, age appropriateness, complexity level within topic)), and/or others.

Figure 9C:
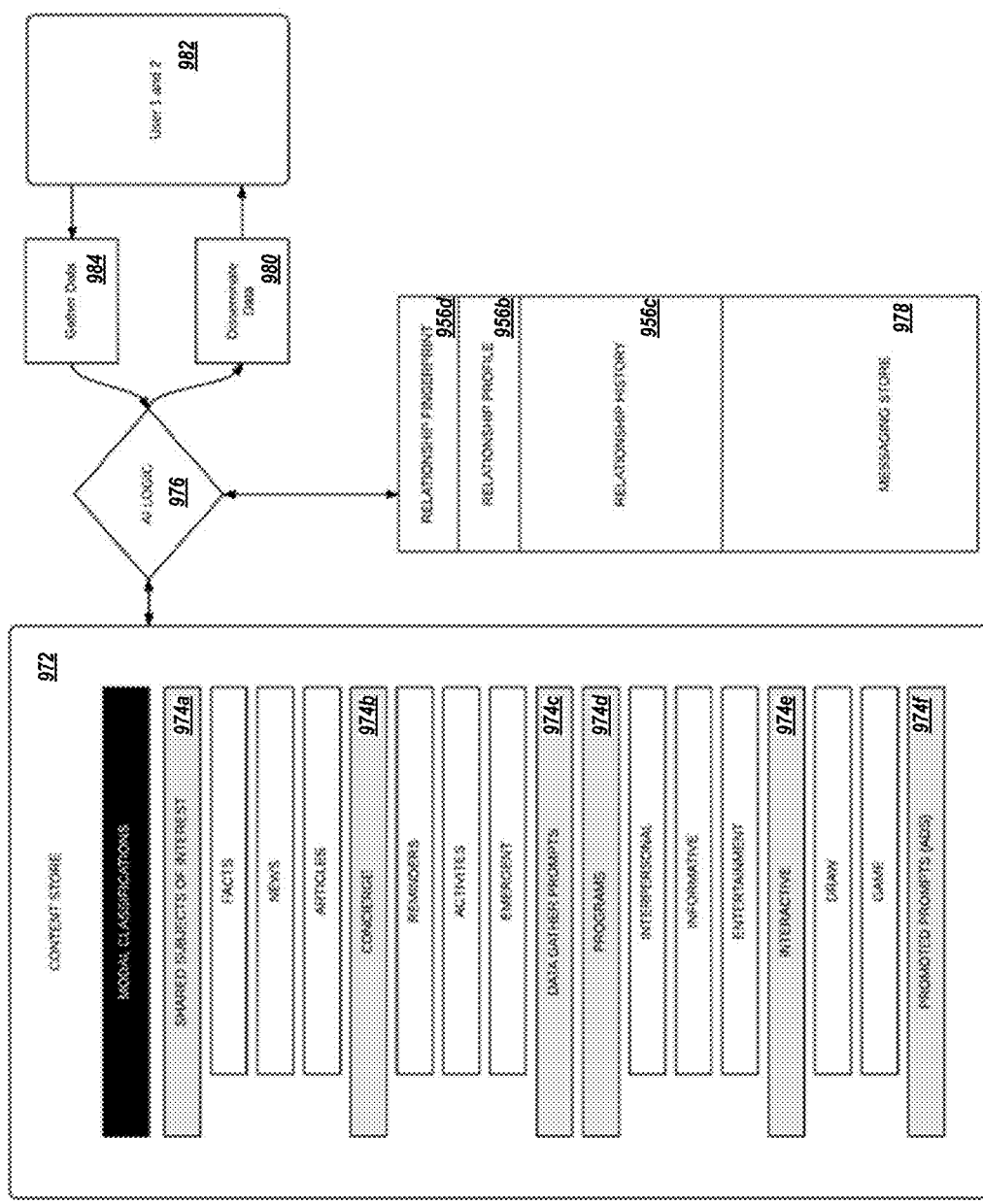
FIG. 9C depicts an example system for providing an improved social media platform with more meaningful social interactions among users.

Referring to FIG. 9C, which depicts an example system 970 for providing an improved social media platform with more meaningful social interactions among users. The example system 970 is similar to the systems 900 and 940, and includes components that can be used to implement the social and media platform 902 (similar to the social and media platform 802) and the databases 804-814 described above with regard to FIG. 8A. For example, the system 970 includes a content store 972 (similar to the curated content 866) from which content is selected and served to users 990.

In the depicted example, the content store 972 illustrates an example modal classification (example of content classifications 958), as described above. This diagram represents a simplified example of modal classification of content, but other different and/or more complex classifications are also possible, such as different modes consisting of different data/media configurations and can each have different handling in terms of the data modeling and client-side presentation.

The example modal classification includes example data elements 974a-f. A first element is a shared subjects of interest data element 974a, which represents content that is specifically relevant to a relationship based on a shared interest in a given area of subject matter. This data element can be provided at varying levels of specificity, with more specific categorization aiding in selecting more relevant content for the users in a relationship. The shared subjects of interest element 974 can included fields corresponding to, for example, facts, news, articles, media, and/or other fields.

A second element is a concierge data element 974b that stores data values designed to promote or assist the users' interactions in a pragmatic way, which are used by AI logic 976 to select relevant content for users. Examples fields for the concierge data element 974b include reminders (e.g., personal dates such as birthdays, graduations, and anniversaries, holidays such as Christmas, Mother's Day, Father's Day, and Valentine's Day), activity suggestions (e.g., enumerated data field including designations such as, simple, involved, random, fun, or context-specific suggestions of activities for the users), emergent (e.g., prompts resulting from AI/Algorithmic analysis, such as identifying a keyword from natural language processing such as "dinner" prompting links to local restaurants of shared favorite food types), and/or other data fields.

A third element is a data gather element 974c that directs in-line prompts that ask about a user, about other users, about relationships, and/or offer the ability to provide quick feedback about the content being delivered. For example, a normalized data prompts field that is part of the element 974c can include prompts that can be stored as key-value pairs, such as "How long have you known each other?"—(Number of Years); "What is the relationship—Brother, sister, mother, father, uncle, niece, good friend, new friend, co-worker, wife, significant other?"—(Options List); "What interests do you share?"—(Options List); "Would you like more or less prompts with this connection?"—(More/Less); "Did you like the last mediagram message?"—(Y/N).

A fourth element is a programs data element 974d that stores values representing thematic sequences of content and/or prompts. Such a data element 974d can include any of a variety of fields, such as interpersonal fields that identify current positions along or settings for a sequence of prompts that are more aggressively designed to help learn about the other person, for example a series of prompts on politics, or a helpful series of prompts to help in troubled relationships. Such a field may be configurable by users to have varying levels of controversial or difficult questions/content, such as being configured to have a higher likelihood of generating controversial or difficult questions or content. User interface features can be output across multiple different user computing devices so that setting configurations are purposefully, voluntarily and mutually requested/agreed upon by the users, as opposed to, for example, being independently instantiated by AI or algorithms.

The data element 974d can additionally include informative fields that correspond to sequences of content and/or prompts that are presented to users. A variety of different sequences are possible, such as sequences of content and/or prompts pertaining specific subject matter. For example, different sequences of content and/or prompts can pertain to the history of the French Revolution, basic car maintenance facts, a biography of Steven Spielberg, and/or others. The data element 974d can also include entertainment fields that correspond to sequences of media content that are presented to users. For example, content sequences can include sequences of short stories, sequences of illustrated series, short comic novels, and/or others.

A fifth element can be an interactive data element 974e that stores programmatic elements (e.g., applications, programs, routines) that can be run to promote interactions between users at particular points in time. The interactive data elements 974e can include, for example, drawing programmatic elements (e.g., interactive drawing programs, such as collaborative drawing programs), game programmatic elements (e.g., interactive games, such as chess or other strategy games), touch points (e.g., features promoting simple user interactions, such as interactive images), entertainment programmatic elements (e.g., videos, music), and/or other programmatic elements.

A sixth element can be a promoted data element 974f, which can include promoted content, such as paid advertising content that can be targeted to users based on relationship profiles, user profiles, and/or other information/factors. Promoted data elements 974f can include, for example, text, links, images, videos, interactive media elements, and/or other types of content containing one or more promotional messages.

Referring back to FIG. 9B, the concept model 942 and the data model 946 can be used to provide profiles 954, such as profiles modeling individual users (e.g., user profiles) and to model relationships between multiple users (e.g., relationship profiles for relationships between two users and/or relationships between groups of users (more than two users). Profiles 954 can include any of a variety of different types, such as user profiles 956a, relationship profiles 956b, relationship histories 956c, relationship fingerprints 956d, and/or other profiles. Profiles 954 can be used to identify content that is relevant for presentation to users based on any of a variety of factors, such as user preferences (as represented by the user profiles 956a), the user relationships (as represented by the relationship profiles 956b), historical context for user relationships (as represented by the relationship histories 956c), and relationship fingerprints (as represented by the relationship fingerprints 956d).

Referring back to FIG. 9C, an example of the profiles 956a-d being used by an AI logic system 976 to select content from the content store 972 for dissemination (980) to user devices 982 is depicted. For example, content can be selected from the content store 972 using relationship profiles 956b, which can include personal user data shared between users as well as all particular information about the relationship. Relationship profiles 956b can be created by gathering data (984) from the user devices 982. For example, users can have full control over viewing, adding to, and editing the content of each of their relationship profiles 956b. Various user-facing mechanisms for gathering and storing relationship-specific information can be used to gather data 984 to build relationship profiles 956b, such as the user devices 982 presenting a profile user interface for direct user viewing and editing of relationship profiles 956b (e.g., viewing and editing various fields/parameters), in-line social network prompts to obtain quick relationship feedback (e.g., prompts designed to unobtrusively allow the user to alter profile settings on-the-fly through quick feedback, such as through one-click responses), indirect relationship feedback from the user devices 982 (e.g., user reaction (or lack thereof) to selected and presented content), and/or other data. Relationship profiles 956*b* can include a variety of relationship-related data, such as data identifying shared interests, relationship length, relationship type (e.g., brother, sister, friend, co-worker), relationship nature (e.g., serious, light-hearted, romantic, platonic), desired frequency of interaction (e.g., daily, weekly, monthly).

The user computing devices 982 can present user interfaces designed to allow the user to view data and other inputs being used to build relationship profiles 956*b*. Such user interfaces can, for example, present condensed relationship information on a relationship profile dashboard screen, present graphical visualization based on factors such as number of shared interests, activity level, number of prompts responded to, etc., and/or other relationship-related graphical elements. Examples of user interface features to visualize relationships are depicted with regard to FIGS. 13A-C.

The user and relationship profiles 956*b* can be generated using the data gathering 984 from the user computing devices 982, through direct and indirect feedback from the users. For example, profile building input can be directly gathered through participation by the user as they populate user and relationship profiles with information. User interfaces will allow users to supply data in a variety of ways, such as information supplied about user, information supplied about relationships, and information supplied about other users. In another example, direct data prompts can be provided to users directly asking information, such as small portions of information that can, in some instance, be provide through a "one-click" response, and is easily dismissible by the user in order to be unobtrusive. FIG. 14C is a screenshot of an example "one-click" feedback interface in which content 1472 is presented with selectable graphical elements 1474-1476 that the user can select with a single click/selection action to provide feedback related to the content 1472. In another example, user answers to content prompts (e.g., prompts selected a messaging store 978) can be used to construct the profiles 956*a-d*, such as answers to the questions "what color is your favorite?" presented as clickable grid of colors, or "which historic figure do you admire most?" presented as a selection of photos. In another example, usage data indicating how users access and use the system 970 can be recorded and stored, such as usage data indicating when users message in a relationship, how often, how quickly they respond to prompts, where (GPS) do they usually interact with the app, and/or other usage information. In another example, natural language processing (NLP) can be used to analyze free-form textual responses from users answering prompts, and can be used to extract and store key-value pairs and other associated information, such as the frequency with which key words are used to build a referenceable index for reference in AI model inputs.

Figures 11A, 11B:
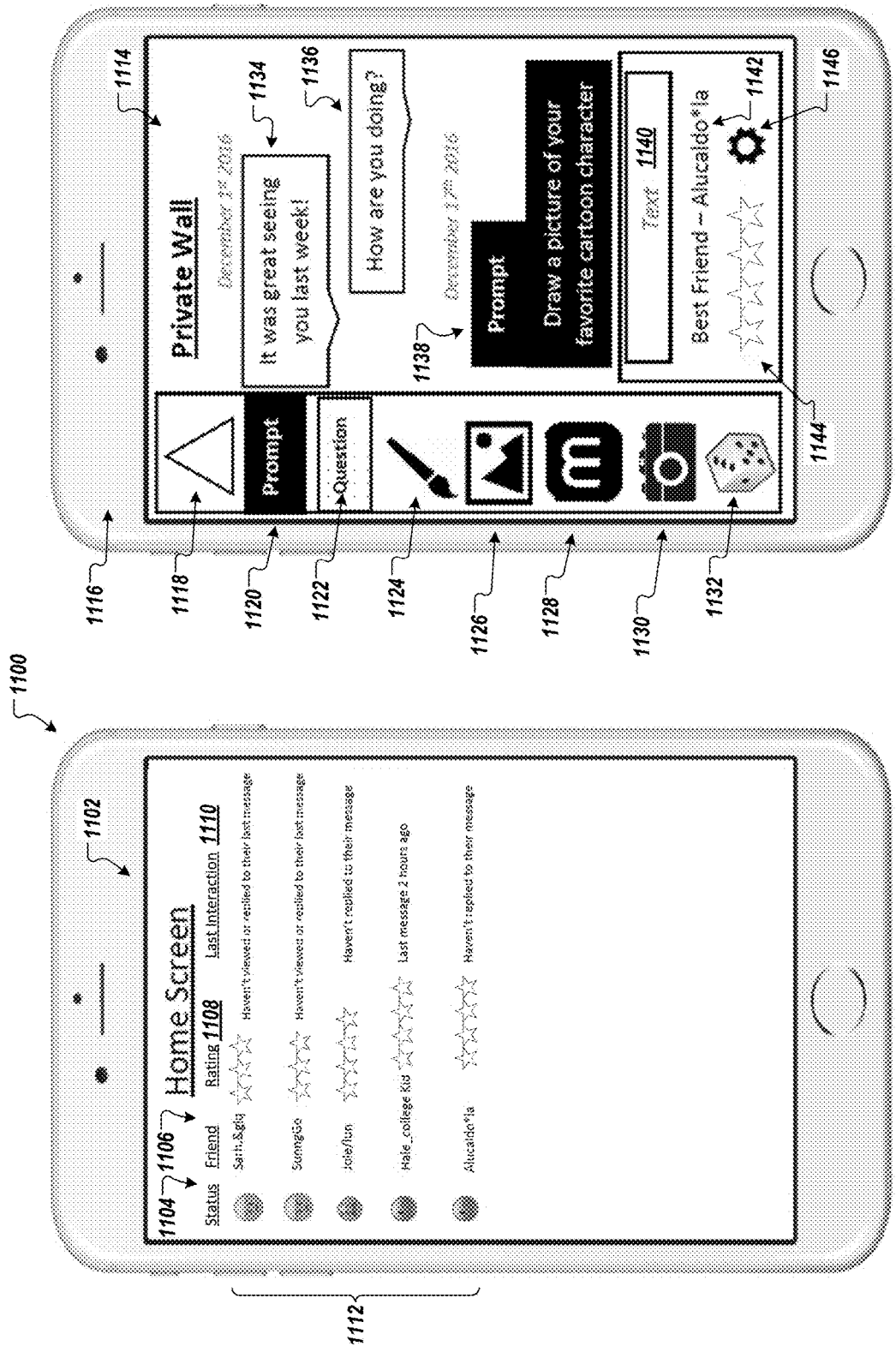
FIGS. 11A-B are screenshots of example user interfaces on an example mobile computing device for interacting with other users via private walls on a social platform.

Referring back to FIG. 9B, user interface features 962 can be provided by combining the concept model 942, the data model 946, and the content model 950. The user interface features can be selected based on, for example, the profiles 954 and the content classifications 958. Example user interface features are presented in FIGS. 11C-F and 13B-C. FIGS. 11A-B show general user interface features, and FIGS. 11C-F present example specific user interface features that can be selected for presentation to users. FIGS. 13B-C present example timing indicators for relationships.

Figure 11D:
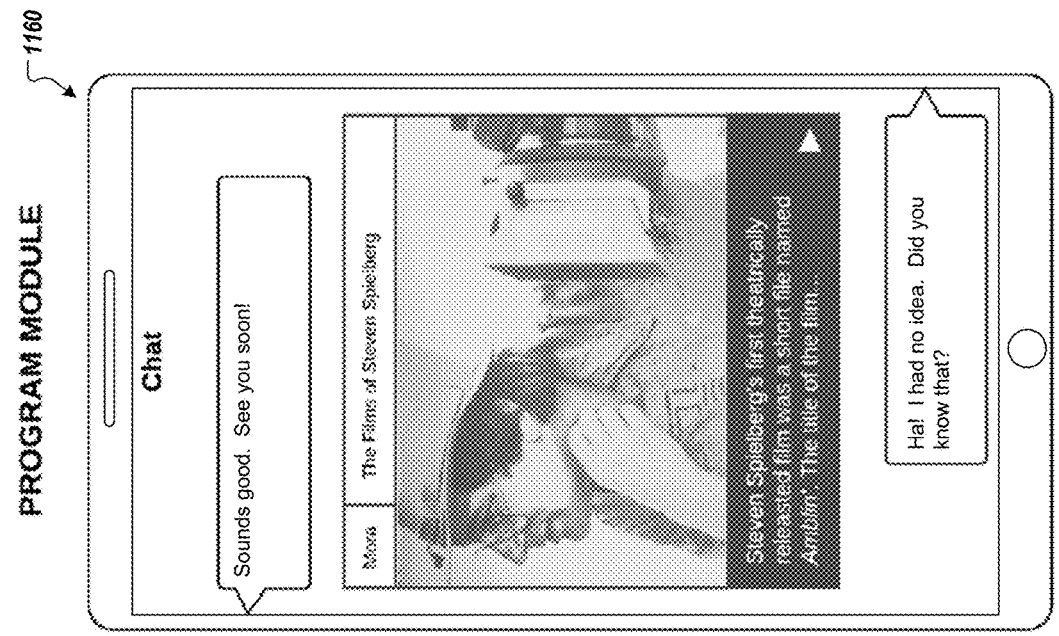
FIGS. 11C-F present example specific user interface features that can be selected for presentation to users.
Figure 11C:
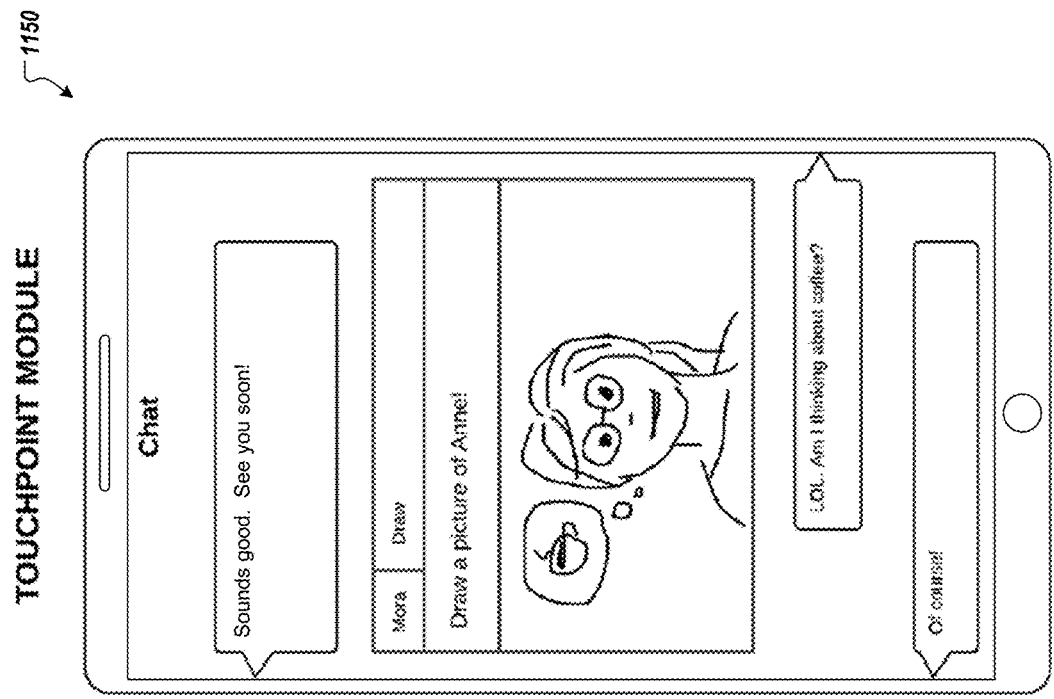

Referring to FIG. 11C, an example touch point user interface feature 1150 is presented. A touch point is a brief interaction prompted by the system (identified by "Mora") that can be more fun than demanding or thoughtful and that can typically have a basic level of interactivity. For instance, the example touch point in this example is a prompt to draw a picture of the other user who is part of the relationship ("Anne"). Other examples of touch points are "tapping one of three emoji-style faces," "tapping a photo of Kirk or Picard," and "drawing a sketch (in-line, in-app) of a Mora suggested subject." Touch points can target a presence-in-absence objective.

Referring to FIG. 11D, an example shared experiences (content focus) feature 1160 is presented. A shared experience feature can prompt people in a relationship to share a regular but punctuated, periodic and sequenced media experience over an extended period of time. Content can be based primarily on shared subjects of interest. In the depicted example, the shared experience feature that is presented (identified by "Mora") regards Steven Spielberg films, which is an interest shared by the users. Other examples of shared experience features include "viewing the biography of a favorite historical figure in a series of bite-size content delivered at a cadence desirable by the user(s)," "playing a game of chess within the interface over the course of weeks or months," and "sharing thematic sequences of content within the interface is like slowly watching a TV series together." Shared experiences can target a presence-in-absence objective and an engagement & playfulness objective. Shared experiences can have a low risk of negative affective costs.

Figure 11F:
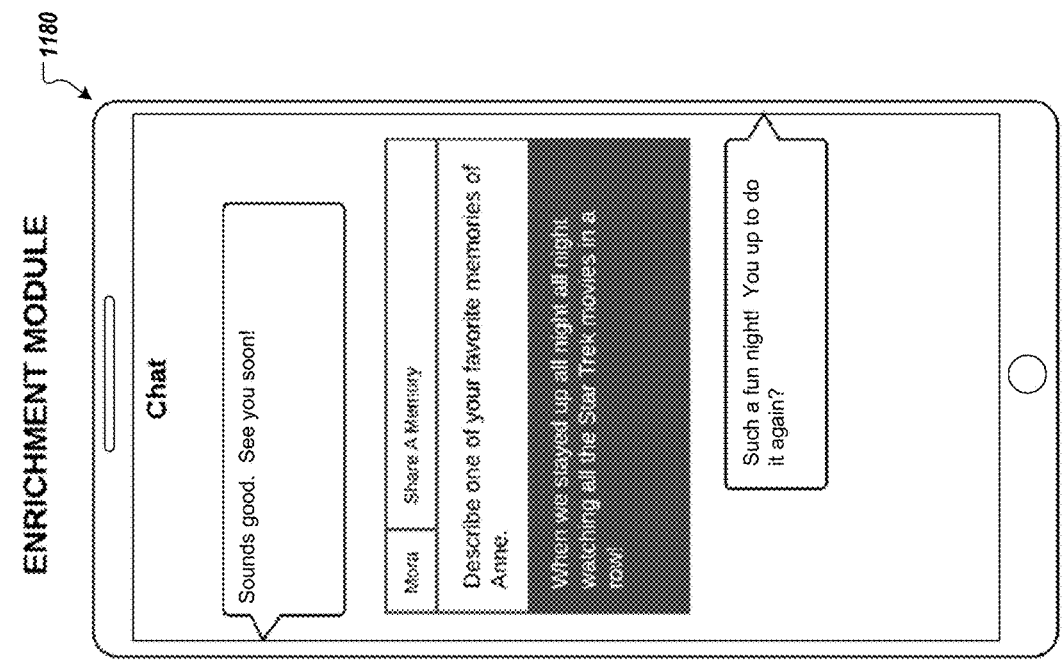
Figure 11E:
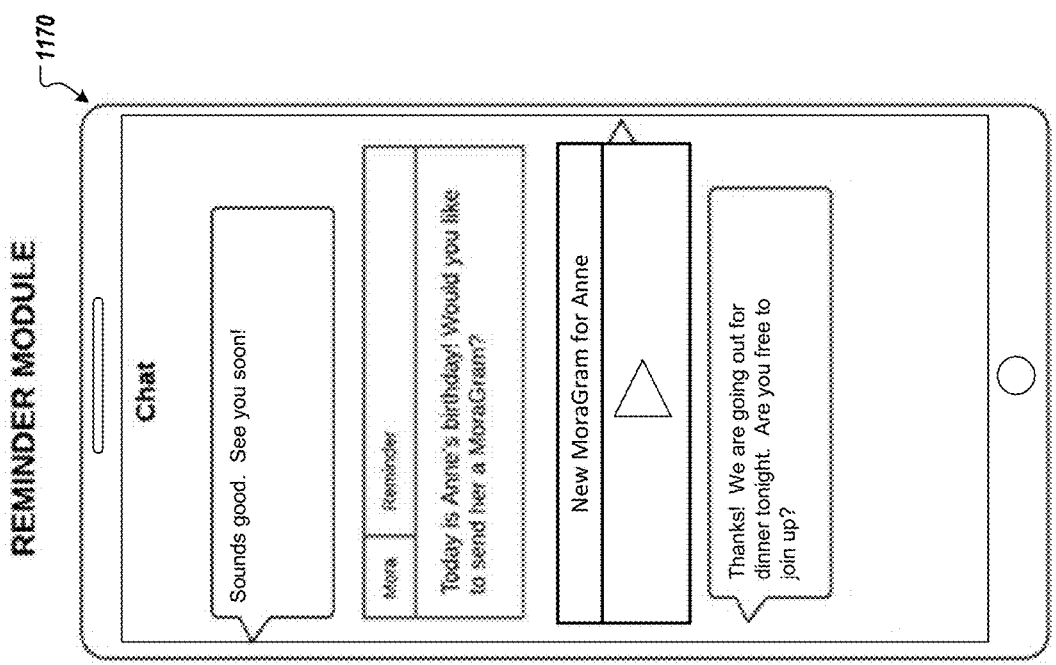

Referring to FIG. 11E, an example relationship concierge feature 1170 is presented. The relationship concierge can provide reminders, suggestions, assistance, and/or other prompts to assist users with maintaining and improving their relationships. In the depicted example, a user reminded that it is his/her friends birthday and with a suggestion to send a mediagram (also called a MoraGram), and then the user acting on that suggestion by sending a mediagram. Other example relationship concierge features can include "it's your uncle's birthday next week. He likes fishing and camping—how about a related gift?" and "it looks like you're planning dinner—would you like suggestions?" Relationship concierges can target opportunities for social support, engagement, and playfulness objectives.

Referring to FIG. 11F, an example enrichment feature 1180 is presented. An enrichment feature can provide prompts and content which encourage learning about the other person on a meaningful level. Enrichment features can have an unassuming approach and can avoids perception of being "clinical." In the depicted example, the enrichment feature is prompting the user to share a favorite memory with the others user. Enrichment features can target emotional expressiveness objectives.

FIGS. 13B-C present user interfaces with example relationship timing indictors. Timing indicators are a visual display which surfaces the underlying engagement frequency mechanic, the delivery buffering mechanic, or both. The variations below describe benefits and risks that could result from implementation of these mechanics. FIG. 13B shows an example user interface with a single timing indicator and FIG. 13C shows an example user interface with dual timing indicators. Other quantities of timing indicators are also possible. The timing indictors can present visualization for timing related to one or more of the following relationship features:
incoming user messages from system prompts,
outgoing user messages from system prompts,
timing since last outgoing message,
timing since last incoming message,
timing since last communication (either incoming or outgoing), and/or
time until system is scheduled to deliver next prompt.

Referring back to FIG. 9B, content programming and sequencing 964 combines the concept model 942 and the content model 950. Delivering users content that is relevant and specific can be a significant challenge. If content is too general the perception by the user may be that they appear to be advertisements. For example, if the user provides a general interest in sports when, unknown to the system, the user has a specific interest in the Boston Red Sox, attempts to deliver relevant content falling under the general "sports" classification can cause disengagement and frustration by the user (e.g., serving content related to the NFL, other baseball teams). As a result, the breadth and depth of the content model 950 can have a significant impact on the relevance of content that is selected for presentation to users, and ultimately on user engagement with the system and other users.

The content programming and sequencing 964 can include a variety of data elements that are being tracked and used to determine when and what content to serve to users, such as engagement frequency, delivery buffering, ephemerality, privacy of shared information, and/or others. Engagement frequency relates to the level of involvement the system has with the user and, more specifically, to particular relationships. A user may set a default value for the desired frequency for prompts and content delivered to the user, and can do this individually for each relationship. For example, the user may choose to set a high frequency (e.g. daily) for a significant other while setting a very low frequency for an old acquaintance (e.g. monthly or quarterly). Frequency setting can be adjusted through direct and/or indirect user feedback, such as adjusting the timing of these feedback prompts based on analytic data of actual user behavior. For example, if the user regularly delays a response to prompts in a given relationship, a frequency adjustment prompt would be delivered to the user.

Delivery buffering is a mechanism which purposely delays the sending and receiving of messages (e.g., prompt responses by users) by a certain amount of time (e.g., hours, days). Delivery buffering is contrary to conventional social media systems which seek to speed up the pace of user interactions. Delivery buffering can provide a variety of benefits, such as allowing users the ability to recall messages, as needed, and to build anticipation during which both senders and recipients are thinking about each other (e.g., incoming message buffering is visually communicated in the UI, such as FIGS. 13B-C).

Ephemerality refers to messages and content sent between users that will be "removed" after a certain period of time. The window of time that elapses before content is removed can be controlled by the user(s) per relationship. This feature can help preserve user privacy. Privacy of shared information relates to features that purposely limit a user's ability to distribute information shared on the platform will be implemented. The features include disallowing the ability to copy and paste content from the app to other applications, and discouraging the capture of screen contents by use of a devices screen shot feature. Where possible, this device feature would be disabled while using the app. However, device manufacturers have typically not allowed the disabling of the screen shot feature. A method of informing the user that the message-sender is notified of screen shots being taken will be employed as discouragement.

Figure 10:
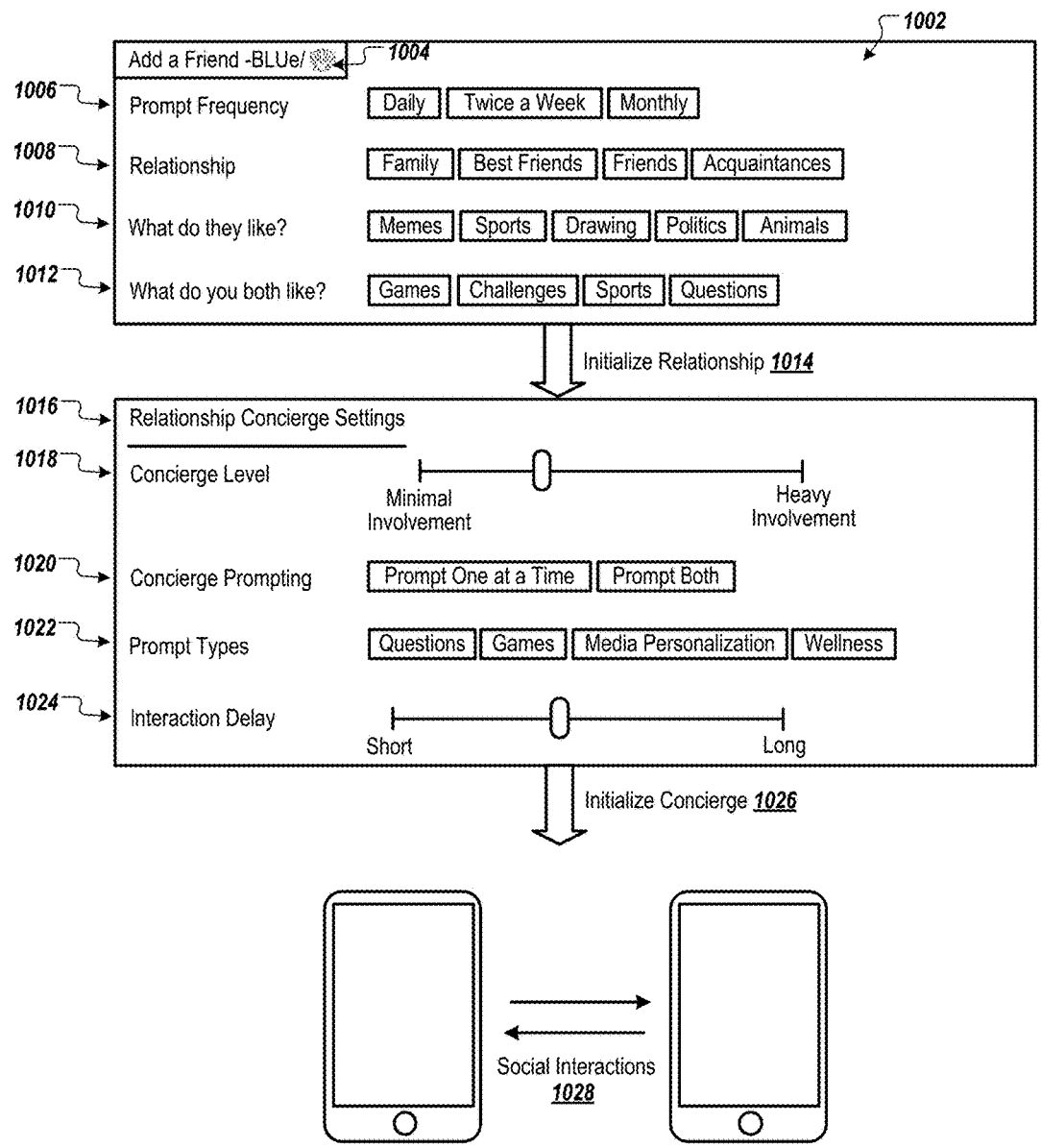
FIG. 10 is a flow chart with user interfaces and to establish an initial connection between users on a social media platform.

FIG. 10 is a flow chart 1000 with user interfaces 1002 and 1016 to establish an initial connection between users on a social media platform. The interfaces 1002 and 1016 can be presented by the social media client 932 on the user computing devices 924, for example. In the depicted example, an initial social connection is established between two users. As part of this process, the users provide information and answer questions about each other and about their relationship, which the system 906 uses to create and/or improve upon user and relationship profiles that are used by the system 906 (e.g., used by the relationship concierge 916).

In the first interface 1002, a series of information requests and questions 1006-1012 are posed to the user for his/her new relationship with the user 1004. As indicated by the username for user 1004, usernames can include any of a variety of ASCII characters (including non-alphanumeric characters, such as symbols and operators) as well as icons/emojis/graphics (as indicated by the seashell icon). In the depicted example, the user is prompted to provide the user's desired prompt frequency for the relationship 1006, the type of relationship 1008, common interests among the users 1010, and types of prompts that the users are interested in 1012. Responses to this information assists in initializing the relationship (1014).

In the second interface 1016, the user is again presented with a series of information requests and questions 1018-1024. For example, the user is prompted to designate a desired level of concierge involvement in the relationship 1018 (e.g., heavy involvement can cause all interactions to pass through the concierge—meaning no freeform exchange outside of concierge prompts, minimal involvement can permit many interactions outside of the concierge), whether the concierge should prompt one or both users at a time 1020, the prompt types 1022 that the user is interested in, and desired minimal delay for users to interact with each other on the wall 1024. With these parameters selected, the concierge can be initialized (1026) and the users can begin socially interaction in the platform (1028).

FIGS. 11A-B are screenshots of example user interfaces 1102 and 1114 on an example mobile computing device 1100 for interacting with other users via private walls on a social platform.

Referring to FIG. 11A, an example home screen interface 1102 is provides a list 1112 the user's friends on the platform along with relationship information for each of the friends. Each of the friends is identified by a username 1106, a relationship status icon 1104 (status of the relationship between the user of the device 1100 and the friend), a relationship rating 1108 (rating of the relationship between the user of the device 1100 and the friend), and information on the last interaction between the users 1110. More stars for the ratings 1108 indicates a stronger relationship, and fewer stars indicates a weaker relationship. Relationship ratings 1108 can be determined based on a variety of factors, such as points for questions and aggregate point summaries over time. The relationships (as identified by the friends 1106) are sorted in the list 1112 in reverse order so that the relationships most in need of attention by the user are seen at the top of the list 1112. The relationships in the list 1112 can be selected to navigate to a private wall for the relationship.

Referring to FIG. 11B, a private wall for a relationship with user 1142 is presented in the interface 1114, which includes a variety of different options 1118-1132 and 1140 for the user to interact with the other user 1142. The private wall 1114 also includes a chronological view of recent interactions between the users, which includes unprompted messages 1134 and 1136, as well as a prompt 1138 that has been provided to the user. As indicated by the timestamps of the messages 1134-1136 and the prompt 1138, over two weeks had elapsed since the users had interacted, which is what likely triggered the relationship concierge to provide the prompt 1138 to continue communication between the users. The user can respond to the prompt 1138 through the interface 1140 and/or through one or more of the interaction options 1118-1132. The user can also elect to ignore the prompt 1138 and/or to indicate dislike of the prompt 1138.

The interaction options 1118-1132 include an interactive wellness feature 1118 (see FIGS. 17A-H), a prompt feature 1120 to request for another or different prompt (e.g., step outside of current art of prompts from the relationship concierge), questions 1122, an interactive drawing feature 1124, a picture sharing feature 1126, a mediagram creation and sharing feature 1128, a photo/video sharing feature 1130, and a games feature 1132.

The interface 1114 also includes relationship status information 1144 (rating for the relationship with user 1142) and options 1146 to modify settings for the relationship.

FIGS. 12A-H are screenshots of an example process flow for a relationship concierge facilitating and improving social interactions among users via private walls on a social platform.

Figure 12B:
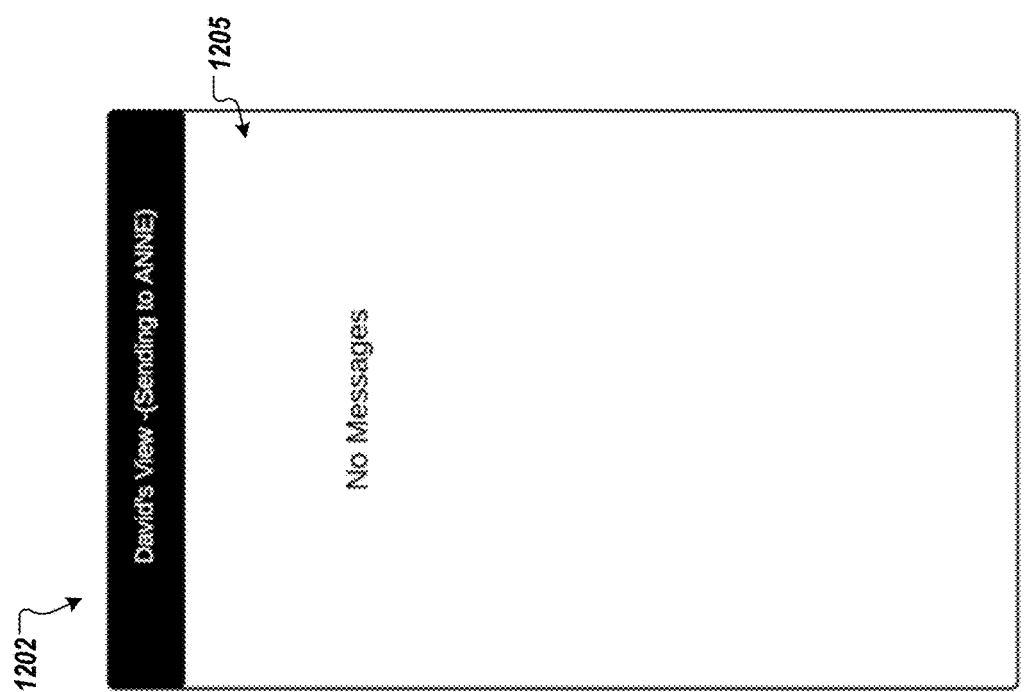
Figure 12A:
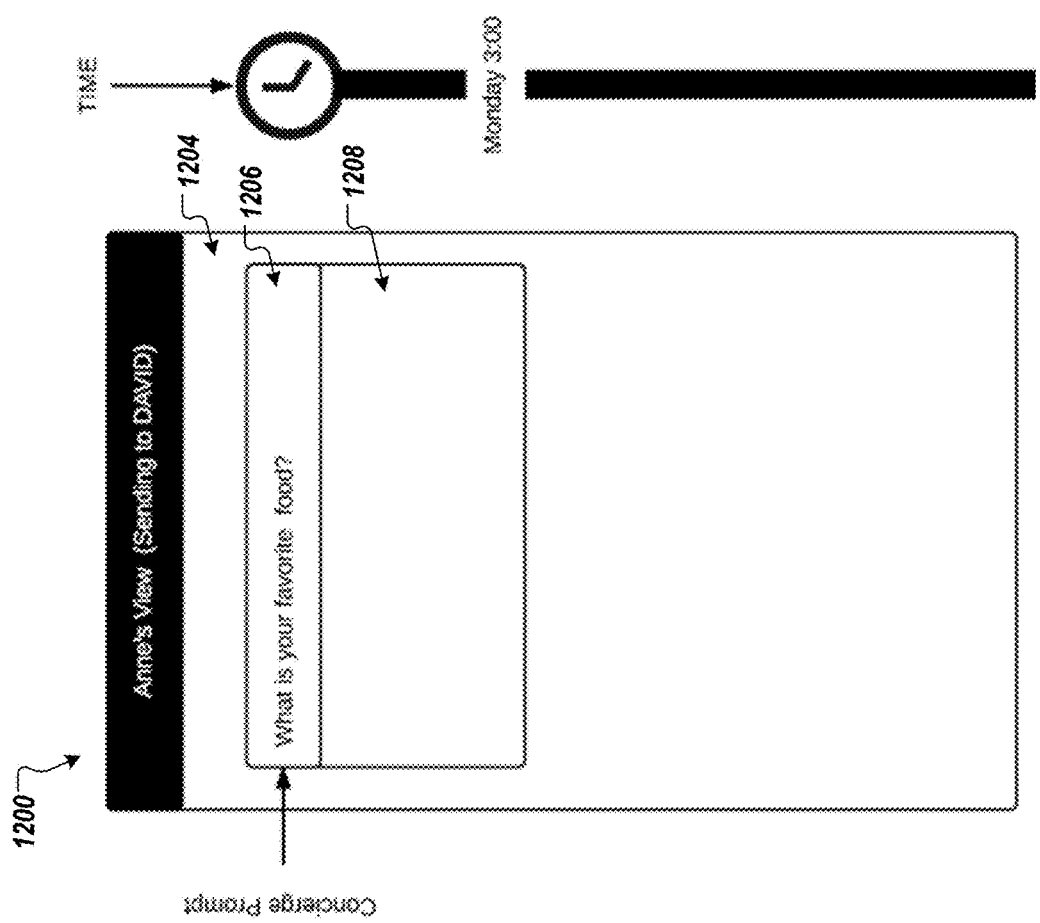

Referring to FIG. 12A, the user device 1200 for Anne includes the interface 1204 for a private wall between Anne and David on Monday at 3:00, which is when Anne receives a prompt 1206 from the relationship concierge. The prompt 1206 is accompanied by a field 1208 through which Anne can respond to the prompt.

Referring to FIG. 12B, at the same time as Anne receives the prompt 1206, the user device 1202 for David does not present any prompts in the interface 1205, including not presenting the prompt 1206 just given to Anne. This scenario represents an initial state where ho prior prompt history is visible in David's view.

Referring to FIG. 12C, a few minutes later at 3:05 on Monday, Anne enters and submits an answer 1208 to the prompt 1206 given by the relationship concierge, as indicated by the sent status 1210 for the prompt and answer (1206-1208).

Referring to FIG. 12D, at 3:05 on Monday, David receives Anne's message 1212-1216. The question (or directive) given by the relationship concierge is visible to David (1214), in addition to the content of her reply (1216). Although not depicted, the prompt response can be an icon that, once selection, opens up like a gift with animation. Such animations features could additionally be used as ways to present electronic gifts and/or donations to other users and/or organizations (e.g., charitable donations to disaster victims).

Referring to FIG. 12E, the following day at 1:30, Anne has not received a new prompt from the relationship concierge, and any new prompts given to David are not visible in the interface 1204.

Referring to FIG. 12F, on Tuesday at 1:30, David receives a new prompt 1218 from the relationship concierge, which includes a field 1220 to provide a response. The prior history of sent and received prompts is visible in the interface 1205, but may be removed after a default or user-set amount of time.

Referring to FIG. 12G, at 1:40 on Tuesday, Anne receives a message 1224-1228 from David which displays both the prompt 1226 given to David and the content of his reply 1228.

Referring to FIG. 12H, at 1:40 on Tuesday, David has replied 1220 to the latest prompt 1218 given by the relationship concierge, as indicated by the sent status 1222.

Figure 13A:
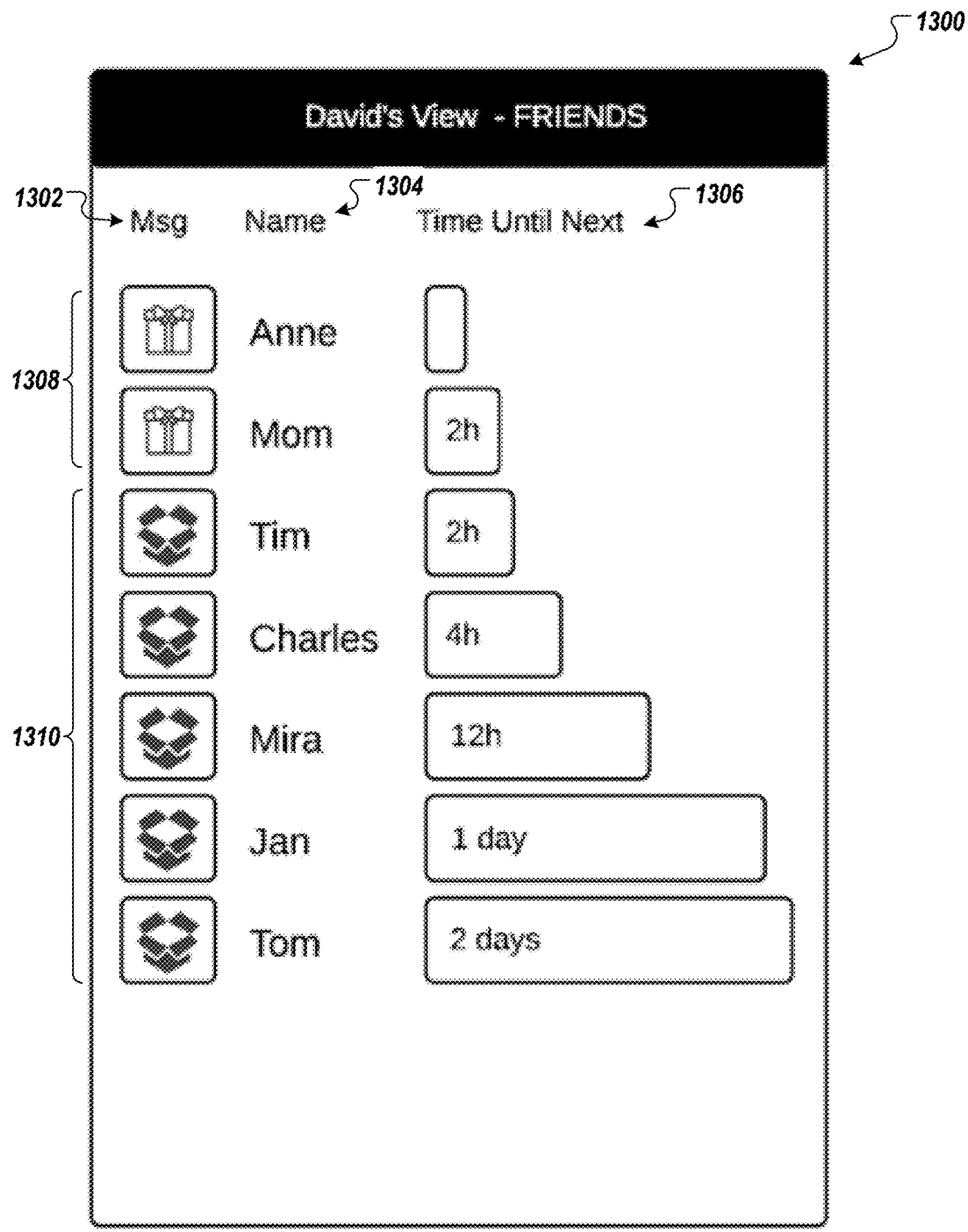
FIGS. 13A-C is screenshot of an example user interface on a mobile computing device for viewing a user's friends and the corresponding interaction delays until another relationship concierge prompt is expected.
Figure 13C:
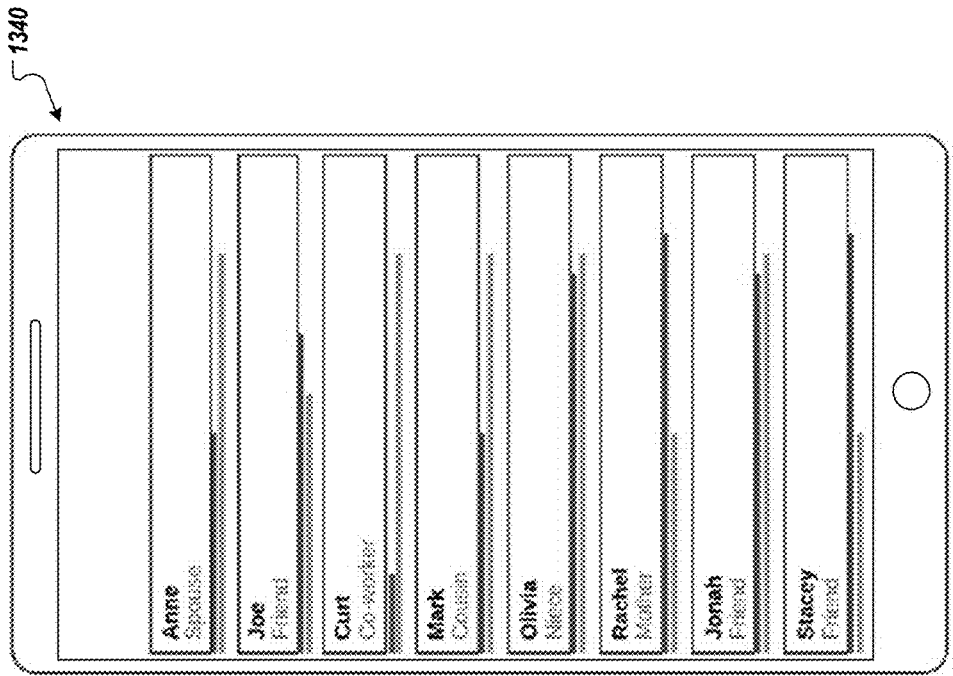
Figure 13B:
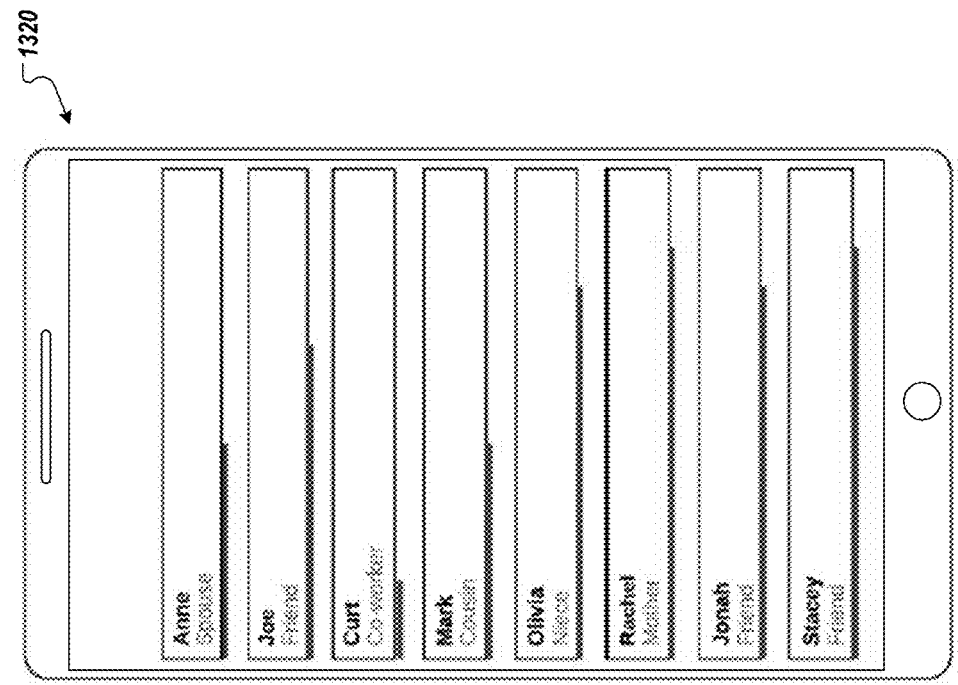

FIG. 13A is screenshot of an example user interface 1300 on a mobile computing device for viewing a user's friends and the corresponding interaction delays until another relationship concierge prompt is expected. The user interface 1300 presents a list of friends across a number of different categories, including a "Msg" column 1302 that indicates whether the user of the device presenting the interface 1300 has a message waiting from one of his/her friends. Such messages can include, for example, any type of prompt, a mediagram (personalized music video message), etc. The unopened gift icons 1308 indicate that the user has not viewed the waiting message yet. The opened gift icons 1310 indicate that the user has already viewed all messages sent from the corresponding friend.

The "Name" column 1304 displays the name of the friend(s) with whom you (the user) are having a private conversation. The "Time Until Next" column 1306 indicates an amount of time, which could be either approximate window of time or a precise amount of time, until the next prompt will arrive for that relationship from the relationship concierge. The "Time Until Next" column 1306 could be used to represent additional and/or alternative relationship metrics. For example, the "Time Until Next" column 1306 could indicate timers (bars) representing how much time has passed since the user last communication with a given contact. In such a scenario, the longest bar would be shown on top of the list to highlight the relationship in greatest need of attention. Color distinctions in the timer bars can indicate an "overdue" state where too much time has passed (according to default values or user set values).

Figure 14A:
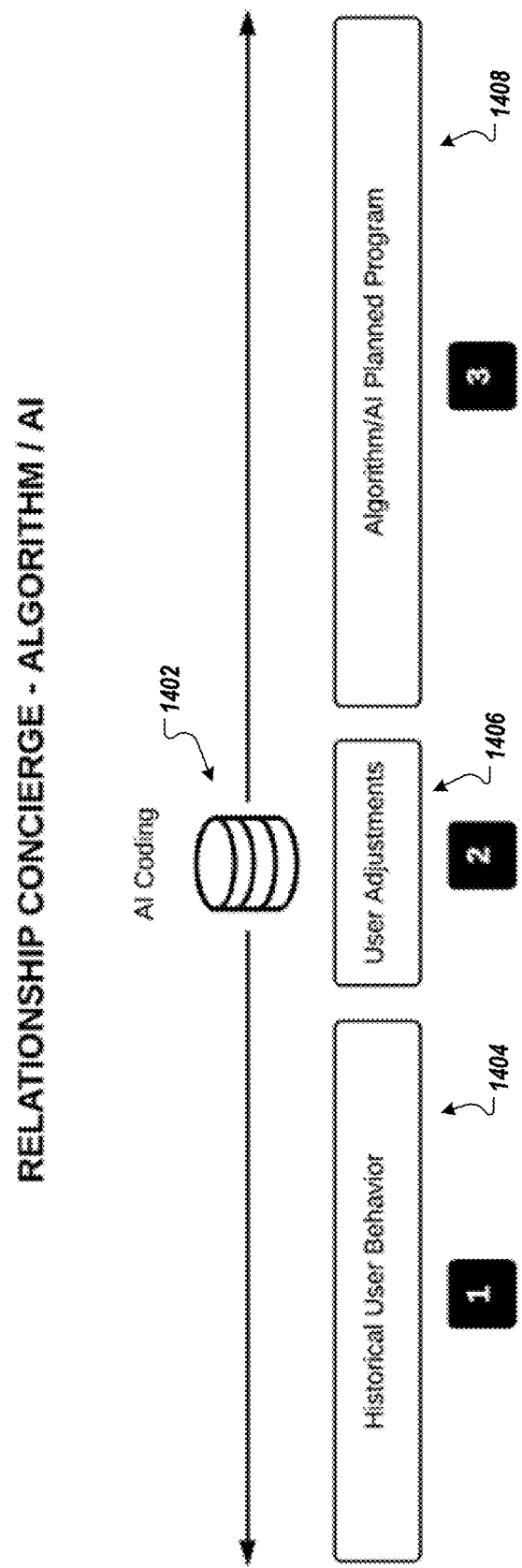
FIG. 14A is a conceptual diagram of an example personal concierge system and algorithm for facilitating and improving user relationships on a social network.

FIG. 14A is a conceptual diagram of an example personal concierge system and algorithm 1400 for facilitating and improving user relationships on a social network. The relationship concierge 1402 is a programmed logic that is designed to interpret and understand the nature of a relationship between two people, tendencies, and behaviors of each individual, and to formulate a forward looking program of prompts based on those factors. The relationship concierge 1402 is largely algorithm-based, using historical user data and user inputs to determine the content of the prompts given to a user. The relationship concierge 1402 also incorporates one or more AI techniques and platforms to allow for decisions to be made that are not pre-programmed into the algorithm or pre-determined. The relationship concierge 1402 can be allowed to make choices for the users based on emerging patterns of usage and user input.

The relationship concierge 1402 can use a variety of different data sources 1404-1408 to determine and provide prompts to users. For example, the relationship concierge 1402 can use historical user behavior data 1404, which can include, for example, answers to prompts, how long the user takes to responds, the times of day the user responds, how quickly the respond to certain categories of prompts, how often they dismiss (reject) certain types of prompts, and/or other relevant data representing historical user behavior.

In another example, the relationship concierge 1402 can use user adjustment data 1406 which indicates changes in relationships over time. Users are provided with options to directly supply feedback and information on the nature of their relationships with others. For example, the user could indicate that the relationship for a contact is intimate/ romantic in nature, and further that there has been a recent breakup in the relationship, and further that they either want to re-kindle the relationship or to ease it into a platonic relationship. In another example, the user could indicate that the contact is an old friend that they would simply like to stay in touch with but is not interested in delving into deep conversations. Other forms of ongoing direct user input can be indicated via in-line feedback options within the ongoing conversation that they liked or disliked a given prompt type, or that they would like the speed up or slow down the rate at which prompts are supplied.

In another example, the relationship concierge 1402 can use one or more default program of prompts 1408 based on the standard parameters of input (described above). In addition to the one or more default programs, specialized sets of prompts can be centered around a theme that can be chosen by the users. These special sets of prompts, if chosen, can be weighted above the standard parameters. The set of special prompts centered on a theme can have a discrete quantity and start/end date, not necessarily known to the users. Examples of the special themed programs that can be delivered by the Relationship Concierge can be a series of prompts that have an aim to, for example: reconcile political viewpoint differences, patch up a failing relationship, deeply explore the memoires and life of an individual (e.g., a grandmother and granddaughter relationship), explore a specific subject such as philosophy, religious beliefs, and/or lighter subjects such as movies, art, music, sports, etc.

Figure 14B:
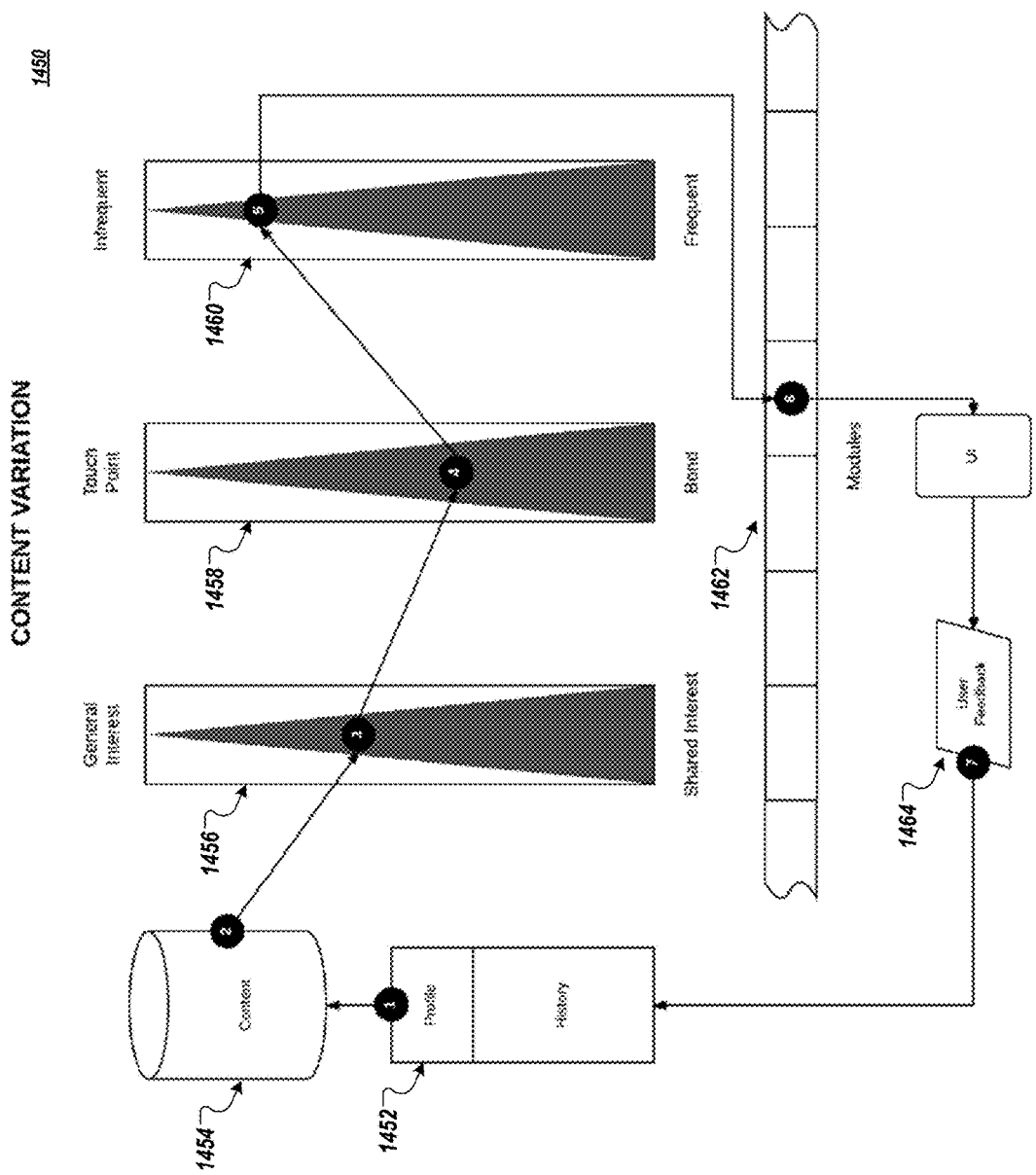
FIG. 14B is a diagram of an example system to vary content that is selected for presentation to users.
Figure 14C:
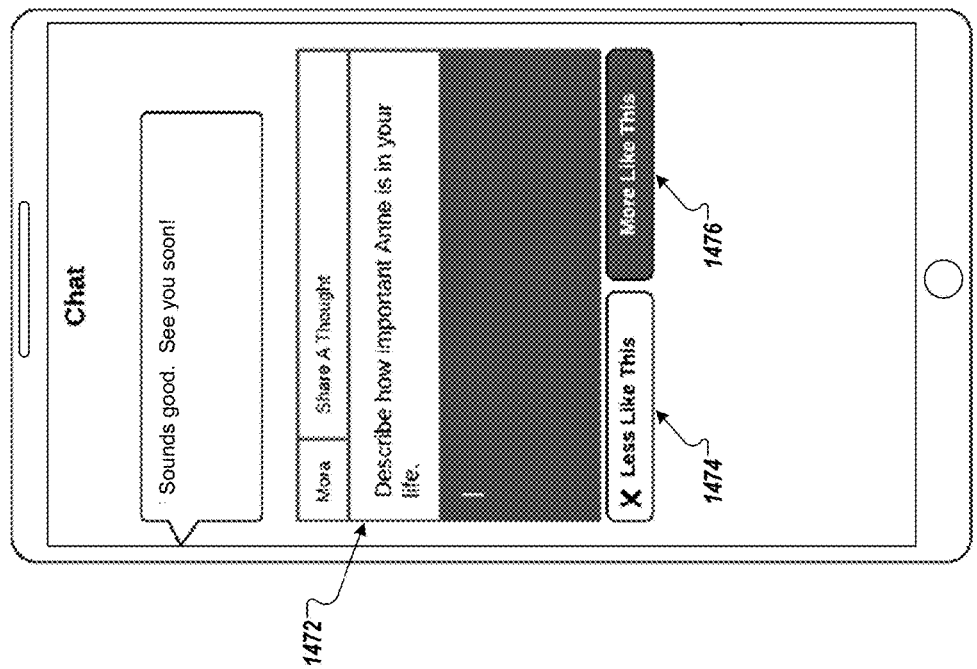
FIG. 14C is a screenshot of an example "one-click" feedback interface in which content is presented with selectable graphical elements that the user can select with a single click/selection action to provide feedback related to the content.

FIG. 14B is a diagram of an example system 1450 to vary content that is selected for presentation to users. Content delivery to users can seek to balance user-reported desirability with natural variation to avoid both extremes of content irrelevance and overly predictable consistency. The example system 1450 can be implemented as part of the example platforms/systems 800, 860, 900, 940, 970, 1000, and/or 1400 described above. The system 1450 can effectively utilize a feedback loop to provide content and, based on user feedback, to refine the selection of future content that is selected for delivery to users.

Relationship profiles and history (1452) can be used to select content (1454) for presentation to users. The relationship profiles can include data that describes relevant matching characteristics learned by various methods including self-reported data contained in individual profiles, data gathered from algorithms and analytics, and user-reported data about the specific relationship. A history of content delivered to the relationship can be stored in order to track, regulate, and plan the flow of content. The content can be, for example, taxonomically organized content is stored in the system which is then queried and retrieved based on relevance to the specific relationship.

Topical interests (1456) can be used to refine the content selection (e.g., pare down a large set of content to a smaller subset of content). Topical interests are qualitative measures of both implicit relevance (e.g. some content is of more general relevance to a married couple than friends or co-workers) and explicit relevance (e.g. user-supplied data indicating a shared interest in baseball or the Boston Red Sox.). The more specific the domain of interest is defined the greater the value of topical interest. The classification of content is stored as part of the topical taxonomy described in a later section.

Intensity (1458) and frequency (1460) parameters can be used to further refine the content selection. Intensity generically refers to where in the spectrum of casual to intimate (or personal) the nature of the content belongs. The intensity of any given piece of content is an attribute applied and stored in the metadata taxonomy. Frequency can be, for example, a quasi-mutually agreed upon value between two users regulating how often the system will deliver content. For example, if one user sets the initial desired frequency at daily and the other sets the desired frequency at weekly then the system may set the starting point for the actual delivery frequency at every three days, and is thus a de facto negotiated interaction.

The selected content can then be delivered via one or more modules (1462) (e.g., FIGS. 11C-F). Modules are how content is manifest in the user interface. Each module type is a specific combination of media formatting (e.g. text only, text with image, etc.), interactivity characteristics, and categorical purpose (e.g. a reminder, a question prompt, an element of a thematic sequence (see programs), or a promoted ad).

User feedback can be obtained (1464) from the UI and used to further refine the relationship profile and history (1452). For example, as content is delivered, the opportunity for users to provide quick "one-click" feedback will be presented. Occasionally buttons that allow users to tap Less Often/More Often/No Change or More Like This/Less Like This will be attached to a piece of system-delivered content. This feedback is used to adjust the relationship profile data accordingly.

FIGS. 15A-D are screenshots of a relationship concierge being applied to other social platforms providing predominantly open communication among broad groups of users, such as FACEBOOK, TWITTER, LINKEDIN, and/or other social platforms.

Referring to FIG. 15A, an example user interface 1500 on a social platform providing predominantly open communication among users is depicted. The interface 1500 can be a news feed, for example. The interface 1500 includes a post field 1502 through which the user can create and submit a post for distribution across a broad group of users (e.g., friends, fans, followers, public). The interface 1500 includes a relationship concierge prompt 1504 that is presented to the user. The prompt 1504 is identified as being from the relationship concierge and that it is presently only visible to the user (1506). The prompt 1504 identifies that it pertains to the User A (user of the interface 1500) not having interacted with User B in over one month and suggests a number of options (1508). The example options include a first option 1510 to like or comment on a recently popular post 1512 of User B. At least a portion of the post 1512 is presented in the interface along with interactive features 1514 and 1516 through which the user can directly interact within the feed. These interactions with the post 1512, as facilitated by the relationship concierge, will be viewable by and potentially broadcast to a broader audience than just User A and User B.

A second option 1518 is to publicly post a message on User B's wall. Again, this option includes an interactive feature 1520 to perform the action from within the feed. Also again, this interaction will be viewable by and potentially broadcast to a broader audience than just User A and User b.

A third option 1522 is to answer a question for User B regarding User A's favorite movie over the past year. Again, this option includes an interactive feature 1524 to perform the action from within the feed. This option, however, provides a select box 1526 through which the User A can designate whether the answer to this question should be delivered as a private message (not initially viewable beyond User A and User B, unless forwarded or shared with other users) or posted to a broader audience. In this example, the User A enters an answer to the question in the third option 1522 and does not select the box 1526.

Referring to FIG. 15B, an interface 1528 for User B on the social platform presents a post 1532 for the relationship concierge prompt 1504 and answer 1524 from User A. The post 1532 includes information identifying that the User A answered a question posed by the relationship concierge for User B, the question and answer 1536, and features 1538-1540 through which the User A, the User B, and other users can interact with the post 1532. The news feed 1528 for the User B also includes a field for the User B to create a post 1530 and a post from another user 1542.

Referring to FIG. 15C, the interface 1500 for the User A on the social platform is again presented with the prompt 1504 from the relationship concierge. However, in this example the user selects the box 1526 to deliver the answer 1524 to the question 1522 privately to User B.

Referring to FIG. 15D, a private messaging interface 1550 (e.g., FACEBOOK MESSENGER) for the User B on the social platform is presented. The interface 1550 depicts the private message 1552 from the User A as well as the question and answer 1554 to the prompt 1504 from the relationship concierge. The private message 1552 is presented among other private and group messages 1556-1566 for the User B on the social platform. Unlike the social platforms 802 and 902 described above, there may be no restriction on the User B transmitting or sharing the message 1552 more broadly than just the relationship between the User A and the User B.

Figure 16:
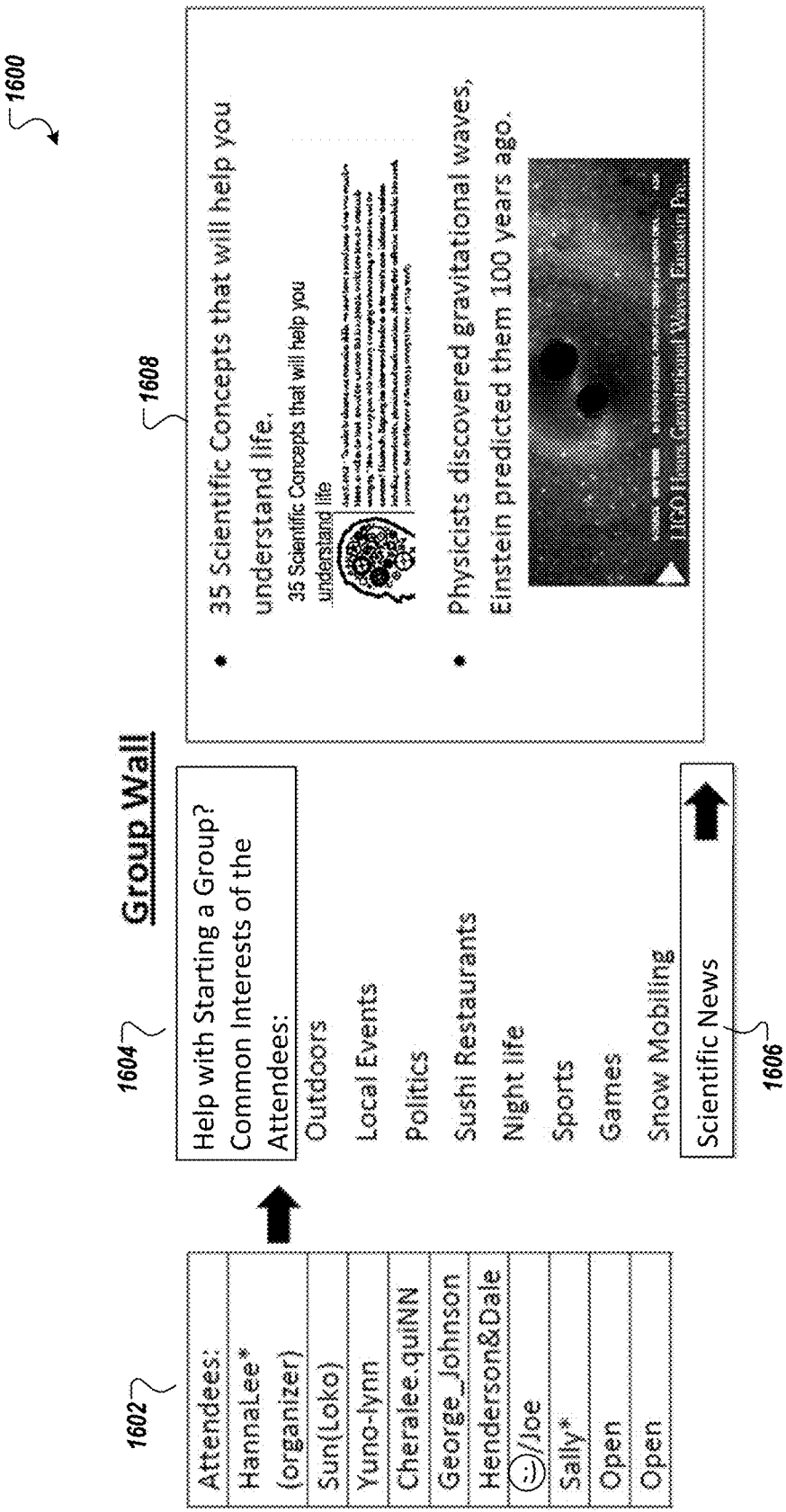
FIG. 16 is a diagram depicting creation and use of a private group wall on a social platform to improve and enhance meaningful social interactions.

FIG. 16 is a diagram depicting creation and use of a private group wall 1600 on a social platform to improve and enhance meaningful social interactions. The example group wall 1600 has multiple users 1602 who are members of the group and who are permitted to contribute to the wall 1600. The group organizer is identified at the top of the list with the notation "organizer." The organizing user can designate a variety of parameters for the group, including who is invited/permitted to be a member, permissions for other members to add new members (e.g., friends of original members are able to be added), time limits on the existence of the group wall (e.g., 2 month expiration date), roles for different group members to play within the group (e.g., rock band roles—band member, groupie, fan), and/or other features.

The group wall can be initiated with conversation starter, which can be facilitated by the relationship concierge. The conversation starter can include, for example, pictures, drawings, memes, videos, news stories, questions, etc. If the group organizer needs help finding a topic of common interest, they can use the relationship concierge 1604 to create a custom list 1604 of common interests (which can automatically be identified from user profile analysis) and can choose a topic 1606 most of the participants have in common. The selected topic 1606 can be used to insert initial content 1608 into the wall 1600 that pertains to the selected topic 1606. In the depicted example, the initial content 1608 includes news articles relevant to the topic 1606.

FIGS. 17A-H are screenshots of an example user interface 1702 on a computing device 1700 for users to express and interact with others regarding their emotional well-being.

Figure 17A:
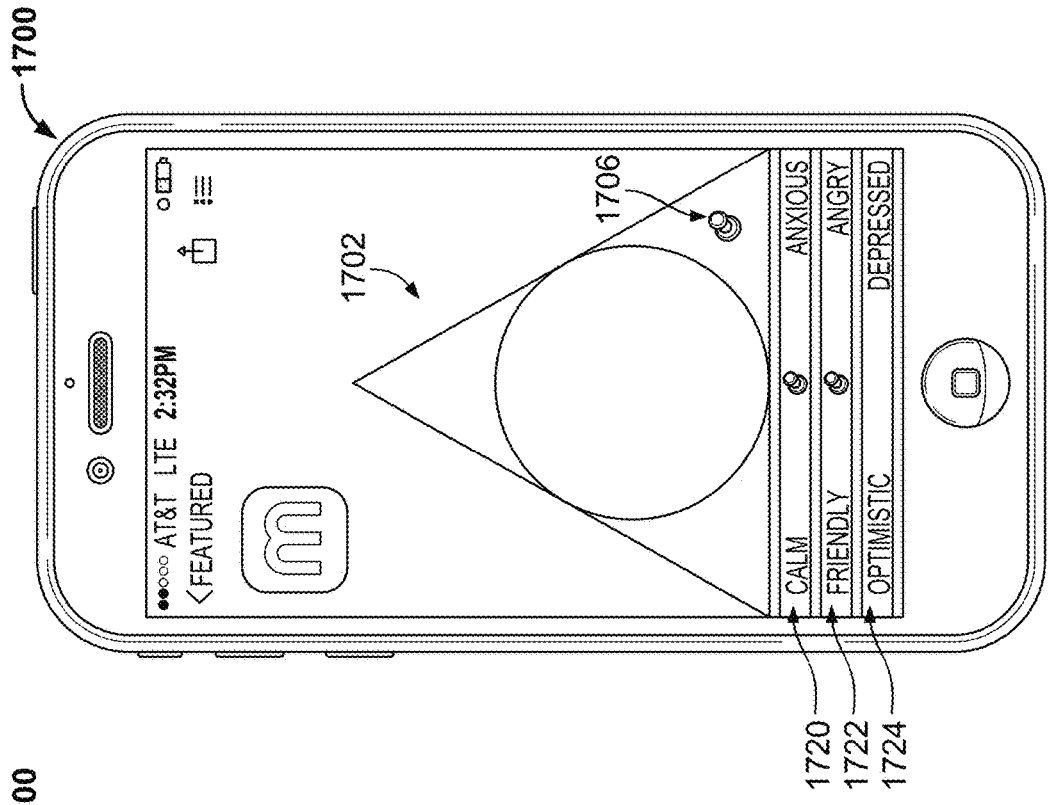
FIGS. 17A-H are screenshots of an example user interface on a computing device for users to express and interact with others regarding their emotional well-being.

Referring to FIG. 17A, the interface 1702 is a visual aid for users to better understand their feelings and improve their mental states. The three corners of the interface 1702 (a triangle) represent emotional extremes. The top corner (yellow/white) is selfless compassion, a bright ideal to strive for. The left corner stands for passion and the right corner represents depression. The center circle 1704 represents normality, the sphere of daily emotions.

Users can use the interface 1702 to assist in expressing and improving their emotional states, to improve their moods, and gain peace-of-mind. A movable pin icon 1706 can be placed at different positions throughout the interface 1702 by the user to represent his/her current emotional state. The user can adjust the positioning of the icon 1706 as frequently or infrequently as he/she wants (e.g., hourly, daily, weekly). Increased frequency of use can assist users in understanding and tracking the change in their emotional state over time, and can help them work to improve their moods. For example, the three corners 1710, 1714, and 1718 of the interface 1702 represent calm, understanding, enlightened, generous, compassionate (top corner 1710, which can be colored yellow-white); anger, agitated, irritated, passionate (left corner 1718, which can be colored red); and sad, depressed, down, bored, dispassionate (right corner 1714, which can be colored blue). The three sides 1708, 1712, and 1716 of the interface 1702 represent optimistic, enthusiastic, upbeat, joyful (left side 1708, which can be colored orange); friendly, sociable, agreeable, cool (right side 1712, which can be colored green); and anxious, upset, worried, fearful (bottom 1716, which can be colored purple). The top half of the interface 1702 can represent positive, healthy emotions, whereas the bottom half represents negative, less-healthy emotions Three different walls on the social platforms 802 and 902 can depict the current mood of the user of the device 1700—a private wall that is only accessible to the user of the device 1700 and the relationship concierge (see FIG. 17B), a shared private wall for a relationship between two users (see FIG. 17C), and a private group wall for more than two users (see FIG. 17D).

Figure 17B:
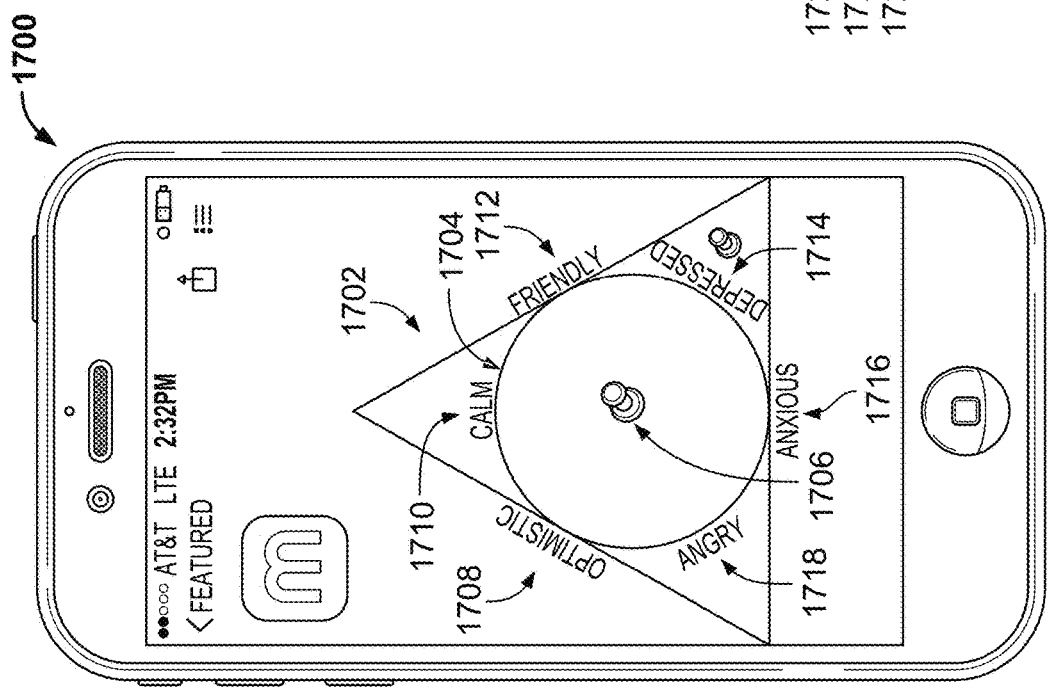

Referring to FIG. 17B, a private wall for the interface 1702 that is only accessible to the user of the device 1700 and the relationship concierge is depicted. The pin 1706 indicates the user's current mood. The pin 1706 can be positioned, for example, by the user with the three sliders 1720-1724—Calm/Anxious, Friendly/Angry, Optimistic/Depressed. The user may also choose to include input from the relationship concierge and/or other users.

For example, in the depicted example the user has moved the pin 1706 in response to a sad event occurring (e.g., user's pet just died). The user does this by moving their Optimistic/Depressed slider 1724 to the right into the blue area. This action can update the user's interface in other shared walls and/or group walls for the user, for example, in response to the user providing permission for it to be shared in that manner. Sharing the interface 1702 can be a way for users to share their emotional state with others when it may otherwise be difficult to express their emotions. In this example, other users who see the user's current state in the interface may be prompted to respond by sending appropriate mediagrams to the user to help improve his/her mood.

Figure 17D:
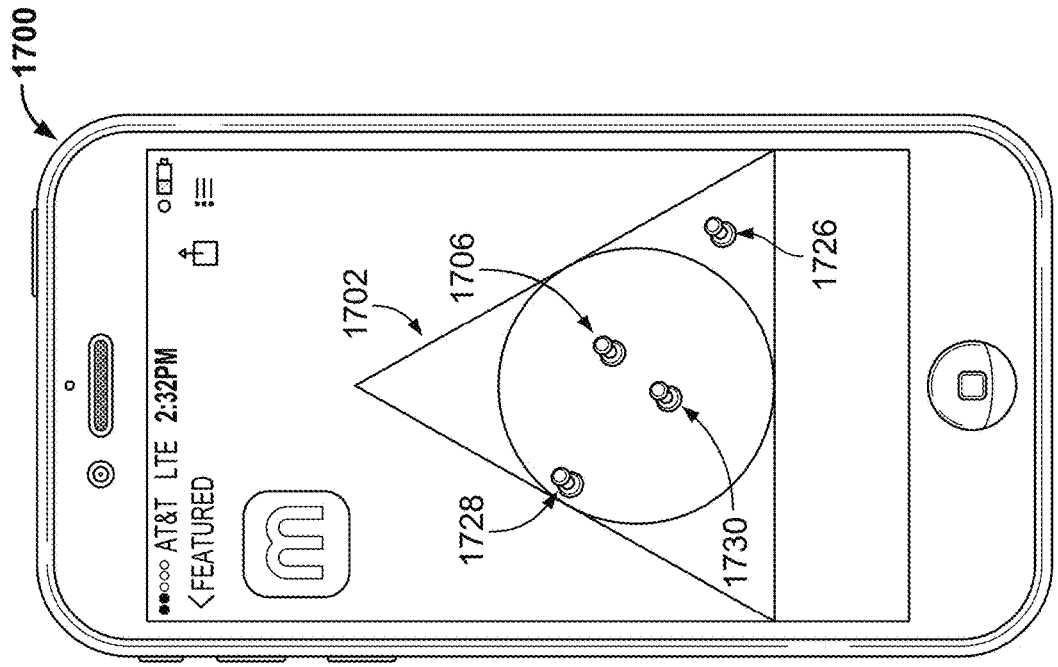
Figure 17C:
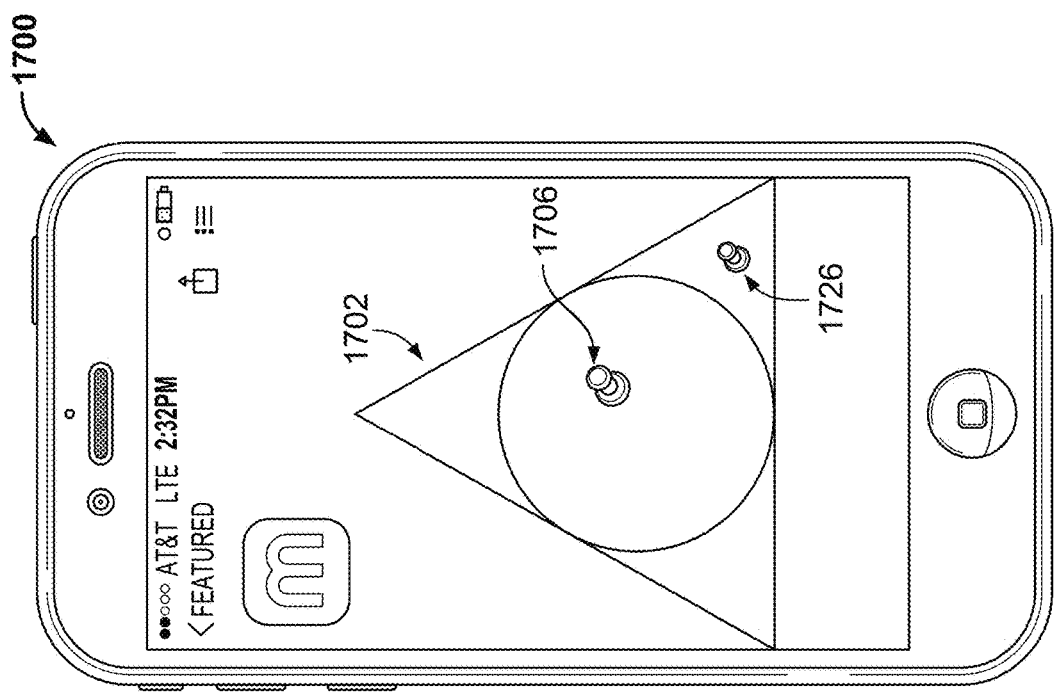

Referring to FIG. 17C, a shared wall is depicted in which the pin 1706 for the user of the device 1700 is superimposed on the same interface 1702 as another pin 1726 for the other user of the shared wall.

Referring to FIG. 17D, a group wall is depicted in which the pin 1706 for the user of the device 1700 is superimposed on the same interface 1702 other pins 1726-1730 for the other users who are members of the group wall. The current mood of every member in the group can be displayed on the interface 1702. Different group walls can address feelings about different topics, for example. Members of the group, including the user of the device 1700, may choose to use mediagrams or other interactive/social features to interact with other group to improve their moods. Users who are able to successfully improve the mood of other users through various actions on the social platform can receive positive relationship points, which can factor into relationship ratings.

Figure 17F:
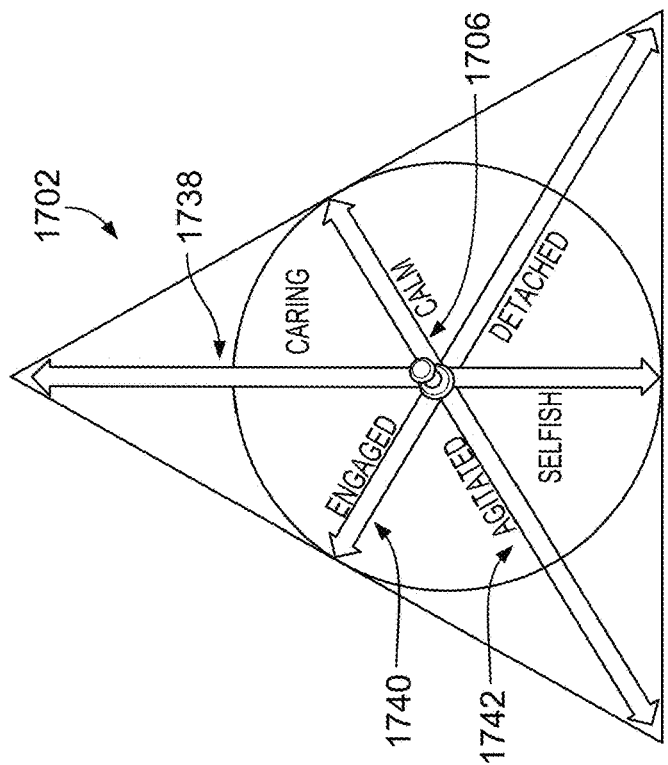
Figure 17E:
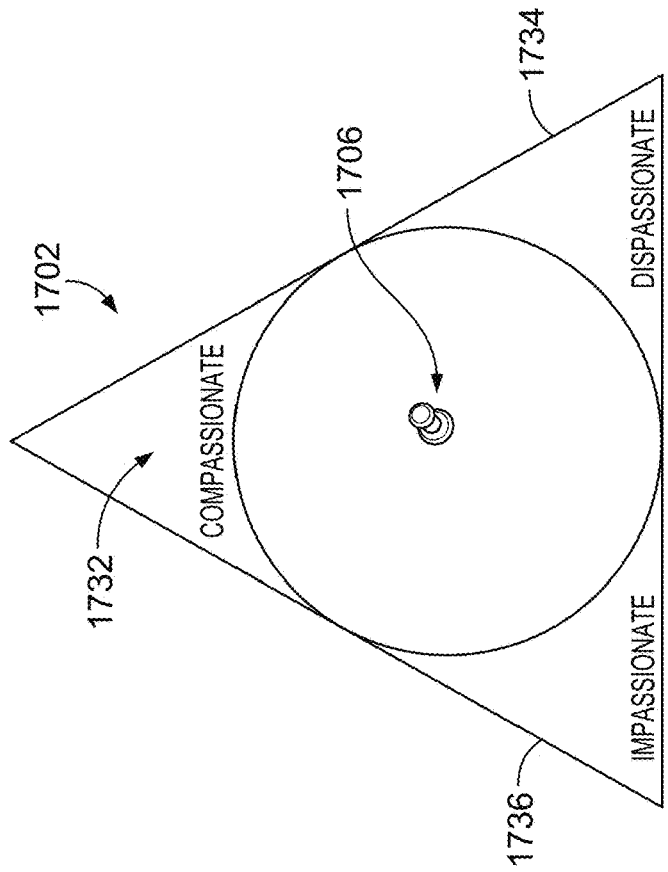

Referring to FIG. 17E, different mood goals can be designated for the corners of the interface 1702. If, for example, the corners represent Compassionate (1732), Impassionate (1736), and Dispassionate (1734), the user can decide to meditate, reflect on relationships, and/or reach out to other members in order to move their icon (1706) upwards toward the Compassionate (1732) corner.

Referring to FIG. 17F, the interface 1702 can be used to represent different strategy vectors 1738-1742. For example, users can imagine altering their moods along three Strategy Vectors—Engaged/Detached (1740), Caring/Selfish (1738), and Calm/Agitated (1742). Activities for improving mental states with these strategy vectors can include, for example, interacting more with other users, helping to solve another user's problems, and self-help (e.g., meditation, exercise, listening to music, etc.).

Figure 17H:
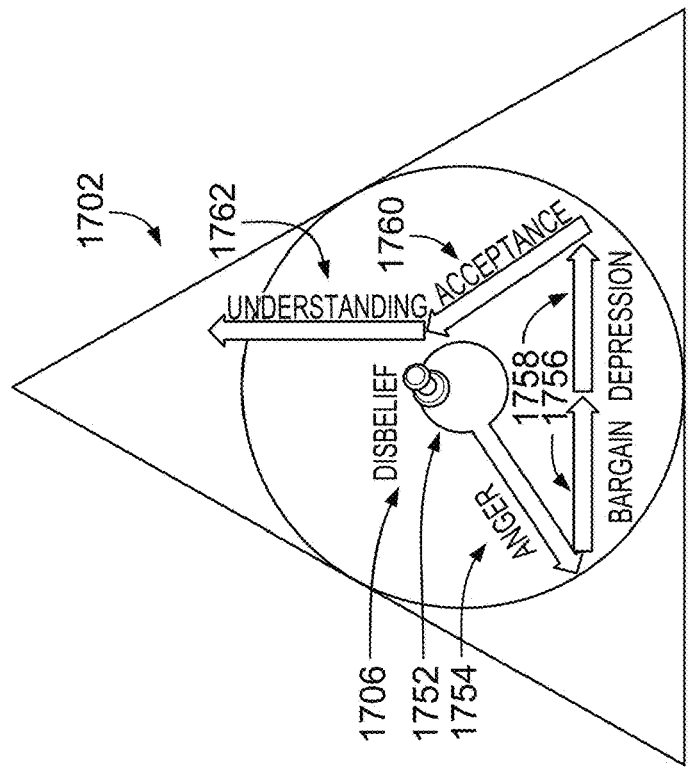
Figure 17G:
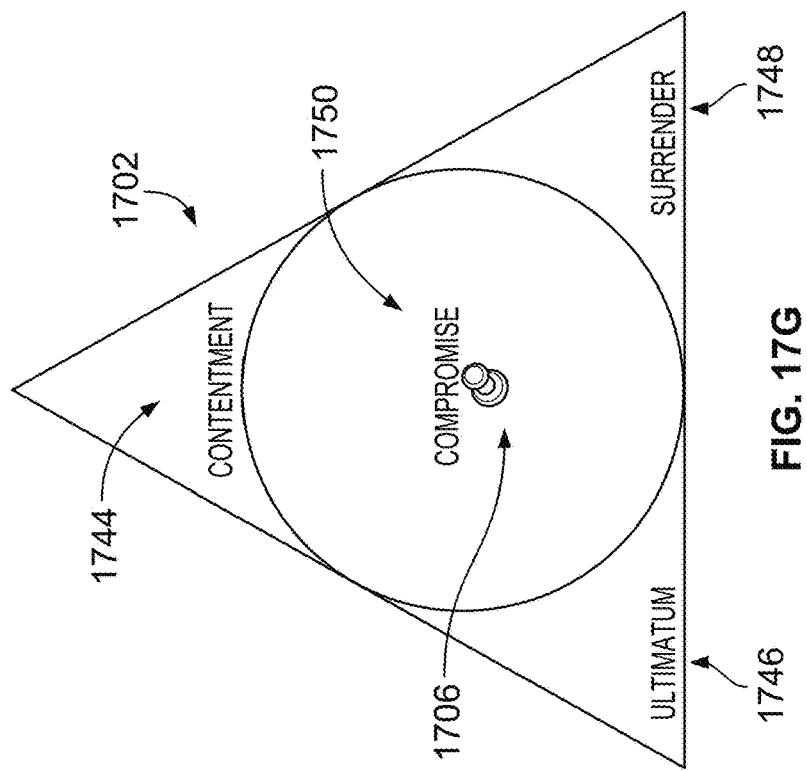

Referring to FIG. 17G, the interface 1702 can be used to represent conflict resolution goals 1744-1750, such as Ultimatum (1746), Surrender (1748), Compromise (1750), and Contentment (1744). Users can use the interface 1702 to resolve conflict by first choosing an approach—Ultimatum, Surrender, or Compromise—and then adopting a strategy that will lead to Contentment.

Referring to FIG. 17H, the interface 1702 can be used to assist users coping with grief. For example, a user can follow their progress through the 5 (suggested) stages of grief (Disbelief 1752, Anger 1754, Bargaining 1756, Depression 1758, and Acceptance 1760), eventually improving their moods through understanding 1762.

Figure 18A:
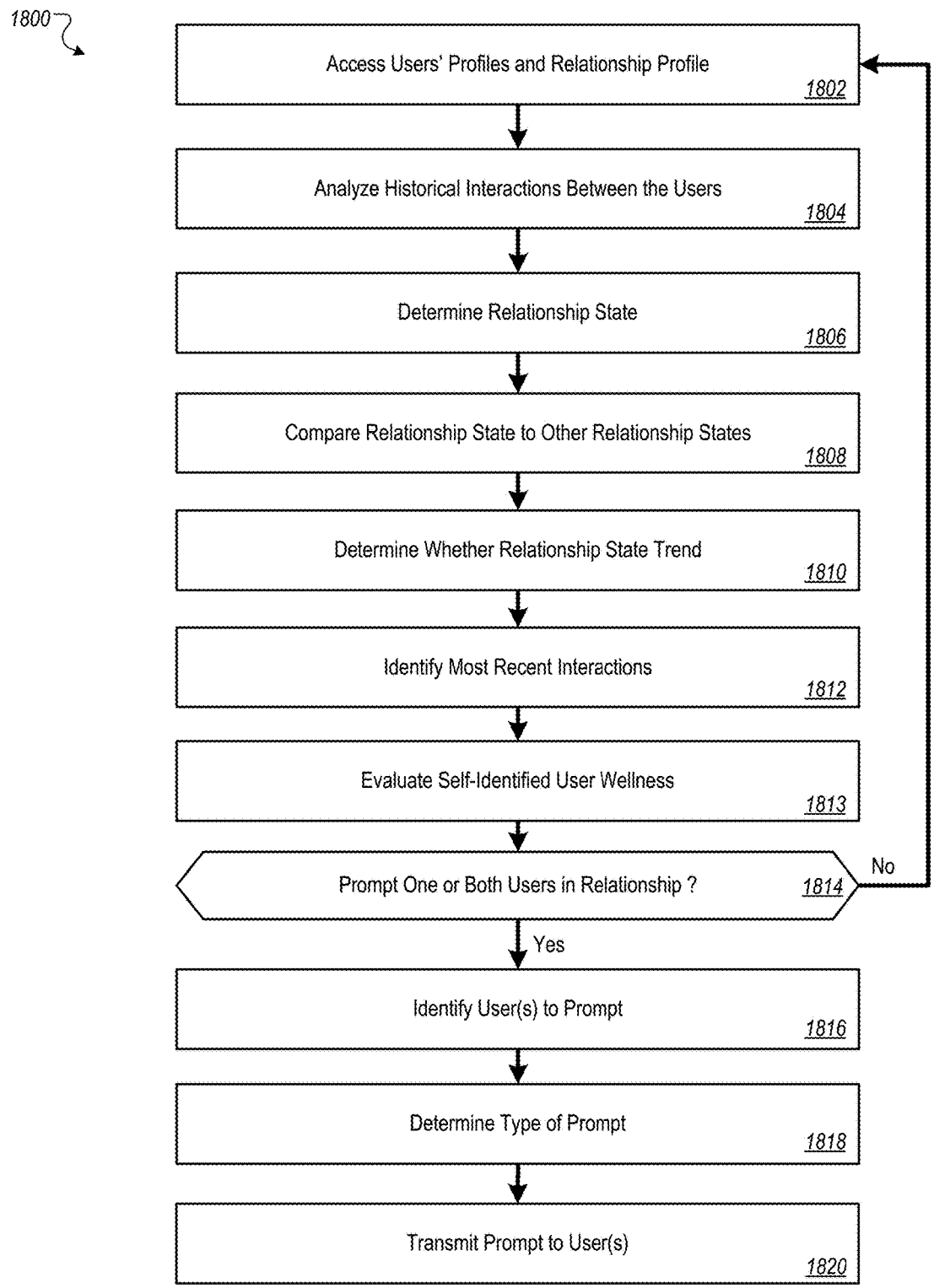
FIGS. 18A-B are flowcharts of example techniques for determining and transmitting prompts to specific relationship private walls on a social platform.
Figure 18B:
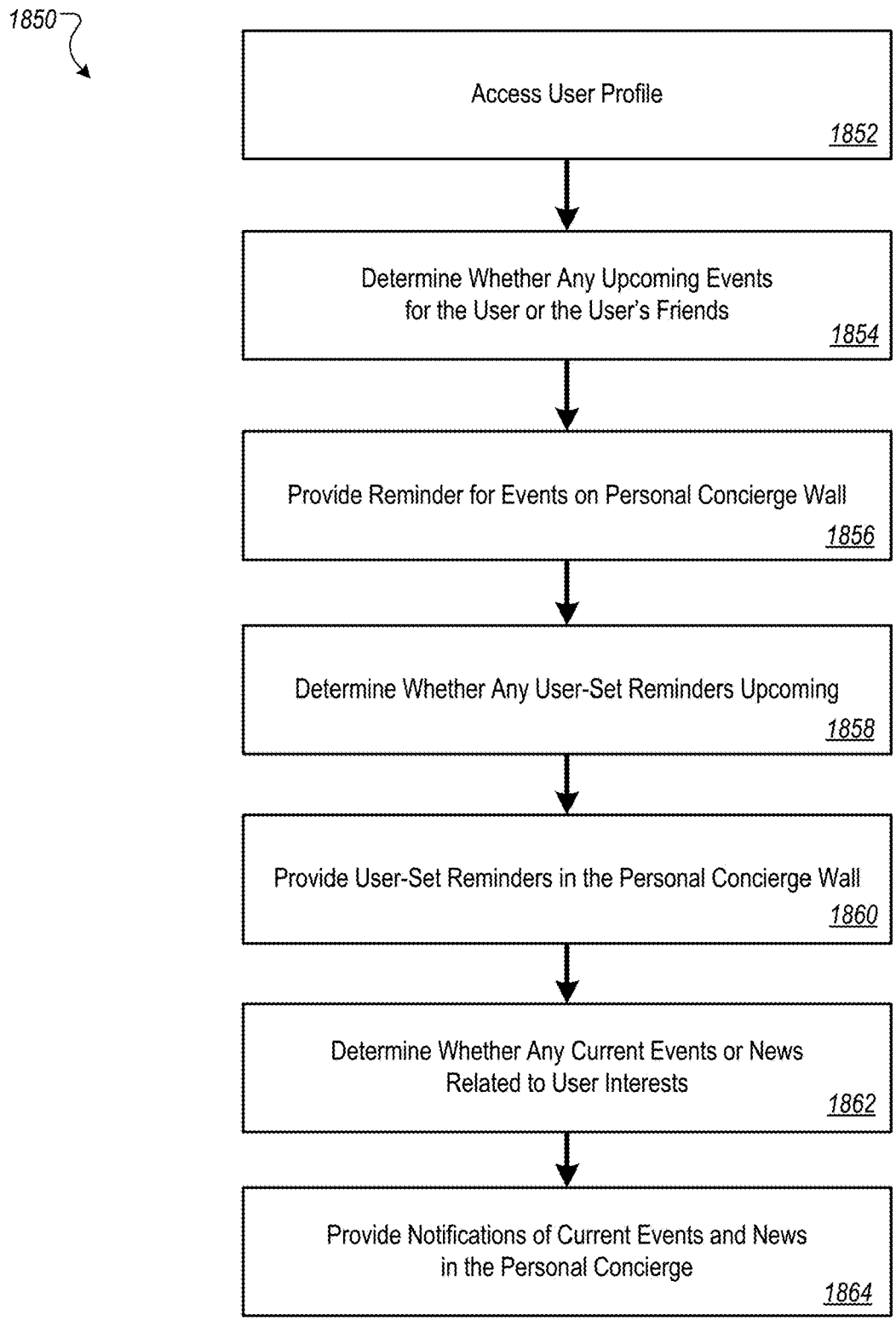

FIGS. 18A-B are flowcharts of example techniques 1800 and 1850 for determining and transmitting prompts to specific relationship private walls on a social platform.

Referring to FIG. 18A, the example technique 1800 can be for determining and transmitting prompts to users who share a private wall corresponding to their relationship part of a relationship concierge. The user profiles for the users sharing the wall and the relationship profile between the users can be accessed (1802). Historical interactions between the users via the private wall can be analyzed (1804). The user profiles, the relationship profile, and/or the historical interactions between the users can be used to determine a current state for the relationship between the users (1806). Such a relationship state can be, for example, a relationship rating or score that is provided to quantify aspects of a user relationship, such as the quality, closeness, and/or other relationship aspects. The current relationship state can be compared with other relationship states for other relationships that one or both of the users have (1808). For example, a comparison can be made to determine whether the current relationship under evaluation is better, the same as, or worse than other relationships. The trend of the relationship over time can also be determined by evaluating time sequence relationship states for the users (1810). For example, an assessment can be performed to determine whether the relationship is improving (i.e., users are becoming closer), staying the same, or declining (i.e., users are becoming more distant). Evaluation of current and trending wellness states that the users have self-reported (e.g., via the interface 1702) can also be performed (1813). For example, the emotional state of each user may be affecting the relationship between the users and may provide insight into corrective actions via prompts that could be taken to improve both the user's wellness state and the relationship.

Based on one or more of the relationship factors determined in 1802-1813, a determination can be made as to whether to provide a prompt to one or both of the users in the relationship (1814). If no prompts are determined, then the technique 1800 can repeat. If prompts are determined, then one or both of the users can be identified to receive the personal concierge prompt based on one or more of the factors determined in 1802-1813 (1816). For example, if one of the users in the relationship has a depressed wellness state and the other user in the relationship has a positive wellness state, the user with the positive wellness state can selected to receive the prompt to interact with the depressed user (in an attempt to improve the depressed user's wellness state). A determination of the type of prompt that should be provided to the selected user can be made (1818). Extending the previous example, in the case of a depressed user, the prompt may be for the positive user to provide something more impactful to the depressed user, like a mediagram. Once the user to receive the prompt has been selected and the prompt type has been identified, the prompt can be transmitted (1820).

Referring to FIG. 18B, the example technique 1850 can be for determining and transmitting prompts to a personal wall for the user and the personal concierge alone (no other users permitted on the private wall). The user's profile can be accessed (1852) and can be used to determine whether any upcoming events exist for the user or the user's friends (1854). At appropriate times, reminders for such upcoming events can be provided on the personal wall for the user (1856). A determination can be made as to whether any user-set reminders are upcoming (1858). At appropriate times, reminders for such user-set reminders can be provided on the personal wall for the user (1860). A determination can be made as to whether any current events or news related to user interests have come out recently that the user is not aware of (1862). If such current events or news does exist, then notifications can be provided by the personal concierge on the user's personal wall for those current events and/or news.

Figure 19:
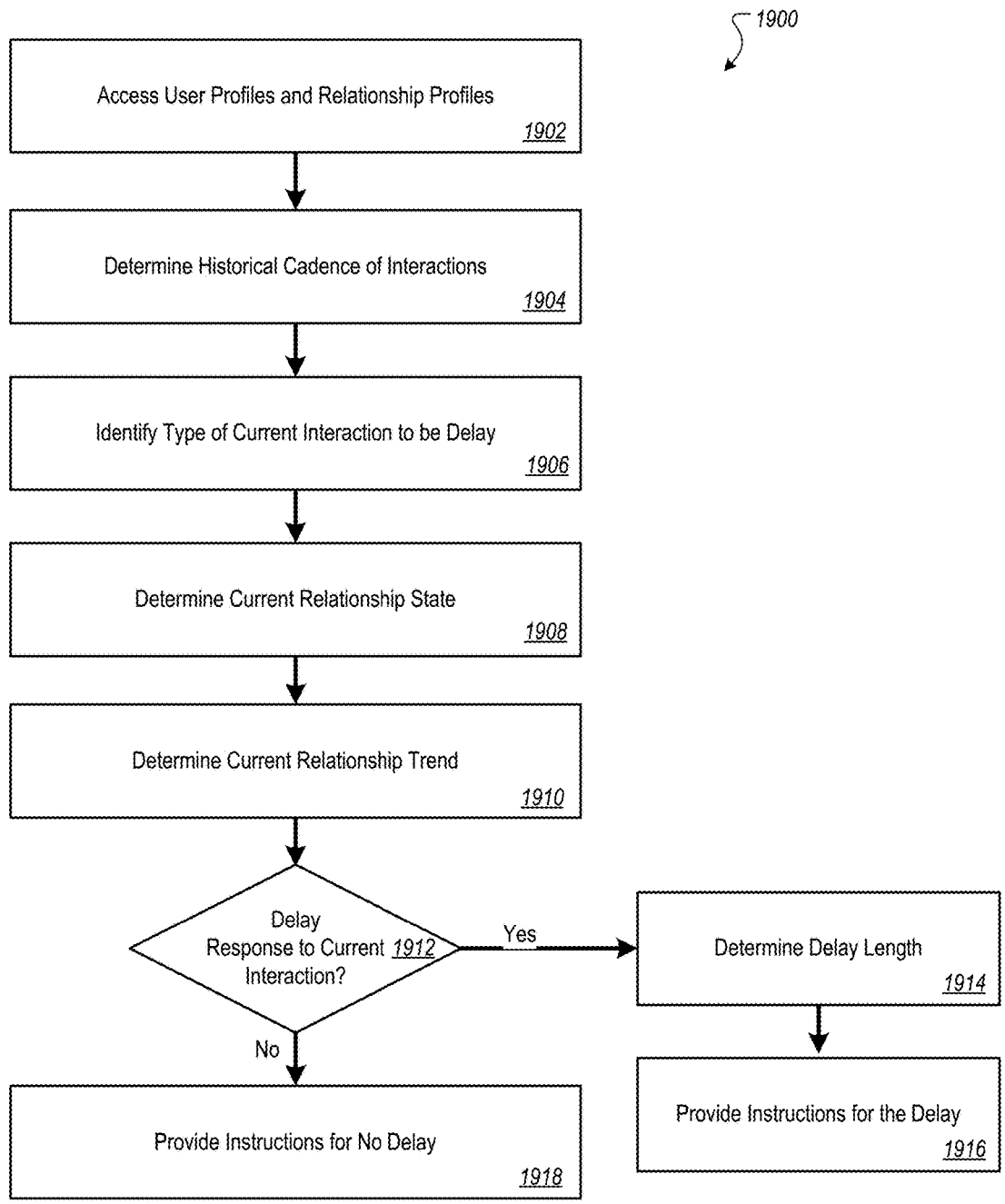
FIG. 19 is a flowchart of an example technique for determining and transmitting delays between interactions on a social platform.

FIG. 19 is a flowchart of an example technique 1900 for determining and transmitting delays between interactions on a social platform. For a particular relationship between two users, the user profiles and the relationship profile for the users can be accessed (1902) and, along with historical data for the users and the relationship, can be used to determine a historical cadence of interactions between the users (1904). The current type of interaction that would be delayed can be identified (1906), a current status of the relationship between the users can be determined (1908), and the current relationship trend for the users can be determined (1910). Based on one or more of the factors determined in 1902-1910, a determination can be made as to whether or not a response to the current interactions between the users should be delayed (1912). For example, if the relationship is currently strong and the current type of interaction is a mediagram, then a delay in the response may be appropriate. However, if the relationship is currently weaker and is trending in decline, then either no delay or a minimal delay may be instructed. Other ways and outcomes for determining whether a delay is appropriate are also possible.

If not delay is needed, then instructions can be provided to permit the user of the client device to respond without a delay (1915). If a delayed is determined to be needed, then the delay length can be determined based on one or more of the factors determined in 1902-1910 (1914). For example, if the user relationship is trending upward and the users typically have a lengthier cadence of interactions, then a longer delay can be determined. In another example, if the relationship is trending downward, them a shorter delay may be determined. Once the delay and the delay length has been determined, it instructions for instituting the delay on a client device can be transmitted (1916).

Figure 20:
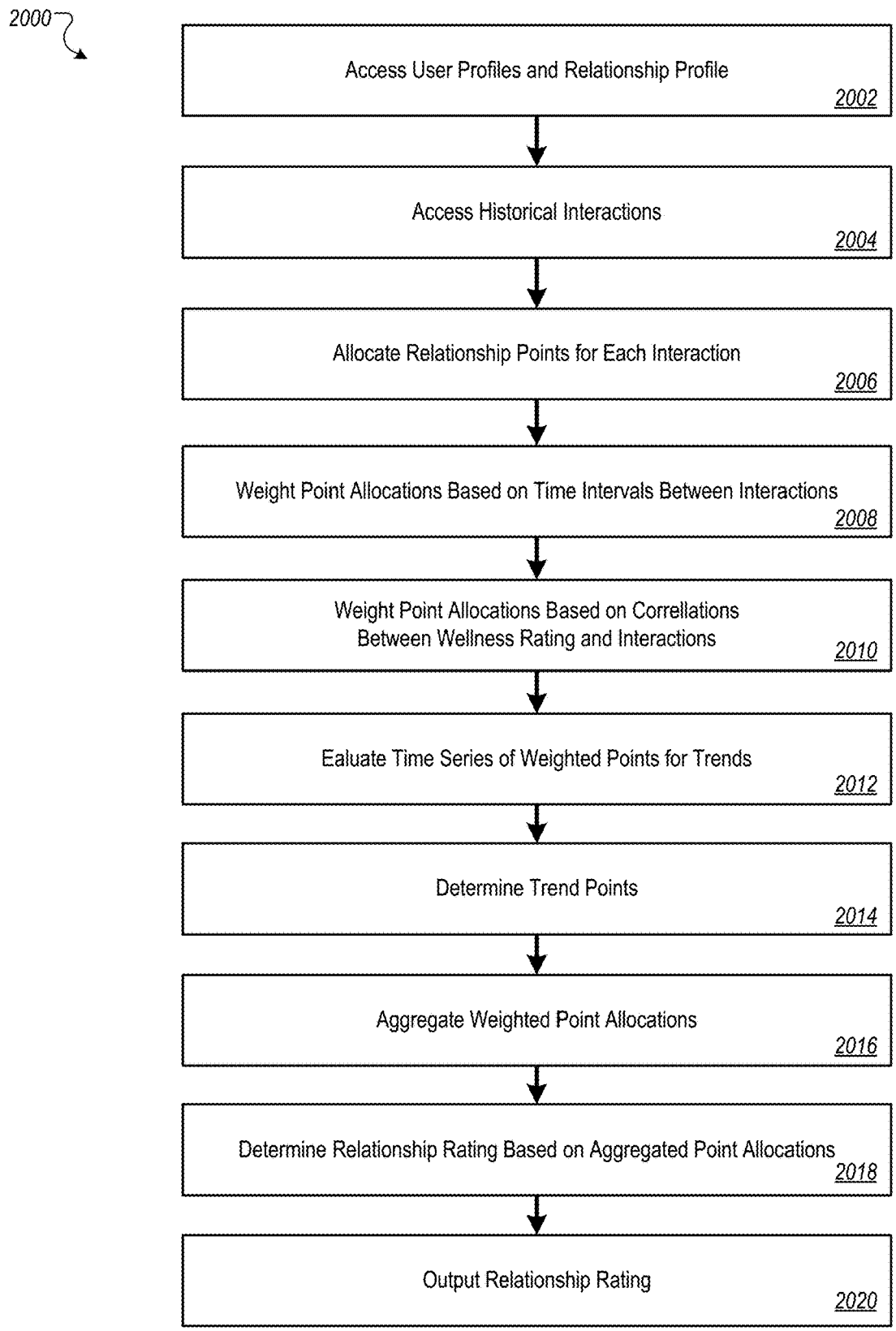
FIG. 20 is a flowchart of an example technique for determining relationship ratings on a social platform.

FIG. 20 is a flowchart of an example technique 2000 for determining relationship ratings on a social platform. For a particular relationship between two users, the user profiles and the relationship profile for the users can be accessed (1902) and the historical interactions between the users can be accessed (1904). Relationship points, which can be at least one of the metrics by which relationships are rated, can be allocated for each of the interactions (1906).

Allocated points can then be weighted more heavily for interactions that indicate relationship strength (e.g., smaller time gaps between interactions, improved wellness evaluations following interactions, more significant interactions (e.g., mediagrams sent frequently)), and weighted less for interactions that indicated relationship weakness (e.g., longer time gaps between interactions, decreased or flat wellness evaluations following interactions, less significant interactions). For example, allocated points can be weighted based on time intervals between interactions (2008) and allocated points can be weighted based on correlations between wellness ratings and interactions (2010). Other weighting schemes are also possible.

The trend of weighted point allocations over time can be determined by evaluating a time series of weighted points for the relationship (2012). If the relationship is trending toward improvement—meaning that the weighted point allocations generally increase over time—then additional positive trend points can be awarded to the relationship (2014).

Weighted points can be aggregated (2016) and used to determine a relationship rating (2018). For example, the aggregate weighted points can be evaluated over the time period within which they occur to determine one or more normalized statistics for the relationship (e.g., average weighted points per time unit (e.g., day, week, month), median point value, standard deviation of point values). The relationship rating can be output and used to infer the state of the relationship (2020).

Figure 21A:
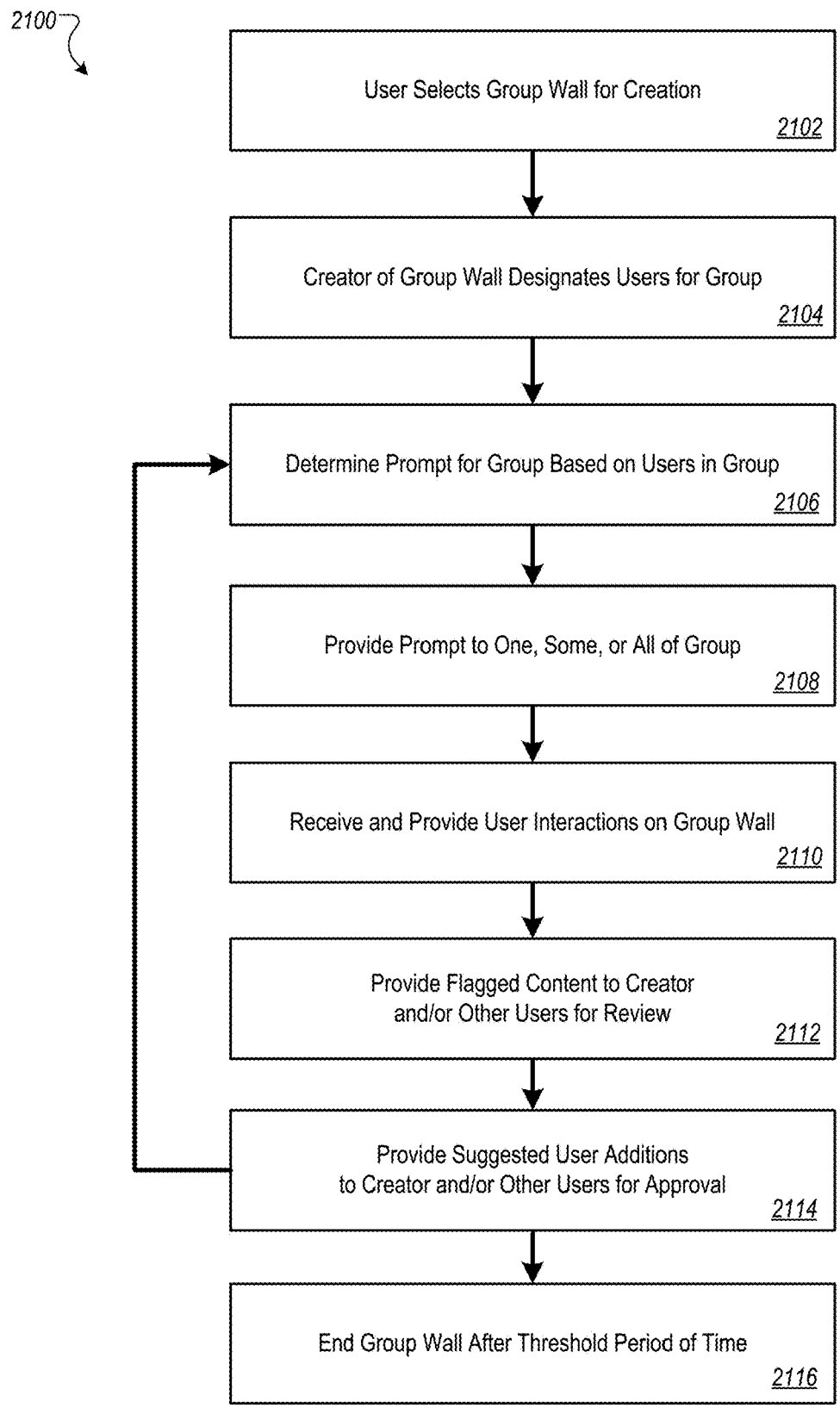
FIGS. 21A-B are flowcharts of example techniques for creating and using private group walls on a social platform.
Figure 21B:
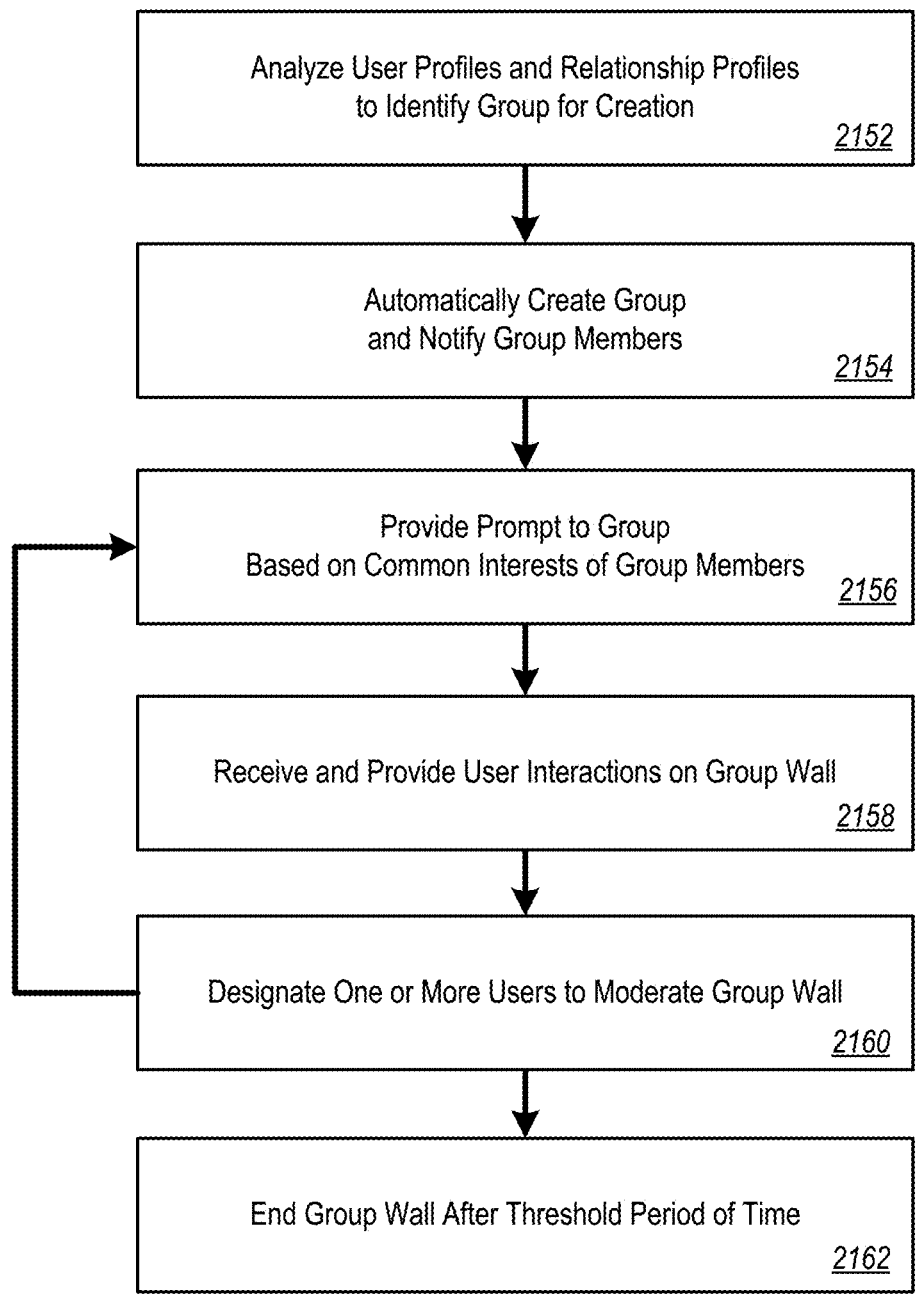

FIGS. 21A-B are flowcharts of example techniques 2100 and 2150 for creating and using private group walls on a social platform.

Referring to FIG. 21A, the technique 2100 is one in which user-initiated group creation takes place. A user selects an option to create a group wall (2102) and the user (now the group creator) designates users to be a part of the group (2104). A prompt can be determined for the group based on the users in the group (2106). For example, a prompt to initialize social interactions on the group wall can be determined based on interests for users in the group. The prompt can be provided to one, some, or all of the users in the group (2108). In response to injecting the prompt into the group wall, users can transmit responses and other interactions that are inserted into the group wall as well (2110).

The group wall can include self-policing features by which group members can flag inappropriate content and/or inappropriate members for the group. Flagged content can be provided to the creator and/or other users in the group for review and possible deletion (2112). Similarly, flagged users can be provided to the creator and/or other users in the group for review and possible removal from the group. Suggestions for additional or new users to be added to the group can also be provided to the creator and/or other users in the group for approval (2114). The steps 2160-2114 can repeat for a threshold period of time, after which the group wall can automatically end (2116).

Referring to FIG. 21B, the technique 2150 is one in which automatic (non-user-initiated) group creation takes place. To automatically initiate a group, user profiles and relationship profiles can be analyzed to identify users to automatically include in the group (2152). For example, users with common interests between each other and one or more preexisting connections to one or more other people in the pool of candidates for the group can be added to the group (each member of the group does not need a preexisting connection with each other member of the group). For example, a concierge-created group wall can be created with users who are fans of a sports team that recently won a big game or championship. The group can be automatically created and the members of the group can be notified (2154).

The concierge organizing the automatic group can seed the automatically created group wall with a starting prompt (and subsequent follow-on prompts) (2156). Users can interact with each other on the group wall in response to the prompt (2158). One or more users of the group can be designated to moderate the group wall (2160). In some implementations, the group wall does not allow invitation of random or connected additional contacts. After a pre-set expiration time (e.g., 24 hours, 2 days, 7 days), the group can end automatically (2162).

Figure 22:
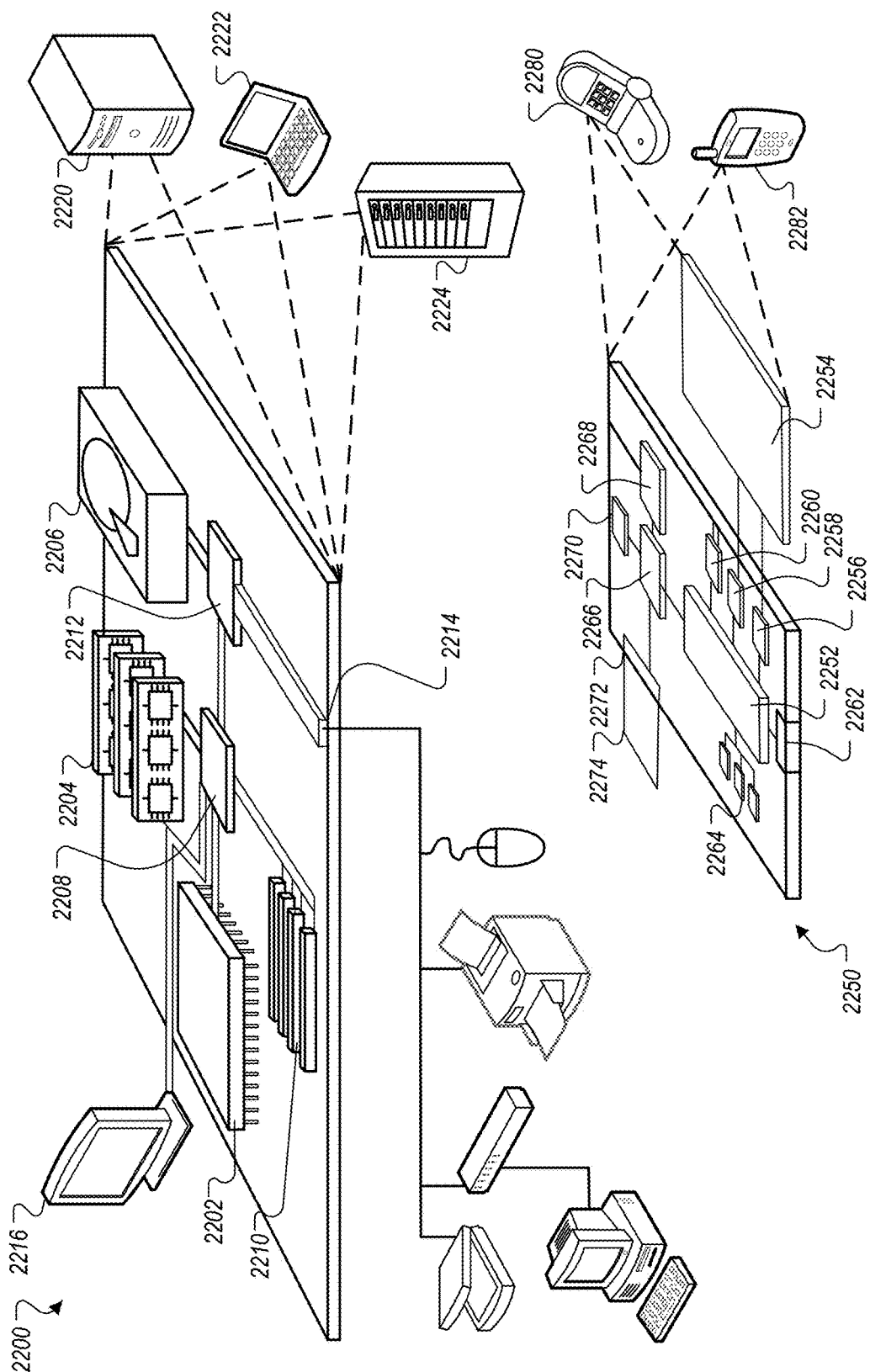
FIG. 22 is a block diagram of example computing devices.

FIG. 22 is a block diagram of example computing devices 2200, 2250 that may be used to implement the systems and methods described in this document, as either a client or as a server or plurality of servers. Computing device 2200 is intended to represent various forms of digital computers, such as laptops, desktops, workstations, personal digital assistants, servers, blade servers, mainframes, and other appropriate computers. Computing device 2200 is further intended to represent any other typically non-mobile devices, such as televisions or other electronic devices with one or more processers embedded therein or attached thereto. Computing device 2250 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 2200 includes a processor 2202, memory 2204, a storage device 2206, a high-speed controller 2208 connecting to memory 2204 and high-speed expansion ports 2210, and a low-speed controller 2212 connecting to low-speed bus 2214 and storage device 2206. Each of the components 2202, 2204, 2206, 2208, 2210, and 2212, are interconnected using various busses, and may be mounted on a common motherboard or in other manners as appropriate. The processor 2202 can process instructions for execution within the computing device 2200, including instructions stored in the memory 2204 or on the storage device 2206 to display graphical information for a GUI on an external input/output device, such as display 2216 coupled to high-speed controller 2208. In other implementations, multiple processors and/or multiple buses may be used, as appropriate, along with multiple memories and types of memory. Also, multiple computing devices 2200 may be connected, with each device providing portions of the necessary operations (e.g., as a server bank, a group of blade servers, or a multi-processor system).

The memory 2204 stores information within the computing device 2200. In one implementation, the memory 2204 is a computer-readable medium. In one implementation, the memory 2204 is a volatile memory unit or units. In another implementation, the memory 2204 is a non-volatile memory unit or units.

The storage device 2206 is capable of providing mass storage for the computing device 2200. In one implementation, the storage device 2206 is a computer-readable medium. In various different implementations, the storage device 2206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 2204, the storage device 2206, or memory on processor 2202.

The high-speed controller 2208 manages bandwidth-intensive operations for the computing device 2200, while the low-speed controller 2212 manages lower bandwidth-intensive operations. Such allocation of duties is an example only. In one implementation, the high-speed controller 2208 is coupled to memory 2204, display 2216 (e.g., through a graphics processor or accelerator), and to high-speed expansion ports 2210, which may accept various expansion cards (not shown). In the implementation, low-speed controller 2212 is coupled to storage device 2206 and low-speed bus 2214. The low-speed bus 2214 (e.g., a low-speed expansion port), which may include various communication ports (e.g., USB, Bluetooth Ethernet, wireless Ethernet), may be coupled to one or more input/output devices, such as a keyboard, a pointing device, a scanner, or a networking device such as a switch or router, e.g., through a network adapter.

The computing device 2200 may be implemented in a number of different forms, as shown in the figure. For example, it may be implemented as a standard server 2220, or multiple times in a group of such servers. It may also be implemented as part of a rack server system 2224. In addition, it may be implemented in a personal computer such as a laptop computer 2222. Alternatively, components from computing device 2200 may be combined with other components in a mobile device (not shown), such as computing device 2250. Each of such devices may contain one or more of computing devices 2200, 2250, and an entire system may be made up of multiple computing devices 2200, 2250 communicating with each other.

Computing device 2250 includes a processor 2252, memory 2264, an input/output device such as a display 2254, a communication interface 2266, and a transceiver 2268, among other components. The computing device 2250 may also be provided with a storage device, such as a micro-drive or other device, to provide additional storage. Each of the components 2250, 2252, 2264, 2254, 2266, and 2268, are interconnected using various buses, and several of the components may be mounted on a common motherboard or in other manners as appropriate.

The processor 2252 can process instructions for execution within the computing device 2250, including instructions stored in the memory 2264. The processor may also include separate analog and digital processors. The processor may provide, for example, for coordination of the other components of the computing device 2250, such as control of user interfaces, applications run by computing device 2250, and wireless communication by computing device 2250.

Processor 2252 may communicate with a user through control interface 2258 and display interface 2256 coupled to a display 2254. The display 2254 may be, for example, a TFT LCD display or an OLED display, or other appropriate display technology. The display interface 2256 may comprise appropriate circuitry for driving the display 2254 to present graphical and other information to a user. The control interface 2258 may receive commands from a user and convert them for submission to the processor 2252. In addition, an external interface 2262 may be provided in communication with processor 2252, so as to enable near area communication of computing device 2250 with other devices. External interface 2262 may provide, for example, for wired communication (e.g., via a docking procedure) or for wireless communication (e.g., via Bluetooth® or other such technologies).

The memory 2264 stores information within the computing device 2250. In one implementation, the memory 2264 is a computer-readable medium. In one implementation, the memory 2264 is a volatile memory unit or units. In another implementation, the memory 2264 is a non-volatile memory unit or units. Expansion memory 2274 may also be provided and connected to computing device 2250 through expansion interface 2272, which may include, for example, a subscriber identification module (SIM) card interface. Such expansion memory 2274 may provide extra storage space for computing device 2250, or may also store applications or other information for computing device 2250. Specifically, expansion memory 2274 may include instructions to carry out or supplement the processes described above, and may include secure information also. Thus, for example, expansion memory 2274 may be provide as a security module for computing device 2250, and may be programmed with instructions that permit secure use of computing device 2250. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2264, expansion memory 2274, or memory on processor 2252.

Computing device 2250 may communicate wirelessly through communication interface 2266, which may include digital signal processing circuitry where necessary. Communication interface 2266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 2268 (e.g., a radio-frequency transceiver). In addition, short-range communication may occur, such as using a Bluetooth WiFi, or other such transceiver (not shown). In addition, GPS receiver module 2270 may provide additional wireless data to computing device 2250, which may be used as appropriate by applications running on computing device 2250.

Computing device 2250 may also communicate audibly using audio codec 2260, which may receive spoken information from a user and convert it to usable digital information. Audio codec 2260 may likewise generate audible sound for a user, such as through a speaker, e.g., in a handset of computing device 2250. Such sound may include sound from voice telephone calls, may include recorded sound (e.g., voice messages, music files, etc.) and may also include sound generated by applications operating on computing device 2250.

The computing device 2250 may be implemented in a number of different forms, as shown in the figure. For example, it may be implemented as a cellular telephone 2280. It may also be implemented as part of a smartphone 2282, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for providing a social media platform to enhance the quality of online social interactions among users, the system comprising:
   first and second client computing devices that are running social media applications for the social media platform, each of the social media applications being programmed to provide a graphical user interface (GUI) that presents digital content retrieved over the internet from the social media platform and to receive user inputs via one or more graphical input elements in the GUI, the first client computing device being associated with a first user and the second client computing device being associated with a second user, wherein the GUI on the first client computing device and the GUI on the second client computing device provide a private wall that is exclusive to a relationship between the first and second users;
   a digital profile repository storing (i) user profiles for the first user and the second user, and (ii) a relationship profile for the relationship between the first user and the second user;

a relationship history database storing historical interactions among the first user and the second user on the social media platform; and a relationship concierge to facilitate meaningful social interactions among the first and second client computing devices, the relationship concierge being programmed to:

retrieve the user profiles for the first user and the second user, and the relationship profile for the relationship between the first user and the second user from the digital profile repository, retrieve the historical interactions among the first user and the second user on the social media platform from the relationship history database, determine whether to provide a social interaction prompt to one or more of the first client computing device and the second client computing device based on the user profiles, the relationship profile, and the historical interactions, wherein the social interaction prompt provides a call to action for interaction within the relationship between the first user and the second user, identify, in response to determining that the social interaction prompt is to be provided, the first client computing device from among the first and second users as the recipient of the social interaction prompt, automatically transmit, without a request from either the first client computing device or the second client computing device, the social interaction prompt to the first client computing device, wherein the social interaction prompt is only presented in the GUI on the first client computing device for the first user until the first user responds to the prompt, and the social interaction prompt is not transmitted to the second client computing device or presented in the GUI on the second client computing device, wherein the social interaction prompt is initially only visible on the private wall presented by the first client computing device to the first user, wherein the social interaction prompt becomes visible on the private wall presented by the second client computing device to the second user only after and in combination with response to the social interaction prompt by the first user, receive a response to the social interaction prompt from the first client computing device, wherein the response comprises content input by the first user via the GUI on the first client computing device that is responsive to the social interaction prompt, and automatically transmit, without a request from either the first client computing device or the second client computing device, the response with the social interaction prompt to the second client computing device for presentation in the GUI on the second client computing device, wherein the social interaction prompt and the response are presented in the GUI on the second client computing device based on the first user having provided the response, wherein the GUI on the second client computing device delays the second user from replying to the response for at least a threshold period of time following the response and the social interaction prompt being presented on the private wall of the second client computing device, wherein the GUI on the second client computing device (i) inactivates the graphical input elements to receive a reply from the second user until after a delayed response period has elapsed and (ii) presents timing information identifying an amount of time remaining until the delayed response period has elapsed, and wherein the GUI on the first client computing device also presents the timing information identifying an amount of time remaining until the delayed response period has elapsed for the second user to respond.

2. The system of claim 1, wherein the social interaction prompt comprises a question that is posed in the GUI on the first client computing device to the first user.

3. The system of claim 1, wherein the social interaction prompt comprises the first user being directed to create a mediagram for the second user, wherein the mediagram comprises a personalized digital video segment that is automatically personalized to provide an emotionally impactful message that is particularly tailored to the relationship between the first and second users.

4. The system of claim 1, wherein the social interaction prompt comprised an interactive game to be played by the first and second users.

5. The system of claim 1, wherein the response and the social interaction prompt are automatically deleted from the private wall after a threshold amount of time or interactions have elapsed since they appeared on the private wall.

6. A system for providing a social media platform to enhance the quality of online social interactions among users, the system comprising:

first and second client computing devices that are running social media applications for the social media platform, each of the social media applications being programmed to provide a graphical user interface (GUI) that presents digital content retrieved over the internet from the social media platform and to receive user inputs via one or more graphical input elements in the GUI, the first client computing device being associated with a first user and the second client computing device being associated with a second user, wherein the GUI on the first client computing device and the GUI on the second client computing device provide a private wall that is exclusive to a relationship between the first and second users;

a digital profile repository storing (i) user profiles for the first user and the second user, and (ii) a relationship profile for the relationship between the first user and the second user;

a relationship history database storing historical interactions among the first user and the second user on the social media platform; and a relationship concierge to facilitate meaningful social interactions among the first and second client computing devices, the relationship concierge being programmed to:

retrieve the user profiles for the first user and the second user, and the relationship profile for the relationship between the first user and the second user from the digital profile repository, retrieve the historical interactions among the first user and the second user on the social media platform from the relationship history database, determine whether to provide a social interaction prompt to one or more of the first client computing device and the second client computing device based on the user profiles, the relationship profile, and the historical interactions, wherein the social interaction prompt provides a call to action for interaction within the relationship between the first user and the second user, identify, in response to determining that the social interaction prompt is to be provided, the first client computing device from among the first and second users as the recipient of the social interaction prompt, automatically transmit, without a request from either the first client computing device or the second client computing device, the social interaction prompt to the first client computing device, wherein the social interaction prompt is only presented in the GUI on the first client computing device for the first user until the first user responds to the prompt, and the social interaction prompt is not transmitted to the second client computing device or presented in the GUI on the second client computing device, wherein the social interaction prompt is initially only visible on the private wall presented by the first client computing device to the first user, wherein the social interaction prompt becomes visible on the private wall presented by the second client computing device to the second user only after and in combination with response to the social interaction prompt by the first user, receive a response to the social interaction prompt from the first client computing device, wherein the response comprises content input by the first user via the GUI on the first client computing device that is responsive to the social interaction prompt, and automatically transmit, without a request from either the first client computing device or the second client computing device, the response with the social interaction prompt to the second client computing device for presentation in the GUI on the second client computing device, wherein the social interaction prompt and the response are presented in the GUI on the second client computing device based on the first user having provided the response, wherein the GUI in the second client computing device delays the second user from replying to the response for at least a threshold period of time following the response and the social interaction prompt being presented on the private wall of the second client computing device, wherein the GUI on the second client computing device (i) activates the graphical input elements to receive a reply from the second user during a delayed response period and (ii) presents timing information identifying an amount of time remaining until the delayed response period has elapsed and the reply from the second user will be transmitted to the first client computing device, and wherein the GUI on the first client computing device also presents the timing information identifying an amount of time remaining until the delayed response period has elapsed for the second user's reply to be transmitted to the first client computing device.

7. The system of claim 6, wherein the social interaction prompt comprises a question that is posed in the GUI on the first client computing device to the first user.

8. The system of claim 6, wherein the social interaction prompt comprises the first user being directed to create a mediagram for the second user, wherein the mediagram comprises a personalized digital video segment that is automatically personalized to provide an emotionally impactful message that is particularly tailored to the relationship between the first and second users.

9. The system of claim 6, wherein the social interaction prompt comprised an interactive game to be played by the first and second users.

10. A computer-implemented method for providing a social media platform to enhance the quality of online social interactions among users, the computer-implemented method comprising:

retrieving, from a digital profile repository storing (i) user profiles for a first user and a second user, and (ii) a relationship profile for a relationship between the first user and the second user, user profiles for the first user and the second user, and the relationship profile for the relationship between the first user and the second user, retrieving, from a relationship history database storing historical interactions among the first user and the second user on the social media platform, historical interactions among the first user and the second user on the social media platform, and facilitating meaningful social interactions among the first and second client computing devices that are running social media applications for the social media platform, each of the social media applications being programmed to provide a graphical user interface (GUI) that presents digital content retrieved over the internet from the social media platform and to receive user inputs via one or more graphical input elements in the GUI, the first client computing device being associated with the first user and the second client computing device being associated with the second user, wherein the GUI on the first client computing device and the GUI on the second client computing device provide a private wall that is exclusive to the relationship between the first and second users, the facilitating including:

determining whether to provide a social interaction prompt to one or more of the first client computing device and the second client computing device based on the user profiles, the relationship profile, and the historical interactions, wherein the social interaction prompt provides a call to action for interaction within the relationship between the first user and the second user, identifying, in response to determining that the social interaction prompt is to be provided, the first client computing device from among the first and second users as the recipient of the social interaction prompt, automatically transmitting, without a request from either the first client computing device or the second client computing device, the social interaction prompt to the first client computing device, wherein the social interaction prompt is only presented in the GUI on the first client computing device for the first user until the first user responds to the prompt, and the social interaction prompt is not transmitted to the second client computing device or presented in the GUI on the second client computing device, wherein the social interaction prompt is initially only visible on the private wall presented by the first client computing device to the first user, receiving a response to the social interaction prompt from the first client computing device, wherein the response comprises content input by the first user via the GUI on the first client computing device that is responsive to the social interaction prompt, and automatically transmitting, without a request from either the first client computing device or the second client computing device, the response with the social interaction prompt to the second client computing device for presentation in the GUI on the second client computing device, wherein the social interaction prompt and the response are presented in the GUI on the second client computing device based on the first user having provided the response, wherein the social interaction prompt becomes visible on the private wall presented by the second client computing device to the second user only after and in combination with the response to the social interaction prompt by the first user, wherein the GUI on the second client computing device delays the second user from replying to the response for at least a threshold period of time following the response and the social interaction prompt being presented on the private wall of the second client computing device, wherein the GUI on the second client computing device (i) inactivates the graphical input elements to receive a reply from the second user until after a delayed response period has elapsed and (ii) presents timing information identifying an amount of time remaining until the delayed response period has elapsed, and wherein the GUI on the first client computing device also presents the timing information identifying an amount of time remaining until the delayed response period has elapsed for the second user to respond.

11. The computer-implemented method of claim 10, wherein the social interaction prompt comprises a question that is posed in the GUI on the first client computing device to the first user.

12. The computer-implemented method of claim 10, wherein the social interaction prompt comprises the first user being directed to create a mediagram for the second user, wherein the mediagram comprises a personalized digital video segment that is automatically personalized to provide an emotionally impactful message that is particularly tailored to the relationship between the first and second users.

13. The computer-implemented method of claim 10, wherein the social interaction prompt comprised an interactive game to be played by the first and second users.

14. The computer-implemented method of claim 10, wherein the response and the social interaction prompt are automatically deleted from the private wall after a threshold amount of time or interactions have elapsed since they appeared on the private wall.

15. A computer-implemented method for providing a social media platform to enhance the quality of online social interactions among users, the computer-implemented method comprising:
retrieving, from a digital profile repository storing (i) user profiles for a first user and a second user, and (ii) a relationship profile for a relationship between the first user and the second user, user profiles for the first user and the second user, and the relationship profile for the relationship between the first user and the second user,
retrieving, from a relationship history database storing historical interactions among the first user and the second user on the social media platform, historical interactions among the first user and the second user on the social media platform, and
facilitating meaningful social interactions among the first and second client computing devices that are running social media applications for the social media platform, each of the social media applications being programmed to provide a graphical user interface (GUI) that presents digital content retrieved over the internet from the social media platform and to receive user inputs via one or more graphical input elements in the GUI, the first client computing device being associated with the first user and the second client computing device being associated with the second user, wherein the GUI on the first client computing device and the GUI on the second client computing device provide a private wall that is exclusive to the relationship between the first and second users, the facilitating including:
determining whether to provide a social interaction prompt to one or more of the first client computing device and the second client computing device based on the user profiles, the relationship profile, and the historical interactions, wherein the social interaction prompt provides a call to action for interaction within the relationship between the first user and the second user,
identifying, in response to determining that the social interaction prompt is to be provided, the first client computing device from among the first and second users as the recipient of the social interaction prompt,
automatically transmitting, without a request from either the first client computing device or the second client computing device, the social interaction prompt to the first client computing device, wherein the social interaction prompt is only presented in the GUI on the first client computing device for the first user until the first user responds to the prompt, and the social interaction prompt is not transmitted to the second client computing device or presented in the GUI on the second client computing device, wherein the social interaction prompt is initially only visible on the private wall presented by the first client computing device to the first user,
receiving a response to the social interaction prompt from the first client computing device, wherein the response comprises content input by the first user via the GUI on the first client computing device that is responsive to the social interaction prompt, and
automatically transmitting, without a request from either the first client computing device or the second client computing device, the response with the social interaction prompt to the second client computing device for presentation in the GUI on the second client computing device, wherein the social interaction prompt and the response are presented in the GUI on the second client computing device based on the first user having provided the response, wherein the social interaction prompt becomes visible on the private wall presented by the second client computing device to the second user only after and in combination with the response to the social interaction prompt by the first user, wherein the GUI on the second client computing device delays the second user from replying to the response for at least a threshold period of time following the response and the social interaction prompt being presented on the private wall of the second client computing device, wherein the GUI on the second client computing device (i) activates the graphical input elements to receive a reply from the second user during a delayed response period and (ii) presents timing information identifying an amount of time remaining until the delayed response period has elapsed and the reply from the second user will be transmitted to the first client computing device, and wherein the GUI on the first client computing device also presents the timing information identifying an amount of time remaining until the delayed response period has elapsed for the second user's reply to be transmitted to the first client computing device.

16. The computer-implemented method of claim 15, wherein the social interaction prompt comprises a question that is posed in the GUI on the first client computing device to the first user.

17. The computer-implemented method of claim 15, wherein the social interaction prompt comprises the first user being directed to create a mediagram for the second user, wherein the mediagram comprises a personalized digital video segment that is automatically personalized to provide an emotionally impactful message that is particularly tailored to the relationship between the first and second users.

18. The computer-implemented method of claim 15, wherein the social interaction prompt comprised an interactive game to be played by the first and second users.

19. A non-transitory computer-readable medium for providing a social media platform to enhance the quality of online social interactions among users and storing instructions, that when executed, cause one or more processors to perform operations including:
   retrieving, from a digital profile repository storing (i) user profiles for a first user and a second user, and (ii) a relationship profile for a relationship between the first user and the second user, user profiles for the first user and the second user, and the relationship profile for the relationship between the first user and the second user,
   retrieving, from a relationship history database storing historical interactions among the first user and the second user on the social media platform, historical interactions among the first user and the second user on the social media platform, and
   facilitating meaningful social interactions among the first and second client computing devices that are running social media applications for the social media platform, each of the social media applications being programmed to provide a graphical user interface (GUI) that presents digital content retrieved over the internet from the social media platform and to receive user inputs via one or more graphical input elements in the GUI, the first client computing device being associated with the first user and the second client computing device being associated with the second user, wherein the GUI on the first client computing device and the GUI on the second client computing device provide a private wall that is exclusive to the relationship between the first and second users, the facilitating including:
      determining whether to provide a social interaction prompt to one or more of the first client computing device and the second client computing device based on the user profiles, the relationship profile, and the historical interactions, wherein the social interaction prompt provides a call to action for interaction within the relationship between the first user and the second user,
      identifying, in response to determining that the social interaction prompt is to be provided, the first client computing device from among the first and second users as the recipient of the social interaction prompt,
      automatically transmitting, without a request from either the first client computing device or the second client computing device, the social interaction prompt to the first client computing device, wherein the social interaction prompt is only presented in the GUI on the first client computing device for the first user until the first user responds to the prompt, and the social interaction prompt is not transmitted to the second client computing device or presented in the GUI on the second client computing device, wherein the social interaction prompt is initially only visible on the private wall presented by the first client computing device to the first user,
      receiving a response to the social interaction prompt from the first client computing device, wherein the response comprises content input by the first user via the GUI on the first client computing device that is responsive to the social interaction prompt, and
      automatically transmitting, without a request from either the first client computing device or the second client computing device, the response with the social interaction prompt to the second client computing device for presentation in the GUI on the second client computing device, wherein the social interaction prompt and the response are presented in the GUI on the second client computing device based on the first user having provided the response, wherein the social interaction prompt becomes visible on the private wall presented by the second client computing device to the second user only after and in combination with the response to the social interaction prompt by the first user, wherein the GUI on the second client computing device delays the second user from replying to the response for at least a threshold period of time following the response and the social interaction prompt being presented on the private wall of the second client computing device, wherein the GUI on the second client computing device (i) inactivates the graphical input elements to receive a reply from the second user until after a delayed response period has elapsed and (ii) presents timing information identifying an amount of time remaining until the delayed response period has elapsed, and wherein the GUI on the first client computing device also presents the timing information identifying an amount of time remaining until the delayed response period has elapsed for the second user to respond.

20. The non-transitory computer-readable medium of claim 19, wherein the social interaction prompt comprises a question that is posed in the GUI on the first client computing device to the first user.

* * * * *